United States Patent
Luo et al.

(10) Patent No.: US 11,966,378 B2
(45) Date of Patent: Apr. 23, 2024

(54) CROSS-CHAIN TRANSACTION METHOD AND APPARATUS

(71) Applicant: HUAWEI TECHNOLOGIES CO., LTD., Guangdong (CN)

(72) Inventors: Yulong Luo, Hangzhou (CN); Zhenlong Zhao, Shenzhen (CN); Huifeng Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 275 days.

(21) Appl. No.: 17/585,250

(22) Filed: Jan. 26, 2022

(65) Prior Publication Data
US 2022/0147999 A1 May 12, 2022

Related U.S. Application Data

(63) Continuation of application No. PCT/CN2020/104551, filed on Jul. 24, 2020.

(30) Foreign Application Priority Data

Jul. 26, 2019 (CN) .......................... 201910683735.1
Nov. 18, 2019 (CN) .......................... 201911129391.6

(51) Int. Cl.
*G06F 16/00* (2019.01)
*G06F 16/23* (2019.01)
(Continued)

(52) U.S. Cl.
CPC ...... *G06F 16/2322* (2019.01); *G06F 16/2379* (2019.01); *G06F 16/275* (2019.01);
(Continued)

(58) Field of Classification Search
CPC ............. G06F 16/2379; G06F 16/2322; G06F 16/275; G06F 21/64
See application file for complete search history.

(56) References Cited

U.S. PATENT DOCUMENTS 10,447,480 B2 * 10/2019 Alas .................. G06F 21/64
2019/0182313 A1 * 6/2019 Yoo .................... H04L 67/10
(Continued)

FOREIGN PATENT DOCUMENTS

CN 107248076 A 10/2017
CN 107909369 A 4/2018
(Continued)

OTHER PUBLICATIONS

Wang et al., "Blockchain Router: A Cross-Chain Communication Protocol," ACM, IEEA'17, Mar. 29-31, 2017, pp. 94-97. (Year: 2017).*

(Continued)

*Primary Examiner* — Cheryl Lewis
(74) *Attorney, Agent, or Firm* — Gregg Jansen

(57) ABSTRACT

Embodiments of this application provide a cross-chain transaction method and apparatus. The cross-chain transaction method includes determining, by a first node, that a first transaction status of a first transaction is a first status, the first status indicating that consensus verification on the transaction succeeded, the first node maintaining a first blockchain and the first transaction belonging to the first blockchain. The method includes obtaining, by the first node, a second transaction status of a second transaction, a second node maintaining a second blockchain and the second transaction belonging to the second blockchain. The method includes modifying, by the first node, target data, the modifying being based on first transaction data of the first transaction when the second transaction status of the second transaction is the first status, the target data comprising data in a state machine of the first node, the target data being related to the first transaction.

20 Claims, 16 Drawing Sheets

(51) Int. Cl.
    *G06F 16/27* (2019.01)
    *H04L 9/32* (2006.01)
    *H04L 9/00* (2022.01)
(52) U.S. Cl.
    CPC .............. *H04L 9/3239* (2013.01); *H04L 9/50* (2022.05); *H04L 2209/56* (2013.01)

(56) References Cited

U.S. PATENT DOCUMENTS

2019/0236698 A1* 8/2019 Postrel .................. G06Q 40/04
2021/0336768 A1* 10/2021 Davis .................... H04L 9/0637

FOREIGN PATENT DOCUMENTS

| CN | 108848119 A | 11/2018 |
| CN | 109150943 A | 1/2019 |
| CN | 109426949 A | 3/2019 |
| GB | 2570301 A | 7/2019 |
| WO | 2018232494 A1 | 12/2018 |
| WO | 2019001214 A1 | 1/2019 |

OTHER PUBLICATIONS

Thomas Hardjono et al, Towards a Design Philosophy for Interoperable Blockchain Systems, arXiv: 1805.05934v1 [cs. CR] May 15, 2018, 27 pages.

* cited by examiner

CROSS-CHAIN TRANSACTION METHOD AND APPARATUS

CROSS-REFERENCE TO RELATED APPLICATIONS

This application a continuation of International Application PCT/CN2020/104551, filed on Jul. 24, 2020, which claims priority to Chinese Patent Application No. 201910683735.1, filed on Jul. 26, 2019, and to Chinese Patent Application No. 201911129391.6, filed on Nov. 18, 2019. All of the aforementioned patent applications are hereby incorporated by reference in their entireties.

TECHNICAL FIELD

This application relates to the field of internet technologies, and in particular, to a cross-chain transaction method and apparatus.

BACKGROUND

In a blockchain system, data is stored in a block. Newly written data forms a new block and is added to an end of a current blockchain. When storing data, each block further needs to store a unique number (usually a hash value of all recorded data) corresponding to all recorded data in a previous block, to form a chain. Therefore, the blockchain system may be considered as a system in which computers that do not fully trust each other on a distributed network jointly maintain a set of traceable and tamper-proof chain data according to a consensus rule.

In a scenario, a cross-chain transaction between blockchains may refer to that a user A uses an asset of the user A on a blockchain 1 to pay a user B on a blockchain 2 for several assets on the blockchain 2. In this case, the cross-chain transaction may include two associated cross-chain transactions (a first transaction and a second transaction). The first transaction refers to that the user A deducts several assets, and the second transaction refers to that the user B adds several assets.

An implementation solution in the prior art is as follows: An intermediate chain is determined to play a role of a man-in-the-middle. The user A initiates a transaction on the blockchain 1. After determining that the first transaction is successfully executed on the blockchain 1, the intermediate chain initiates a transaction to the blockchain 2, so that the second transaction is executed on the blockchain 2. If the second transaction fails due to some reasons, a succeeded transaction (the first transaction) needs to be canceled. However, the succeeded transaction may fail to be canceled. Consequently, only part of associated cross-chain transactions is successfully executed, and the other part is not successfully executed.

In conclusion, currently, a cross-chain transaction method is urgently required, to implement atomic execution of the associated cross-chain transactions on a plurality of blockchains.

SUMMARY

According to a first aspect, this application provides a cross-chain transaction method, and the method includes:

A first node determines that a transaction status of a first transaction is a first status, where the first status indicates that consensus verification on the transaction succeeds;

the first node obtains a transaction status of a second transaction; and when the transaction status of the second transaction is the first status, the first node modifies a state machine of the first node based on transaction data of the first transaction.

In a possible design of the first aspect, that the first node obtains a transaction status of a second transaction includes:

The first node obtains a first block on a third blockchain, where the first node and a third node maintain the third blockchain, and the first block includes the transaction status of the second transaction.

In a possible design of the first aspect, the method further includes:

The first node sends a third transaction to the third node, where the third transaction includes the transaction status of the first transaction.

In a possible design of the first aspect, the method further includes:

The first node sends a fourth transaction to the third node, where the fourth transaction includes timeout information, and the first node and the third node maintain the third blockchain; and when the first node does not obtain the transaction status of the second transaction, but obtains a second block that includes the timeout information and that is on the third blockchain, the first node does not modify the state machine of the first node based on the transaction data of the first transaction.

In a possible design of the first aspect, the method further includes:

The first node receives the transaction data of the first transaction.

That a first node determines that a transaction status of a first transaction is a first status includes:

The first node performs the consensus verification on the first transaction;

when the consensus verification on the first transaction succeeds, the first node determines that the transaction status of the first transaction is the first status; and the first node adds a third block to a first blockchain, where the third block includes the transaction data of the first transaction, and the first node maintains the first blockchain.

In a possible design of the first aspect, the method further includes:

The first node obtains a first transaction identifier of the second transaction;

the first node obtains a fourth block on the third blockchain, where the fourth block includes a second transaction identifier of the second transaction; and the first node determines, based on the fourth block, whether the first transaction identifier of the second transaction is equal to the second transaction identifier of the second transaction.

In a possible design of the first aspect, the method further includes:

The first node obtains a first transaction identifier of the first transaction; and the first node sends the fourth transaction to the third node, where the fourth transaction includes the first transaction identifier of the first transaction.

In a possible design of the first aspect, after the first node modifies the state machine of the first node based on the transaction data of the first transaction, the method further includes:

the first node broadcasts synchronization information to a fourth node, where the synchronization information is used to indicate that the first node has modified the state machine of the first node, and the first node and the fourth node belong to a same node cluster.

According to a second aspect, this application provides a cross-chain transaction method, and the method includes:

A first node determines that a transaction status of a first transaction is a first status, where the first status indicates that consensus verification on the transaction succeeds;

the first node obtains a transaction status of a second transaction; and when the transaction status of the second transaction is a third status, the first node does not modify a state machine of the first node based on transaction data of the first transaction.

In a possible design of the second aspect, that the first node obtains a transaction status of a second transaction includes:

The first node obtains a first block on a third blockchain, where the first node and a third node maintain the third blockchain, and the first block includes the transaction status of the second transaction.

In a possible design of the second aspect, the method further includes:

The first node sends a third transaction to the third node, where the third transaction includes the transaction status of the first transaction.

In a possible design of the second aspect, the method further includes:

The first node sends a fourth transaction to the third node, where the fourth transaction includes timeout information, and the first node and the third node maintain the third blockchain; and when the first node does not obtain the transaction status of the second transaction, but obtains a second block that includes the timeout information and that is on the third blockchain, the first node does not modify the state machine of the first node based on the transaction data of the first transaction.

In a possible design of the second aspect, the method further includes:

The first node receives the transaction data of the first transaction; and

That a first node determines that a transaction status of a first transaction is a first status includes:

The first node performs the consensus verification on the first transaction;

when the consensus verification on the first transaction succeeds, the first node determines that the transaction status of the first transaction is the first status; and the first node adds a third block to a first blockchain, where the third block includes the transaction data of the first transaction, and the first node maintains the first blockchain.

In a possible design of the second aspect, the method further includes:

The first node obtains a first transaction identifier of the second transaction;

the first node obtains a fourth block on the third blockchain, where the fourth block includes a second transaction identifier of the second transaction; and the first node determines, based on the fourth block, whether the first transaction identifier of the second transaction is equal to the second transaction identifier of the second transaction.

In a possible design of the second aspect, the method further includes:

The first node obtains a first transaction identifier of the first transaction; and the first node sends the fourth transaction to the third node, where the fourth transaction includes the first transaction identifier of the first transaction.

According to a third aspect, this application provides a cross-chain transaction apparatus, and the cross-chain transaction apparatus includes:

a processing module, configured to determine that a transaction status of a first transaction is a first status, where the first status indicates that consensus verification on the transaction succeeds, and an obtaining module, configured to obtain a transaction status of a second transaction.

The processing module is further configured to: when the transaction status of the second transaction is the first status, modify a state machine of the cross-chain transaction apparatus based on transaction data of the first transaction.

In a possible design of the third aspect, the obtaining module is specifically configured to:

obtain a first block on a third blockchain, where the cross-chain transaction apparatus and a third node maintain the third blockchain, and the first block includes the transaction status of the second transaction.

In a possible design of the third aspect, the cross-chain transaction apparatus further includes:

a sending module, configured to send a third transaction to the third node, where the third transaction includes the transaction status of the first transaction.

In a possible design of the third aspect, the sending module is further configured to send a fourth transaction to the third node, where the fourth transaction includes timeout information, and the cross-chain transaction apparatus and the third node maintain the third blockchain.

The processing module is further configured to: when the cross-chain transaction apparatus does not obtain the transaction status of the second transaction, but obtains a second block that includes the timeout information and that is on the third blockchain, skip modifying the state machine of the cross-chain transaction apparatus based on the transaction data of the first transaction.

In a possible design of the third aspect, the apparatus further includes:

a receiving module, where the receiving module is configured to receive the transaction data of the first transaction.

The processing module is specifically configured to:
perform the consensus verification on the first transaction;
when the consensus verification on the first transaction succeeds, determine that the transaction status of the first transaction is the first status; and
add a third block to a first blockchain, where the third block includes the transaction data of the first transaction, and the cross-chain transaction apparatus maintains the first blockchain.

In a possible design of the third aspect, the obtaining module is further configured to:

obtain a first transaction identifier of the second transaction; and obtain a fourth block on the third blockchain, where the
fourth block includes a second transaction identifier of
the second transaction.

The processing module is further configured to:
determine, based on the fourth block, whether the first
transaction identifier of the second transaction is equal
to the second transaction identifier of the second transaction.

In a possible design of the third aspect, the obtaining module is further configured to:
obtain a first transaction identifier of the first transaction.

The sending module is further configured to:
send the fourth transaction to the third node, where the
fourth transaction includes the first transaction identifier of the first transaction.

In a possible design of the third aspect, the sending module is further configured to:
broadcast synchronization information to a fourth node,
where the synchronization information is used to indicate that the cross-chain transaction apparatus has
modified the state machine of the cross-chain transaction apparatus, and the cross-chain transaction apparatus and the fourth node belong to a same node cluster.

According to a fourth aspect, this application provides a cross-chain transaction apparatus, and the cross-chain transaction apparatus includes:
a processing module, configured to determine that a
transaction status of a first transaction is a first status,
where the first status indicates that consensus verification on the transaction succeeds, and
an obtaining module, configured to obtain a transaction
status of a second transaction.

The processing module is further configured to: when the transaction status of the second transaction is a third status, skip modifying a state machine of the cross-chain transaction apparatus based on transaction data of the first transaction.

In a possible design of the fourth aspect, the obtaining module is specifically configured to:
obtain a first block on a third blockchain, where the
cross-chain transaction apparatus and a third node
maintain the third blockchain, and the first block
includes the transaction status of the second transaction.

In a possible design of the fourth aspect, the first transaction and the second transaction are associated cross-chain transactions.

In a possible design of the fourth aspect, the cross-chain transaction apparatus further includes:
a sending module, configured to send a third transaction
to the third node, where the third transaction includes
the transaction status of the first transaction.

In a possible design of the fourth aspect, the sending module is further configured to send a fourth transaction to the third node, where the fourth transaction includes timeout information, and the cross-chain transaction apparatus and the third node maintain the third blockchain.

The processing module is further configured to: when the cross-chain transaction apparatus does not obtain the transaction status of the second transaction, but obtains a second block that includes the timeout information and that is on the third blockchain, skip modifying the state machine of the cross-chain transaction apparatus based on the transaction data of the first transaction.

In a possible design of the fourth aspect, the apparatus further includes:
a receiving module, where the receiving module is configured to receive the transaction data of the first
transaction.

The processing module is specifically configured to:
perform the consensus verification on the first transaction;
when the consensus verification on the first transaction
succeeds, determine that the transaction status of the
first transaction is the first status; and
add a third block to a first blockchain, where the third
block includes the transaction data of the first transaction, and the cross-chain transaction apparatus maintains the first blockchain.

In a possible design of the fourth aspect, the obtaining module is further configured to:
obtain a first transaction identifier of the second transaction; and
obtain a fourth block on the third blockchain, where the
fourth block includes a second transaction identifier of
the second transaction.

The processing module is further configured to:
determine, based on the fourth block, whether the first
transaction identifier of the second transaction is equal
to the second transaction identifier of the second transaction.

In a possible design of the fourth aspect, the obtaining module is further configured to:
obtain a first transaction identifier of the first transaction.

The sending module is further configured to:
send the fourth transaction to the third node, where the
fourth transaction includes the first transaction identifier of the first transaction.

According to a fifth aspect, this application provides a cross-chain transaction method, and the method includes:
A first node obtains a first transaction identifier of a
second transaction, where the second transaction is a transaction on a second blockchain, the second transaction and a first transaction are associated cross-chain transactions, the first transaction is a transaction on a first blockchain, and the first node maintains the first blockchain;
the first node receives a first block sent by a third node,
where the first block includes a second transaction
identifier of the second transaction; and
the first node determines, based on the first block, whether
the first transaction identifier of the second transaction
is equal to the second transaction identifier of the
second transaction.

In a possible design of the fifth aspect, the method further includes:
The first node sends the first transaction identifier of the
second transaction to the third node.

In a possible design of the fifth aspect, the method further includes:
The first node obtains a first transaction identifier of the
first transaction; and
the first node sends the first transaction identifier of the
first transaction to the third node.

In a possible design of the fifth aspect, the first block further includes a second transaction identifier of the first transaction.

The method further includes:
the first node determines, based on the first block, whether
the first transaction identifier of the first transaction is
equal to the second transaction identifier of the first
transaction.

According to a sixth aspect, this application provides a cross-chain transaction method, and the method includes:
  receiving a first transaction identifier that is of a first transaction and that is sent by a first node, where the first node maintains a first blockchain, and the first transaction is a transaction on the first blockchain;
  receiving a second transaction identifier that is of a second transaction and that is sent by a second node, where the second node maintains a second blockchain, the first transaction and the second transaction are associated cross-chain transactions, and the second transaction is a transaction on the second blockchain;
  generating a first block, where the first block includes the second transaction identifier of the second transaction;
  generating a second block, where the second block includes the first transaction identifier of the first transaction;
  sending the first block to the first node; and
  sending the second block to the second node.

In a possible design of the sixth aspect, the method further includes:
  receiving a first transaction identifier that is of the second transaction and that is sent by the first node.
  The second block further includes the first transaction identifier of the second transaction.

In a possible design of the sixth aspect, the method further includes:
  receiving a second transaction identifier that is of the first transaction and that is sent by the second node.
  The first block further includes the second transaction identifier of the first transaction.

According to a seventh aspect, this application provides a cross-chain transaction apparatus. The cross-chain transaction apparatus is a cross-chain transaction apparatus in which a first node is located, and the cross-chain apparatus includes:
  an obtaining module, configured to obtain a first transaction identifier of a second transaction, where the second transaction is a transaction on a second blockchain, the second transaction and a first transaction are associated cross-chain transactions, the first transaction is a transaction on a first blockchain, and the first node maintains the first blockchain; and receive a first block sent by a third node, where the first block includes a second transaction identifier of the second transaction; and
  a processing module, configured to determine, based on the first block, whether the first transaction identifier of the second transaction is equal to the second transaction identifier of the second transaction.

In a possible design of the seventh aspect, the apparatus further includes:
  a sending module, configured to send the first transaction identifier of the second transaction to the third node.

In a possible design of the seventh aspect, the obtaining module is further configured to:
  obtain a first transaction identifier of the first transaction.
  The sending module is further configured to send the first transaction identifier of the first transaction to the third node.

In a possible design of the seventh aspect, the first block further includes a second transaction identifier of the first transaction.
  The processing module is specifically configured to determine, based on the first block, whether the first transaction identifier of the first transaction is equal to the second transaction identifier of the first transaction.

According to an eighth aspect, this application provides a cross-chain transaction apparatus. The cross-chain transaction apparatus is a cross-chain transaction apparatus in which a third node is located, and the cross-chain apparatus includes:
  a receiving module, configured to receive a first transaction identifier that is of a first transaction and that is sent by a first node, where the first node maintains a first blockchain, and the first transaction is a transaction on the first blockchain; and receive a second transaction identifier that is of a second transaction and that is sent by a second node, where the second node maintains a second blockchain, the first transaction and the second transaction are associated cross-chain transactions, and the second transaction is a transaction on the second blockchain;
  a processing module, configured to generate a first block, where the first block includes the second transaction identifier of the second transaction; and generate a second block, where the second block includes the first transaction identifier of the first transaction; and
  a sending module, configured to send the first block to the first node, and send the second block to the second node.

In a possible design of the eighth aspect, the receiving module is further configured to receive a first transaction identifier that is of the second transaction and that is sent by the first node.
  The second block further includes the first transaction identifier of the second transaction.

In a possible design of the eighth aspect, the receiving module is further configured to receive a second transaction identifier that is of the first transaction and that is sent by the second node.
  The first block further includes the second transaction identifier of the first transaction.

According to a ninth aspect, an embodiment of this application provides a cross-chain transaction method, including:
  receiving transaction data of a first transaction, where the transaction data of the first transaction includes a target transaction parameter;
  receiving transaction data of a second transaction; and
  if the transaction data of the second transaction includes the target transaction parameter, determining that a transaction status of the second transaction is invalid.

In a possible design of the ninth aspect, the first transaction and a third transaction are associated cross-chain transactions. The second transaction and a fourth transaction are associated cross-chain transactions. The first transaction and the second transaction are transactions on a first blockchain. The third transaction and the fourth transaction are transactions on a second blockchain.

According to a tenth aspect, an embodiment of this application provides a cross-chain transaction apparatus, including:
  a receiving module, configured to receive transaction data of a first transaction, where the transaction data of the first transaction includes a target transaction parameter; and receive transaction data of a second transaction; and
  a processing module, configured to: if the transaction data of the second transaction includes the target transaction parameter, determine that a transaction status of the second transaction is invalid.

In a possible design of the tenth aspect, the first transaction and a third transaction are associated cross-chain transactions, and the second transaction and a fourth transaction are associated cross-chain transactions. The first transaction and the second transaction are transactions on a first blockchain. The third transaction and the fourth transaction are transactions on a second blockchain.

According to an eleventh aspect, an embodiment of this application provides a cross-chain transaction apparatus, including a memory, a transceiver, a processor, and a bus system. The memory is configured to store a program and an instruction. The transceiver is configured to receive or send information under control of the processor. The processor is configured to execute the program in the memory. The bus system is configured to connect the memory, the transceiver, and the processor, so that the memory, the transceiver, and the processor communicate with each other. The processor is configured to invoke a program instruction in the memory, to perform the method according to the first aspect, the second aspect, the fifth aspect, the sixth aspect, or the ninth aspect.

According to a twelfth aspect, an embodiment of this application provides a computer-readable storage medium. The computer-readable storage medium stores an instruction. When the instruction is run on a computer, the computer is enabled to perform the method according to the first aspect, the second aspect, the fifth aspect, the sixth aspect, or the ninth aspect.

This application provides a cross-chain transaction method, including: A first node determines that a transaction status of a first transaction is a first status. The first status indicates that consensus verification on the transaction succeeds. The first node obtains a transaction status of a second transaction. When the transaction status of the second transaction is the first status, the first node modifies a state machine of the first node based on transaction data of the first transaction. In the foregoing manner, after determining that the transaction status of the first transaction is the first status, the first node does not directly determine, based on the first status, whether to modify the state machine of the first node, but receives the transaction status of the second transaction, and modifies the state machine of the first node when the transaction status of the second transaction is the first status. Therefore, whether a cross-chain sub-transaction (the first transaction) is executed depends not only on a consensus verification result of the first transaction, but also on a consensus verification result of another associated cross-chain transaction. A case in which only part of associated cross-chain transactions is successfully executed and the other part is not successfully executed does not occur. In this way, atomic execution of the cross-chain transactions on a plurality of blockchains is implemented.

In addition, an embodiment of this application provides a cross-chain transaction method, to implement atomic execution of a cross-chain transaction on a plurality of blockchains.

According to a thirteenth aspect, this application provides a cross-chain transaction method, applied to a first node. The first node maintains a first blockchain, and a first transaction belongs to the first blockchain. The first transaction and a second transaction are associated cross-chain transactions. The second transaction belongs to a second blockchain, and a second node maintains the second blockchain. The method includes: The first node determines that a transaction status of the first transaction is a first status. The first status indicates that consensus verification on the transaction succeeds. The first node obtains a transaction status of the second transaction. When the transaction status of the second transaction is the first status, the first node modifies target data based on transaction data of the first transaction. The target data is data that is in a state machine of the first node and that is related to the first transaction. In this embodiment, if a transaction belongs to a blockchain, a node that maintains the blockchain participates in construction of the blockchain. For example, the node may perform at least one of the following behaviors: transaction generation, transaction data consensus, execution of a transaction-related smart contract, generation of a transaction-related block, and modification of target data in a transaction-related state machine. In addition, the node may obtain transaction data from the maintained blockchain. The transaction data may indicate specific content of the transaction or describe transaction details. For example, data indicating only a transaction status, such as data indicating whether the transaction is successfully executed, should not be understood as the transaction data in this application. The first transaction and the second transaction may be associated. For example, the first transaction and the second transaction are different sub-transactions of a same transaction. Specifically, the transaction data of the first transaction and transaction data of the second transaction have identifiers indicating association between the first transaction and the second transaction, for example, may have a same or associated identifier ID. In this embodiment, the first node may actively initiate modification of the target data in the state machine of the first node based on the transaction status of the second transaction. The target data may be a field that is in the state machine of the first node and that is related to the transaction status of the first transaction. For example, the target data may include one or more types of transaction data described above. In a financial transfer scenario, the target data may be an account balance. For example, A transfers X units of currency to B, the first transaction is that an account balance of A is reduced by X units of currency, and the second transaction is that an account balance of B is increased by X units of currency. In this case, the target data is the account balance of A. In an invoice issuing scenario, the target data may be an invoice amount. For example, A issues an invoice with an amount of X units to B, the first transaction is that A issues the invoice with the amount of X units to B, and the second transaction is that B receives the invoice with the amount of X units issued by A. In this case, the target data is the amount of the invoice issued from A to B. In a scenario in which a currency is exchanged for goods, the target data may be an account balance or a quantity of goods. For example, if A transfers X units of currency to B, and B transfers Y units of goods to A, the first transaction is that an account balance of A is reduced by X units of currency, and the second transaction is that Y units of goods are reduced for B. In this case, the target data is the account balance of A.

In a possible design of the thirteenth aspect, that the first node obtains a transaction status of the second transaction includes: The first node obtains a first block including the transaction status of the second transaction. The first block is from a third node, and the third node does not maintain the first blockchain and the second blockchain. In this embodiment, that the third node does not maintain the first blockchain and the second blockchain may be understood as that the third node cannot obtain data from the first blockchain and the second blockchain. It should be noted that, that the third node does not maintain the first blockchain and the second blockchain may be understood as that the third node cannot obtain the transaction data of the first transaction and the transaction data of the second transaction from the first blockchain and the second blockchain. From another perspective, the third node does not provide a hardware resource for calculation of the first transaction and calculation of the second transaction. It should be noted that the third node does not maintain the first blockchain and the second blockchain may be understood as that the third node does not perform the following behaviors: generation of the first transaction, generation of the second transaction, consensus on the transaction data of the first transaction and the transaction data of the second transaction, execution of a smart contract related to the first transaction and the second transaction, and modification of target data in a state machine related to the first transaction and the second transaction.

In a possible design of the thirteenth aspect, the method further includes:

The first node sends the transaction status of the first transaction to the third node, where the third node does not maintain the first blockchain and the second blockchain.

In a possible design of the thirteenth aspect, that the first node sends the transaction status of the first transaction to the third node includes:

The first node sends a third transaction to the third node, where the third transaction includes the transaction status of the first transaction.

In a possible design of the thirteenth aspect, the method further includes:

The first node sends a fifth transaction to the third node, where the fifth transaction includes timeout information, and the timeout information is used to indicate that the third node does not receive the transaction status of the second transaction from the second node; and when the first node does not obtain the transaction status of the second transaction, but obtains a second block that includes the timeout information and that is on a third blockchain, the first node does not modify, based on the transaction data of the first transaction, the target data that is in the state machine of the first node and that is related to the first transaction. In this embodiment, the first node may not modify, based on the transaction data of the first transaction, the target data that is in the state machine of the first node and that is related to the first transaction, but may modify, based on other information, the target data that is in the state machine of the first node and that is related to the first transaction. Alternatively, the target data that is in the state machine of the first node and that is related to the first transaction may not be modified.

In a possible design of the thirteenth aspect, the method further includes:

The first node obtains a first hash of the second transaction through calculation, or receives the first hash that is of the second transaction and that is sent by a first client, where the first client is an initiator of the first transaction; and the first node receives a second hash that is of the second transaction and that is sent by the third node.

If the first hash of the second transaction is equal to the second hash of the second transaction, it indicates that transaction data of the second transaction is correct. If the first hash of the second transaction is not equal to the second hash of the second transaction, it indicates that the transaction data of the second transaction is incorrect.

In a possible design of the thirteenth aspect, the method further includes:

The first node obtains a first hash of the first transaction through calculation, or receives the first hash that is of the first transaction and that is sent by the first client; and the first node sends the first hash of the first transaction to the third node.

In a possible design of the thirteenth aspect, after the first node modifies, based on the transaction data of the first transaction, the target data that is in the state machine of the first node and that is related to the first transaction, the method further includes:

The first node broadcasts synchronization information to a fourth node, where the synchronization information is used to indicate that the first node has modified, based on the transaction data of the first transaction, the target data that is in the state machine of the first node and that is related to the first transaction, and the first node and the fourth node belong to a same node cluster.

According to a fourteenth aspect, this application provides a cross-chain transaction method, and the method includes:

A third node receives a transaction status that is of a second transaction and that is sent by a second node, where the second node maintains a second blockchain, and the second transaction belongs to the second blockchain; and the third node sends the transaction status of the second transaction to a first node, so that the first node processes target data based on the transaction status of the second transaction and a transaction status of a first transaction, where the target data is data that is in a state machine of the first node and that is related to the first transaction, the second transaction and the first transaction are associated cross-chain transactions, the first transaction belongs to a first blockchain, the first node maintains the first blockchain, and the third node does not maintain the first blockchain and the second blockchain.

In a possible design of the fourteenth aspect, the method further includes:

The third node generates a first block including the transaction status of the second transaction.

In a possible design of the fourteenth aspect, the method further includes:

The third node receives a transaction sent by at least one fifth node.

That the third node generates a first block including the transaction status of the second transaction includes:

The third node sorts (orders), based on a time at which the transaction sent by the at least one fifth node is received and a time at which the transaction status of the second transaction is received, the transaction sent by the at least one fifth node and the transaction status of the second transaction, to generate at least one block, where the first block is one of the at least one block, and the first block includes the transaction status of the second transaction.

In a possible design of the fourteenth aspect, that the third node sends the transaction status of the second transaction to a first node includes:

The third node sends the first block to the first node.

In a possible design of the fourteenth aspect, that a third node receives a transaction status that is of a second transaction and that is sent by a second node includes:

The third node receives a fourth transaction sent by the second node, where the fourth transaction includes the transaction status of the second transaction.

In a possible design of the fourteenth aspect, the method further includes:

The third node receives a second hash that is of the second transaction and that is sent by the second node; and the third node sends the second hash of the second transaction to the first node, so that the first node determines correctness of transaction data of the second transaction based on the second hash of the second transaction and a first hash of the second transaction, where the first hash of the second transaction is obtained by the first node through calculation or is from a first client, and the first client is an initiator of the first transaction.

According to a fifteenth aspect, this application provides a cross-chain transaction method, applied to a cross-chain transaction system. The cross-chain transaction system includes a first node, a second node, and a third node. The first node maintains a first blockchain, and a first transaction belongs to the first blockchain. The first transaction and a second transaction are associated cross-chain transactions. The second transaction belongs to a second blockchain, and the second node maintains the second blockchain. The third node does not maintain the first blockchain and the second blockchain. The method includes:

The first node determines that a transaction status of the first transaction is a first status, where the first status indicates that consensus verification on the transaction succeeds;

the second node sends a transaction status of the second transaction to the third node;

the third node sends the transaction status of the second transaction to the first node; and when the transaction status of the second transaction is the first status, modifying, by the first node, target data based on transaction data of the first transaction, where the target data is data that is in a state machine of the first node and that is related to the first transaction.

In a possible design of the fifteenth aspect, the method further includes:

The third node generates a first block including the transaction status of the second transaction.

In a possible design of the fifteenth aspect, the method further includes:

The third node receives a transaction sent by at least one fifth node.

That the third node generates a first block including the transaction status of the second transaction includes:

The third node sorts, based on a time at which the transaction sent by the at least one fifth node is received and a time at which the transaction status of the second transaction is received, the transaction sent by the at least one fifth node and the transaction status of the second transaction, to generate at least one block, where the first block is one of the at least one block, and the first block includes the transaction status of the second transaction.

In a possible design of the fifteenth aspect, that the third node sends the transaction status of the second transaction to the first node includes:

The third node sends the first block to the first node.

In a possible design of the fifteenth aspect, that the second node sends a transaction status of the second transaction to the third node includes:

The second node sends a fourth transaction to the third node, where the fourth transaction includes the transaction status of the second transaction.

In a possible design of the fifteenth aspect, that the first node sends the transaction status of the first transaction to the third node includes:

The first node sends a third transaction to the third node, where the third transaction includes the transaction status of the first transaction.

In a possible design of the fifteenth aspect, the method further includes:

The first node obtains a first hash of the second transaction through calculation, or receives the first hash that is of the second transaction and that is sent by a first client, where the first client is an initiator of the first transaction;

the third node receives a second hash that is of the second transaction and that is sent by the second node; and the first node receives the second hash that is of the second transaction and that is sent by the third node.

If the first hash of the second transaction is equal to the second hash of the second transaction, it indicates that transaction data of the second transaction is correct. If the first hash of the second transaction is not equal to the second hash of the second transaction, it indicates that the transaction data of the second transaction is incorrect.

In a possible design of the fifteenth aspect, the cross-chain transaction system further includes a fourth node, and the first node and the fourth node belong to a same node cluster. After the first node modifies, based on the transaction data of the first transaction, the target data that is in the state machine of the first node and that is related to the first transaction, the method further includes:

The first node broadcasts synchronization information to the fourth node, where the synchronization information is used to indicate that the first node has modified, based on the transaction data of the first transaction, the target data that is in the state machine of the first node and that is related to the first transaction.

According to a sixteenth aspect, this application provides a first node. The first node maintains a first blockchain, and a first transaction belongs to the first blockchain. The first transaction and a second transaction are associated cross-chain transactions. The second transaction belongs to a second blockchain, and a second node maintains the second blockchain. The first node includes:

a processing module, configured to determine that a transaction status of the first transaction is a first status, where the first status indicates that consensus verification on the transaction succeeds, and an obtaining module, configured to obtain a transaction status of the second transaction.

The processing module is further configured to: when the transaction status of the second transaction is the first status, modify target data based on transaction data of the first transaction, where the target data is data that is in a state machine of the first node and that is related to the first transaction.

In a possible design of the sixteenth aspect, the obtaining module is specifically configured to:

receive the transaction status that is of the second transaction and that is sent by a third node, where the third node does not maintain the first blockchain and the second blockchain.

In a possible design of the sixteenth aspect, the first node further includes:

a sending module, configured to send the transaction status of the first transaction to the third node, where the third node does not maintain the first blockchain and the second blockchain.

In a possible design of the sixteenth aspect, the sending module is specifically configured to:

send a third transaction to the third node, where the third transaction includes the transaction status of the first transaction.

In a possible design of the sixteenth aspect, the processing module is further configured to:

obtain a first hash of the second transaction through calculation.

Alternatively, the receiving module is specifically configured to receive the first hash that is of the second transaction and that is sent by a first client, where the first client is an initiator of the first transaction.

The receiving module is specifically configured to receive a second hash that is of the second transaction and that is sent by the third node.

If the first hash of the second transaction is equal to the second hash of the second transaction, it indicates that transaction data of the second transaction is correct. If the first hash of the second transaction is not equal to the second hash of the second transaction, it indicates that the transaction data of the second transaction is incorrect.

In a possible design of the sixteenth aspect, the processing module is further configured to:
obtain a first hash of the first transaction through calculation.

Alternatively, the receiving module is specifically configured to receive the first hash that is of the first transaction and that is sent by the first client.

The sending module is further configured to send the first hash of the first transaction to the third node.

In a possible design of the sixteenth aspect, the sending module is further configured to:
broadcast synchronization information to a fourth node, where the synchronization information is used to indicate that the first node has modified, based on the transaction data of the first transaction, the target data that is in the state machine of the first node and that is related to the first transaction, and the first node and the fourth node belong to a same node cluster.

According to a seventeenth aspect, this application provides a third node. The third node includes:
a receiving module, configured to receive a transaction status that is of a second transaction and that is sent by a second node, where the second node maintains a second blockchain, and the second transaction belongs to the second blockchain; and
a sending module, configured to send the transaction status of the second transaction to a first node, so that the first node processes target data based on the transaction status of the second transaction and a transaction status of a first transaction, where the target data is data that is in a state machine of the first node and that is related to the first transaction, the second transaction and the first transaction are associated cross-chain transactions, the first transaction belongs to a first blockchain, the first node maintains the first blockchain, and the third node does not maintain the first blockchain and the second blockchain.

In a possible design of the seventeenth aspect, the third node further includes:
a processing module, configured to generate a first block including the transaction status of the second transaction.

In a possible design of the seventeenth aspect, the receiving module is further configured to:
receive a transaction sent by at least one fifth node.

The processing module is specifically configured to:
sort, based on a time at which the transaction sent by the at least one fifth node is received and a time at which the transaction status of the second transaction is received, the transaction sent by the at least one fifth node and the transaction status of the second transaction, to generate at least one block, where the first block is one of the at least one block, and the first block includes the transaction status of the second transaction.

In a possible design of the seventeenth aspect, the sending module is specifically configured to:
send the first block to the first node.

In a possible design of the seventeenth aspect, the receiving module is specifically configured to:
receive a fourth transaction sent by the second node, where the fourth transaction includes the transaction status of the second transaction.

In a possible design of the seventeenth aspect, the receiving module is further configured to:
receive a second hash that is of the second transaction and that is sent by the second node.

The sending module is further configured to:
send the second hash of the second transaction to the first node, so that the first node determines correctness of transaction data of the second transaction based on the second hash of the second transaction and a first hash of the second transaction, where the first hash of the second transaction is obtained by the first node through calculation or is from a first client, and the first client is an initiator of the first transaction.

According to an eighteenth aspect, an embodiment of this application provides a cross-chain transaction apparatus, including a memory, a transceiver, a processor, and a bus system. The memory is configured to store a program and an instruction. The transceiver is configured to receive or send information under control of the processor. The processor is configured to execute the program in the memory. The bus system is configured to connect the memory, the transceiver, and the processor, so that the memory, the transceiver, and the processor communicate with each other. The processor is configured to invoke a program instruction in the memory, to perform the method according to the thirteenth aspect and the fourteenth aspect.

According to a nineteenth aspect, an embodiment of this application provides a computer-readable storage medium. The computer-readable storage medium stores an instruction. When the instruction is run on a computer, the computer is enabled to perform the method according to the thirteenth aspect and the fourteenth aspect.

This application provides a cross-chain transaction method, applied to a first node. The first node maintains a first blockchain, and a first transaction belongs to the first blockchain. A second transaction belongs to a second blockchain, and a second node maintains the second blockchain. The method includes: The first node determines that a transaction status of the first transaction is a first status. The first status indicates that consensus verification on the transaction succeeds. The first node obtains a transaction status of the second transaction. When the transaction status of the second transaction is the first status, the first node modifies target data based on transaction data of the first transaction. The target data is data that is in a state machine of the first node and that is related to the first transaction. In the foregoing manner, after determining that the transaction status of the first transaction is the first status, the first node does not directly determine, based on the first status, whether to modify the state machine of the first node, but receives the transaction status of the second transaction, and modifies the state machine of the first node when the transaction status of the second transaction is the first status. Therefore, whether a cross-chain sub-transaction is executed depends not only on a consensus verification result of the first transaction, but also on a consensus verification result of another associated cross-chain transaction. A case in which only part of associated cross-chain transactions is successfully executed and the other part is not successfully executed does not occur. In this way, atomic execution of the cross-chain transactions on a plurality of blockchains is implemented.

DESCRIPTION OF EMBODIMENTS

Embodiments of this application provides a cross-chain transaction method and apparatus, to implement atomic execution of a cross-chain transaction on a plurality of blockchains.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented in order or in a different order from what is illustrated or described herein. Moreover, the terms "include", "have" and any other variants mean to cover the non-exclusive inclusion, for example, a process, method, system, product, or device that includes a series of steps or units is not necessarily limited to those expressly listed steps or units, but may include other steps or units not expressly listed or inherent to such a process, method, system, product, or device.

A "blockchain" may specifically refer to a P2P network system that is achieved by each node through a consensus mechanism and that has a distributed data storage structure. Data in the blockchain is distributed in blocks that are sequentially connected. A next block includes a data digest of a previous block, and data on all or some nodes can be fully backed up based on a specific consensus mechanism (such as proof-of-work (POW), proof-of-stake (POS), delegated proof-of-stake (DPOS), or practical Byzantine fault tolerance (PBFT). The blockchain may include a public blockchain, a consortium blockchain, a private blockchain, and the like, based on a distribution form of network nodes on the blockchain. In actual application, especially in actual application of the consortium blockchain, separate blockchains are usually set for different scenarios. For example, a blockchain used in a scenario of processing a house leasing service may be different from a blockchain used in a scenario of processing a music copyright use service. In addition, for a blockchain set in a relatively large application scenario, a related service subchain is further developed for the blockchain. For example, a main blockchain used in the scenario of processing the house leasing service may be connected to a plurality of sub-blockchains of a plurality of segmented services of the house leasing service, such as a sub-blockchain specially used to record a house leasing order and a sub-blockchain specially used to record details of a leasable house. The subchains are a plurality of instances that comply with a protocol of the foregoing main blockchain. To implement a multi-blockchain network ecosystem with value interconnection and information interconnection, cross-chain data access or operation becomes a key way to resolve the problem.

Figure 1:
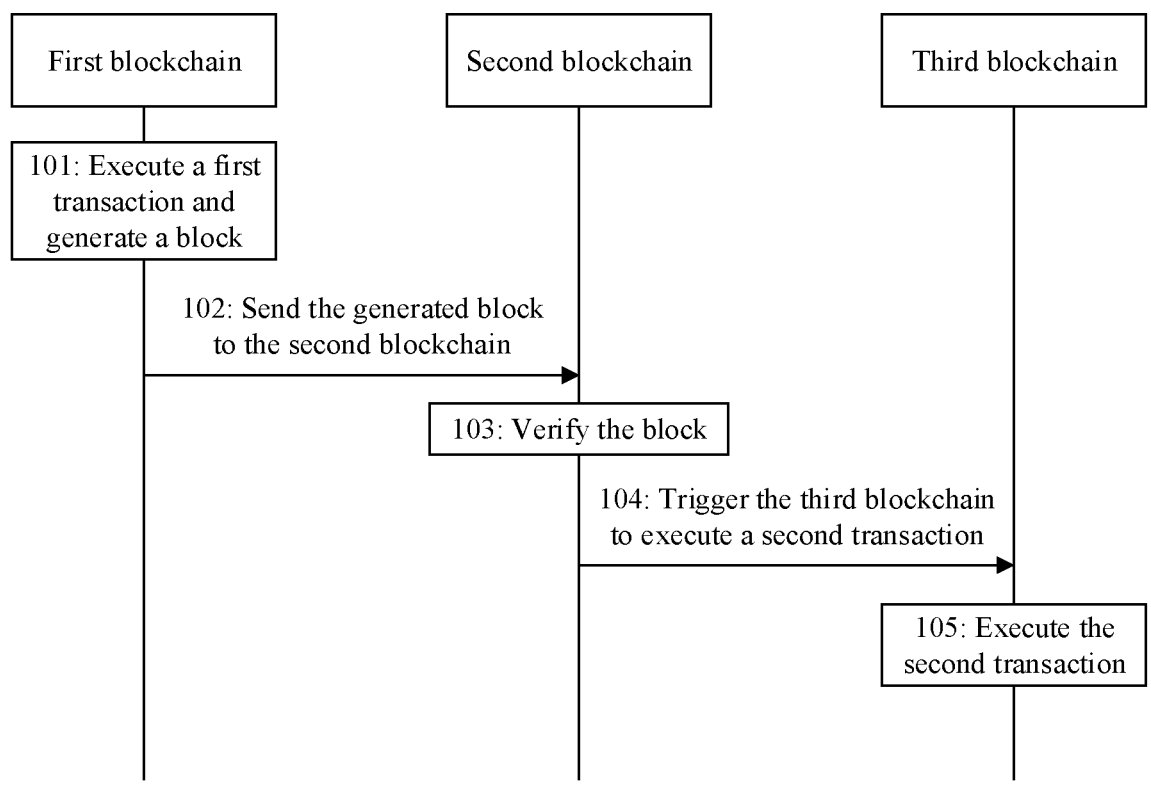
FIG. 1 is a flow diagram of a cross-chain transaction method according to an embodiment.

FIG. 1 is a flow diagram of a cross-chain transaction method according to an embodiment. As shown in FIG. 1, the cross-chain transaction method includes:

101: A first blockchain executes a first transaction, and generates a block.

102: The first blockchain sends the generated block to a second blockchain.

103: The second blockchain verifies the block, and determines whether the first transaction is successfully executed on the first blockchain.

104: If the first transaction is successfully executed on the first blockchain, the second blockchain triggers a third blockchain to execute a second transaction.

105: The third blockchain executes the second transaction.

However, if the third blockchain fails to execute the second transaction due to some reason, a succeeded transaction (the first transaction) needs to be canceled. If the first transaction fails to be canceled, only part of (the first transaction) of associated cross-chain transactions (the first transaction and the second transaction) is successfully executed, and the other part (the second transaction) is not successfully executed.

It should be noted that the execution success means that a corresponding state machine is modified based on transaction data. In other words, the execution success means that a corresponding status database is modified based on the transaction data.

To resolve the foregoing problem, an embodiment of this application provides a cross-chain transaction method. After determining that a transaction status of the first transaction is a first status, a first node does not directly determine, based on the first status, whether to modify a state machine of the first node, but receives a transaction status of the second transaction, and modifies the state machine of the first node when the transaction status of the second transaction is the first status. Therefore, whether a cross-chain sub-transaction is executed depends not only on a consensus verification result of the first transaction, but also on a consensus verification result of another associated cross-chain transaction. A case in which only part of associated cross-chain transactions is successfully executed and the other part is not successfully executed does not occur. In this way, atomic execution of the cross-chain transactions on a plurality of blockchains is implemented.

Figure 2:
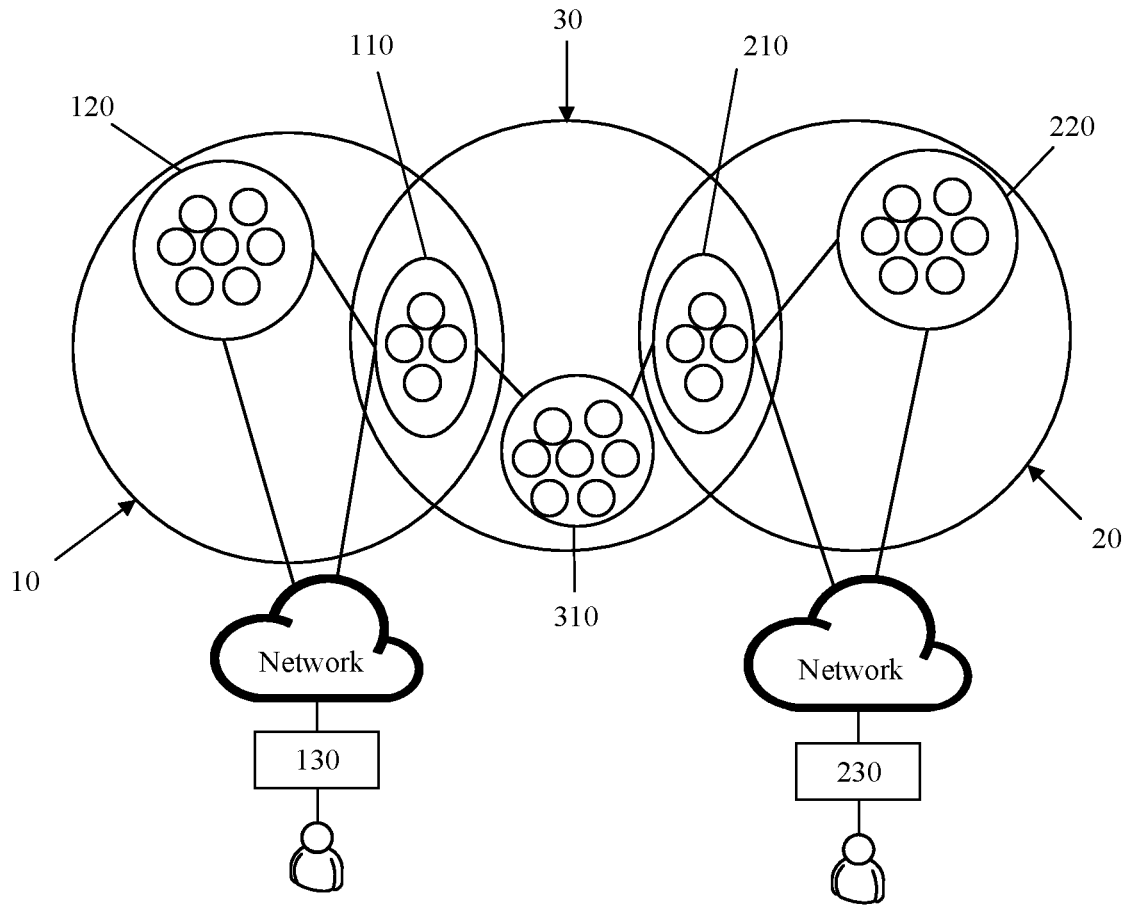
FIG. 2 is a diagram of a blockchain network according to an embodiment.

FIG. 2 is a diagram e of a blockchain network according to an embodiment.

As shown in FIG. 2, the blockchain network provided in this application includes a network 10 of a blockchain 1, a network 20 of a blockchain 2, a network 30 of a blockchain 3, a first client 130, and a second client 230.

The network of the blockchain 1 includes a node cluster 110 and a node cluster 120. The node cluster 110 includes a plurality of peer nodes, and the node cluster 120 includes a plurality of peer nodes. These peer nodes jointly maintain the blockchain 1.

The network of the blockchain 2 includes a node cluster 210 and a node cluster 220. The node cluster 210 includes a plurality of peer nodes, and the node cluster 220 includes a plurality of peer nodes. These peer nodes jointly maintain the blockchain 2.

The network 30 of the blockchain 3 includes a node cluster 310, the node cluster 110, and the node cluster 210. The node cluster 310 includes a plurality of peer nodes, the node cluster 110 includes the plurality of peer nodes, and the node cluster 210 includes the plurality of peer nodes. These peer nodes jointly maintain the blockchain 3.

The node cluster 110 may maintain both the blockchain 1 and the blockchain 3. The node cluster 210 may maintain both the blockchain 2 and the blockchain 3. This is equivalent to that the node cluster 110 may obtain data included in the blockchain 1 and data included in the blockchain 3, and the node cluster 210 may obtain data included in the blockchain 2 and the data included in the blockchain 3.

For example, a user may initiate a transaction on the first client 130. The first client 130 may generate corresponding transaction information, and send the transaction information to the node cluster 110 through a network. The node cluster 110 includes a plurality of first nodes. The first node may serve as an endorsement node to endorse the transaction information, and send an endorsement response to the first client 130 through the network.

The first client 130 may verify the endorsement response, and send the transaction information and the endorsement response to the node cluster 120. The cluster 120 may be a sorting cluster (orderer group), and includes a plurality of sorting nodes (ordering nodes). The sorting nodes may perform global sorting (ordering) on received transaction data, combine a batch of sorted transaction data to generate a block, and transmit the block to the node cluster 110. The first node may verify the block to determine validity of the transaction, and send the validity of the transaction to the cluster 310.

Similarly, the user may initiate a transaction on the second client 230. The second client 230 may generate corresponding transaction information, and send the transaction information to the cluster 210 through the network. The cluster 210 includes a plurality of second nodes. The second node may serve as an endorsement node to endorse the transaction information, and send an endorsement response to the second client 230 through the network.

The second client 230 may verify the endorsement response, and send the transaction information and the endorsement response to the node cluster 220. The cluster 220 may be a sorting cluster, and includes a plurality of sorting nodes. The sorting nodes may perform global sorting on received transaction data, combine a batch of sorted transaction data to generate a block, and transmit the block to the cluster 210. The second node may verify the block to determine validity of the transaction, and send the validity of the transaction to the cluster 310.

The cluster 310 may be a sorting cluster, and includes a plurality of third nodes. The third nodes may be sorting nodes. The sorting nodes may perform global sorting on received transaction data, combine a batch of sorted transaction data to generate a block, and transmit the block to the node cluster 110 and the cluster 210.

The node cluster 110 may send a transaction result to the first client 130 through the network. The cluster 210 may send a transaction result to the second client 230 through the network.

It should be noted that the blockchain stores a transaction list in a unit of a block, blocks on the blockchain are generated in a time sequence, and each block is used to record a transaction list generated within a period of time. All transaction lists recorded on the blockchain are ledgers (ledger). For example, a ledger recorded on the blockchain 1 is a ledger 1, a ledger recorded on the blockchain 2 is a ledger 2, and a ledger recorded on the blockchain 3 is a ledger 3. In this application, without ambiguity, the ledger and the blockchain are equivalent concepts that can be replaced with each other.

It should be noted that the foregoing system architecture is merely a logical example.

Physically, one node on the blockchain network is on one physical machine (server), or a plurality of nodes on a plurality of blockchain networks are on a same server. The node may specifically refer to one process or a series of processes running on the server. For example, a node on the network of the blockchain 1 and a node on the network of the blockchain 2 may be two processes running on one server.

The node described in this application may be a server on which the node is located.

It should be noted that the schematic diagram of the architecture of the blockchain network shown in FIG. 2 is merely an example. In actual application, another blockchain network may further be included, and the blockchain network includes a sorting node cluster and a node cluster that can maintain the blockchain 3.

It should be noted that the cross-chain transaction method provided in this application may be applied to a multi-chain system including a plurality of blockchains. The multi-chain system in the embodiments of this specification may include a plurality of homogeneous blockchains that comply with a same blockchain basic protocol, or may include heterogeneous blockchains that comply with different blockchain basic protocols. An architecture of the plurality of blockchains is not limited to a main chain-side chain architecture, a main chain-multi-subchain architecture, or a parallel multi-chain architecture.

Figure 3:
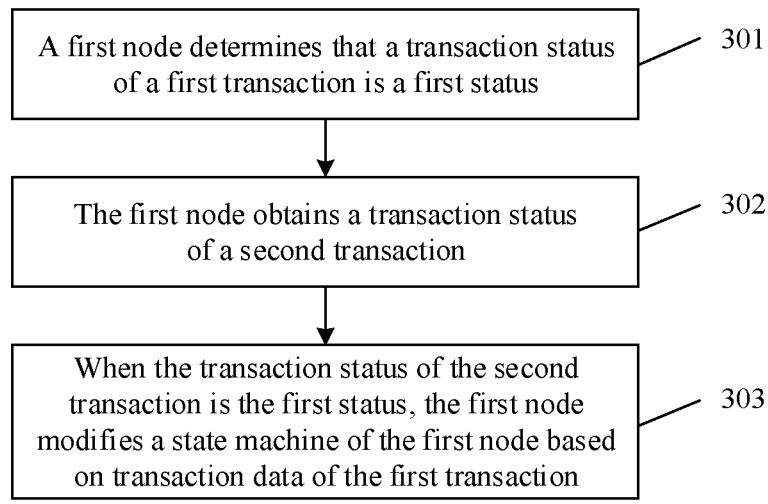
FIG. 3 is a diagram of a cross-chain transaction method according to an embodiment.

FIG. 3 is a diagram of a cross-chain transaction method according to an embodiment. As shown in FIG. 3, the cross-chain transaction method includes the following steps.

301: A first node determines that a transaction status of a first transaction is a first status, where the first status indicates that consensus verification on the transaction succeeds.

In this embodiment of this application, the first transaction and a second transaction are associated cross-chain transactions. The first transaction is a transaction on a first blockchain, and the second transaction is a transaction on a second blockchain.

The following uses an example in which the first blockchain and the second blockchain are consortium blockchains (fabric chains) for description.

For example, when a user initiates a cross-chain transaction on a first client, the cross-chain transaction includes two associated cross-chain transactions (the first transaction and the second transaction). Specifically, the user may perform a transaction operation through the first client. The first client may generate, based on the transaction operation of the user, transaction data corresponding to the first transaction. The transaction operation may be an operation that causes status changes of ledgers on the first blockchain and the second blockchain. The transaction data may include but is not limited to a user identifier, a transaction parameter (for example, a transaction amount), a transaction time, and the like. The first client may generate transaction information about the first transaction based on the transaction data corresponding to the first transaction. The transaction information may include a transaction identifier, a contract identifier and a contract method of a contract to be invoked by the transaction, the transaction data, a client signature, and the like.

It should be noted that in this embodiment of this application, the first client may further generate, based on the transaction operation of the user, transaction data corresponding to the second transaction, and send the transaction data corresponding to the second transaction to a second client. The second client may generate transaction information about the second transaction based on the transaction data corresponding to the second transaction. The transaction information may include a transaction identifier, a contract identifier and a contract method of a contract to be invoked by the transaction, the transaction data, a client signature, and the like.

The transaction identifier may be generated by the client. The transaction identifier may be used to distinguish and determine an operation that is performed on a ledger and that corresponds to the transaction. The transaction identifier may be a character string including digits and letters. In some application scenarios, for each transaction, a hash function may be used to process the transaction data, an operation that is performed on the ledger and that corresponds to the transaction, and the like. An obtained hash value is used as a transaction identifier of the transaction.

Specifically, the first client may process, according to the hash function, information such as the transaction data of the first transaction and an operation that is performed on the ledger and that corresponds to the first transaction. An obtained hash value is used as the transaction identifier of the first transaction.

It should be noted that the second client may perform an action that is the same as or similar to that of the first client, and details are not repeatedly described.

The client signature may be a signature generated by the first client based on a private key of the first client. The private key of the first client may be a hash value generated according to a hash algorithm, or a random number generated according to a random number generation function, or the like.

The contract identifier is an identifier of a smart contract, and all nodes on the blockchain comply with the smart contract. The smart contract may be an application running on a blockchain network. In some application scenarios, the smart contract is also referred to as a chaincode. The chaincode includes a system chaincode and a user chaincode. The system chaincode is used to implement system-level functions, including system configuration, user chaincode deployment and upgrade, and verification on a user transaction signature and an endorsement policy. The user chaincode is used to implement an application function of the user. The chaincode may be compiled into an independent application.

On the blockchain network, transaction data indicated by transaction information initiated by the client needs to be verified by one or more endorsement nodes.

In this embodiment of this application, after generating the transaction information about the first transaction, the first client may send the transaction information to an endorsement node in a first node cluster.

The smart contract may be pre-installed on each endorsement node. For the transaction information about the first transaction, the endorsement node may invoke the smart contract to verify the first transaction.

Optionally, in an embodiment, the endorsement node may be preset by the first client. In some application scenarios, before sending the transaction information about the first transaction to the endorsement node, the first client may invoke an endorsement policy in the smart contract, to determine, from nodes included in the first node cluster, at least one endorsement node that endorses the transaction information about the first transaction. In other words, in these application scenarios, the endorsement node may be selected, by the first client based on a preset endorsement policy, from the nodes included in the first node cluster.

After receiving the transaction information that is about the first transaction and that is sent by the first client, the endorsement node invokes related code in the smart contract to simulate execution of the first transaction indicated by the transaction information. For example, the endorsement node uses the transaction data in the transaction information about the first transaction as an input, simulates execution of the first transaction on a ledger corresponding to the endorsement node, and generates a transaction result including an execution return value, a read operation set, and a write operation set. The endorsement node may package the read operation set, the write operation set, an endorsement result (successful or failed), and an endorsement signature of the endorsement node, to generate an endorsement response. In addition, the endorsement response may further include an identifier of the client corresponding to the transaction information and the transaction identifier.

The endorsement signature of the endorsement node may be generated by the endorsement node based on a private key corresponding to the endorsement node. The private key of the endorsement node may be a hash value generated according to the hash algorithm, or a random number generated according to the random number generation function.

In this embodiment of this application, the endorsement node may send a plurality of endorsement responses to the client.

The first client may receive an endorsement response sent by each endorsement node, and then determine whether the endorsement response meets a preset rule.

Optionally, in an embodiment, the first client may match a client identifier and a transaction identifier that are included in transaction information generated based on a user operation with a client identifier and a transaction identifier in a received endorsement response sent by a preset endorsement node. If the matching succeeds, the first client further determines whether the endorsement response meets the preset rule.

Optionally, in an embodiment, the first client may determine whether the endorsement response includes information indicating that the endorsement result of the endorsement node for the transaction information about the first transaction is "successful". If it is determined that the endorsement response includes information indicating that an endorsement result of the preset endorsement node for the transaction information about the first transaction is "successful", it is determined that the endorsement response meets the preset rule. Alternatively, the first client determines whether a quantity of endorsement nodes, corresponding to a received endorsement response indicating that an endorsement result is "successful", is greater than or equal to a preset threshold. If it is determined that the quantity of endorsement nodes, corresponding to the received endorsement response indicating that the endorsement result is "successful", is greater than or equal to the preset threshold, it is determined that the endorsement response meets the preset rule. Alternatively, the first client determines whether an endorsement node whose weight is greater than a preset weight threshold is included in endorsement nodes corresponding to the received endorsement response indicating that the endorsement result is "successful". If it is determined that the endorsement node whose weight is greater than the preset weight threshold is included in the endorsement nodes corresponding to the received endorsement response indicating that the endorsement result is "successful", it is determined that the endorsement response meets the preset rule.

It should be noted that the foregoing method for determining the endorsement node and the method for verifying the transaction information about the first transaction by the endorsement node are well-known technologies that are widely studied and applied currently, and details are not described herein again.

It should be noted that there may be a plurality of endorsement nodes, and correspondingly, there may be a plurality of endorsement responses. Each endorsement response includes an endorsement signature of one endorsement node. In other words, the first client may receive a plurality of endorsement signatures.

In this embodiment of this application, after determining that the endorsement response meets the preset rule, the first client may send the transaction information about the first transaction and the plurality of endorsement signatures included in the plurality of endorsement responses to a second node cluster.

In this embodiment of this application, a node included in the second node cluster maintains the first blockchain. The second node cluster is a sorting cluster (orderer group), and includes a plurality of sorting nodes. Each sorting node may be an abstract node deployed on a server, and each sorting node may be configured to provide a sorting service in a blockchain technology.

The plurality of sorting nodes included in the second node cluster may perform global sorting on received transaction data, and combine a batch of sorted transaction data to generate a block structure.

In this embodiment, the block structure may include but is not limited to the following data: a hash value corresponding to a current block number and obtained according to the hash algorithm, a hash value corresponding to a previous block number, a timestamp, and a plurality of pieces of transaction data.

After one or more sorting nodes in the second node cluster receive N pieces of transaction information (including at least the transaction information about the first transaction and the plurality of endorsement signatures included in the plurality of endorsement responses) transmitted by the first client, the at least one sorting node may generate M corresponding blocks, sort the M blocks, and transmit the M blocks to the first node cluster, so that the first node cluster verifies the M blocks, and sequentially adds verified blocks to a corresponding blockchain.

In this embodiment of this application, a node in the first node cluster may receive a third block. The third block includes the transaction data of the first transaction and the plurality of endorsement signatures corresponding to the first transaction. It should be noted that, for ease of description, the following describes the node in the first node cluster as the first node.

The first node receives the block including the transaction data of the first transaction and the plurality of endorsement signatures corresponding to the first transaction, and may perform consensus verification on the third block. Specifically, the first node may verify the plurality of endorsement signatures, verify a transaction structure in the transaction information, perform multi-version concurrency control (MVCC) verification on the block, and the like.

If consensus verification performed by the first node on the third block succeeds, it may be determined that the transaction status of the first transaction is the first status. The first status indicates that the consensus verification on the transaction succeeds.

If consensus verification performed by the first node on the third block fails, it may be determined that the transaction status is a third status. The third status indicates that the consensus verification on the transaction fails.

Optionally, the first node may add the third block to the first blockchain, and mark the transaction status of the first transaction on the third block.

In this embodiment of this application, after determining that the transaction status of the first transaction is the first status, the first node adds the third block to the corresponding blockchain even if a transaction status of the second transaction is not determined, so that execution of a subsequent transaction is not blocked.

In the prior art, if consensus verification performed by the first node on a block succeeds, the first node marks a field that is on the block and that is related to the transaction status of the first transaction as valid, and executes the first transaction. Specifically, the first node may modify a status database (for example, an account balance and a transaction time) corresponding to the first transaction. In this case, if the transaction status of the subsequent second transaction is invalid, because data that is related to the first transaction and that is in the status database corresponding to the first transaction is modified and takes effect, the first transaction is executed, but the second transaction is not executed.

In this embodiment of this application, when determining that the consensus verification on the first transaction succeeds, the first node may mark a field that is on the third block and that is related to the transaction status of the first transaction as valid pending, and not modify a state machine of the first node.

It should be noted that, optionally, if the first node determines that the transaction status of the first transaction is the third status (for example, invalid), the first node may mark the field that is on the third block and that is related to the transaction status of the first transaction as invalid.

Optionally, in an embodiment, the first node may send a third transaction to a third node in a third node cluster. The third transaction includes the transaction status of the first transaction.

Optionally, in an embodiment, the third transaction may include transaction status indication information, and the transaction status indication information may indicate the transaction status of the first transaction. For example, the transaction status indication information may be a character string. When the transaction status of the first transaction is the first status, the transaction status indication information may be "pending" or another character string that may indicate that the consensus verification succeeds. When the transaction status of the first transaction is the third status, the transaction status information may be "invalid" or another character string that may indicate that the consensus verification fails.

In this embodiment of this application, a node included in the third node cluster maintains a third blockchain. The third node cluster is a sorting cluster (orderer group), and includes a plurality of sorting nodes. Each sorting node may be an abstract node deployed on the server, and each sorting node may be configured to provide a sorting service in the blockchain technology.

In this embodiment of this application, the third node cluster may further receive the transaction status that is of the second transaction and that is sent by the second node. The transaction status of the second transaction is determined and sent to the third node cluster by the second node.

In this embodiment, the plurality of sorting nodes included in the third node cluster may perform global sorting on received transaction data, and combine a batch of sorted transaction data to generate a block structure.

Specifically, the third node cluster may generate a second block, and the second block includes the transaction status of the first transaction and the transaction status of the second transaction.

It should be noted that the transaction status of the first transaction and the transaction status of the second transaction may be on a same block, or may be on different blocks. This is not limited herein.

302: The first node obtains the transaction status of the second transaction.

In this embodiment of this application, the first node may obtain a first block on the third blockchain. The first node and the third node maintain the third blockchain, and the first block includes the transaction status of the second transaction.

Specifically, the transaction status of the second transaction may be the first status or the third status. The first status indicates that the consensus verification on the transaction succeeds, and the third status indicates that the consensus verification on the transaction fails.

303: When the transaction status of the second transaction is the first status, the first node modifies the state machine of the first node based on the transaction data of the first transaction.

In this embodiment of this application, the first node obtains the transaction status of the second transaction, to determine whether the transaction status of the second transaction is the first status or the third status, and when the transaction status of the second transaction is the first status, the first node modifies the state machine of the first node based on the transaction data of the first transaction.

For example, after determining that the consensus verification on the first transaction succeeds, the first node may determine that the transaction status of the first transaction is the first status. For example, the first node may mark the transaction status of the first transaction as pending on a block of the first transaction. When the first node determines that the transaction status of the second transaction is also pending, the first node may modify the transaction status that is of the first transaction and that is marked on the block of the first transaction to valid, and modify the state machine of the first node based on the transaction data of the first transaction.

In this embodiment of this application, the first node obtains the transaction status of the second transaction, to determine whether the transaction status of the second transaction is the first status or the third status, and when the transaction status of the second transaction is the third status, the first node does not modify the state machine of the first node based on the transaction data of the first transaction.

For example, after determining that the consensus verification on the first transaction succeeds, the first node may determine that the transaction status of the first transaction is the first status. For example, the first node may mark the transaction status of the first transaction as pending on the block of the first transaction. When the first node determines that the transaction status of the second transaction is invalid, the first node may modify the transaction status that is of the first transaction and that is marked on the block of the first transaction to invalid, and not modify the state machine of the first node based on the transaction data of the first transaction.

It should be noted that in the foregoing embodiments, only an example in which the cross-chain transaction includes the first transaction and the second transaction is used for description. In actual application, the cross-chain transaction may alternatively include more than two transactions. This is not limited in this application. For a specific implementation, refer to the foregoing embodiments. Details are not described herein again.

It should be noted that in an application scenario, there may be a dependency relationship between a common transaction and a cross-chain transaction. Specifically, there may be a dependency relationship between transaction data of the common transaction and transaction data of the cross-chain transaction. It should be noted that the common transaction in this embodiment is a transaction that can be independently executed.

For example, there is a cross-chain transaction A and a common transaction A, and the cross-chain transaction A includes the first transaction and the second transaction.

The first transaction needs to modify a balance of an account A, and the common transaction A also needs to modify the balance of the account A. The first transaction is before the third transaction in time sequence.

In this case, the common transaction A can be executed only after the first transaction is completed.

However, because the first transaction is a cross-chain transaction, execution of the first transaction depends on transaction results of the first transaction and the second transaction, and a transaction time may be long. Therefore, a waiting time of the common transaction A may be long.

In this embodiment, if the first node further needs to process the third transaction in addition to the first transaction, where the third transaction is a common transaction, namely, a transaction that can be independently completed, instead of a cross-chain sub-transaction, and transaction data of the third transaction includes a target transaction parameter, correspondingly, the transaction data of the first transaction also includes the target transaction parameter, and an execution time sequence corresponding to the third transaction is after an execution time sequence of the first transaction. In other words, if the first node first receives a block on which the first transaction is located, or the block on which the first transaction is located is the same as a block on which the third transaction is located, the third transaction is after the first transaction on this block.

In this case, if the first node determines a transaction status of the third transaction only after determining the transaction status of the first transaction, a waiting time of the third transaction may be long.

In this embodiment of this application, the first node may directly determine that the transaction status of the third transaction is the third status.

Optionally, after the first node modifies the state machine of the first node based on the transaction data of the first transaction, the method further includes:

The first node broadcasts synchronization information to a fourth node, where the synchronization information is used to indicate that the first node has modified the state machine of the first node, and the first node and the fourth node belong to a same node cluster.

Optionally, in an embodiment, after the first node determines the transaction status of the first transaction, and executes or does not execute the first transaction based on the transaction status of the first transaction (modifies the state machine of the first node based on the transaction data of the first transaction or does not modify the state machine of the first node based on the transaction data of the first transaction), the synchronization information indicating that the first node completes the first transaction may be sent to the second node cluster. The second node cluster may generate blocks including the synchronization information, and sort the blocks to generate a new block. Correspondingly, a node (the fourth node) other than the first node in the first node cluster may receive the block that includes the synchronization information and that is sent by the second node cluster. Similarly, the node (the fourth node) other than the first node in the first node cluster may alternatively send, to the second node cluster, the synchronization information indicating that the first node completes the first transaction. The second node cluster may generate the blocks including the synchronization information, and sort the blocks to generate the new block.

If the first node determines the transaction status of the first transaction, executes or does not execute the first transaction based on the transaction status of the first transaction, and receives synchronization information that is about the first transaction and that is sent by another node in the first node cluster, the first node may determine that the first transaction is completed on the another node, and may further consider that the first transaction does not affect the third transaction. In this case, the third transaction can be normally executed.

If the first node does not determine the transaction status of the first transaction, but receives the synchronization information that is about the first transaction and that is sent by the another node in the first node cluster, the first node may determine that the first transaction is completed on the another node, and may further consider that the first transaction does not affect the third transaction. In this case, the third transaction can be normally executed.

If the first node determines the transaction status of the first transaction, but does not receive the synchronization information that is about the first transaction and that is sent by the another node in the first node cluster, the first node may determine that the first transaction is not completed on the another node, and may further consider that the first transaction may affect the third transaction. In this case, the first node may directly determine that the transaction status of the third transaction is the third status.

If the first node does not determine the transaction status of the first transaction, and does not receive the synchronization information that is about the first transaction and that is sent by the another node in the first node cluster, the first node may determine that the first transaction is not completed on the another node, and may further consider that the first transaction may affect the third transaction. In this case, the first node may directly determine that the transaction status of the third transaction is the third status.

This application provides a cross-chain transaction method, including: A first node determines that a transaction status of a first transaction is a first status. The first status indicates that consensus verification on the transaction succeeds. The first node obtains a transaction status of a second transaction. When the transaction status of the second transaction is the first status, the first node modifies a state machine of the first node based on transaction data of the first transaction. In the foregoing manner, after determining that the transaction status of the first transaction is the first status, the first node does not directly determine, based on the first status, whether to modify the state machine of the first node, but receives the transaction status of the second transaction, and modifies the state machine of the first node when the transaction status of the second transaction is the first status. Therefore, whether a cross-chain sub-transaction is executed depends not only on a consensus verification result of the first transaction, but also on a consensus verification result of another associated cross-chain transaction. A case in which only part of associated cross-chain transactions is successfully executed and the other part is not successfully executed does not occur. In this way, atomic execution of the cross-chain transactions on a plurality of blockchains is implemented.

Figure 4A:
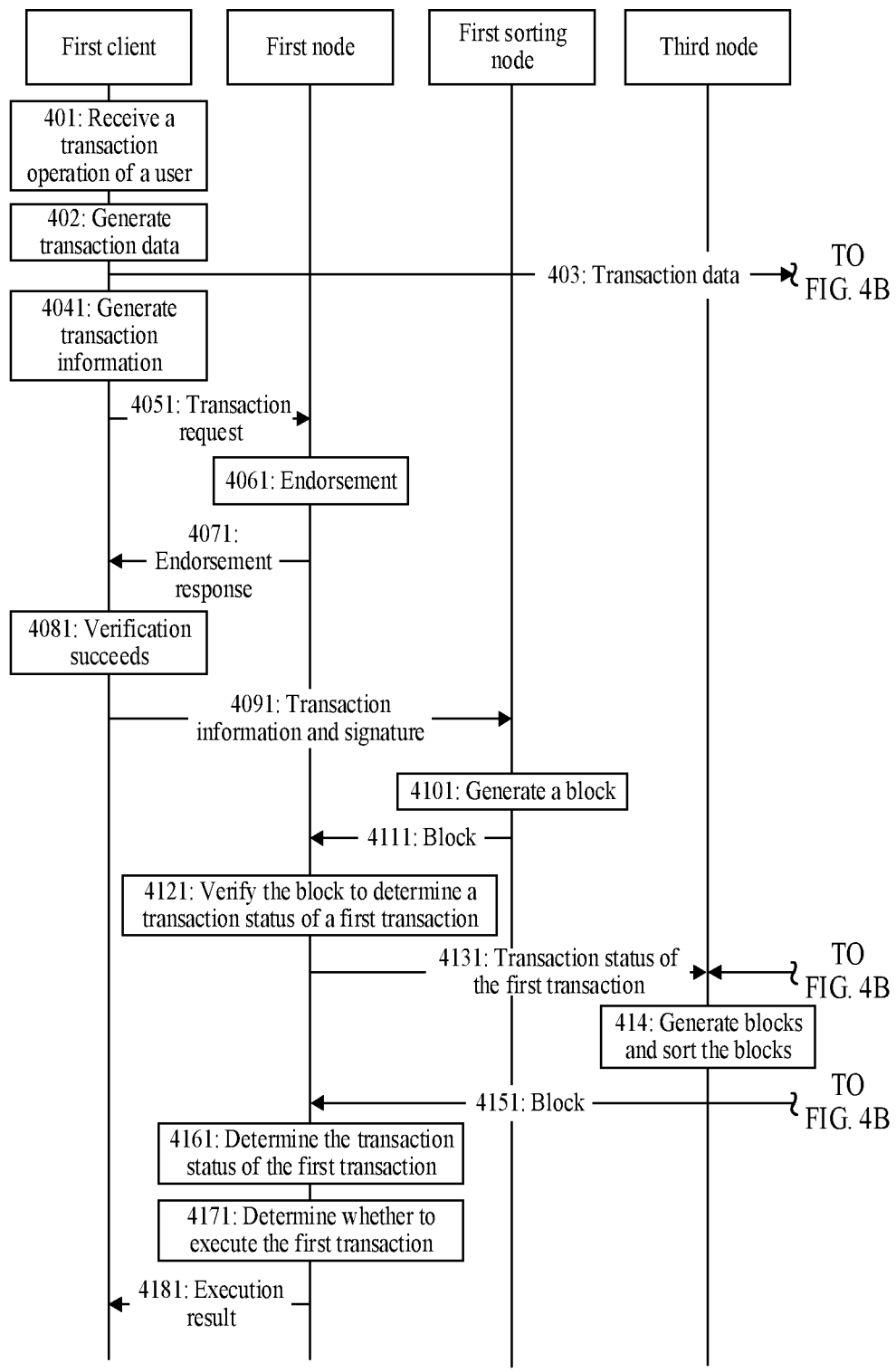
FIG. 4A and FIG. 4B are a diagram of a cross-chain transaction method according to an embodiment.
Figure 4B:
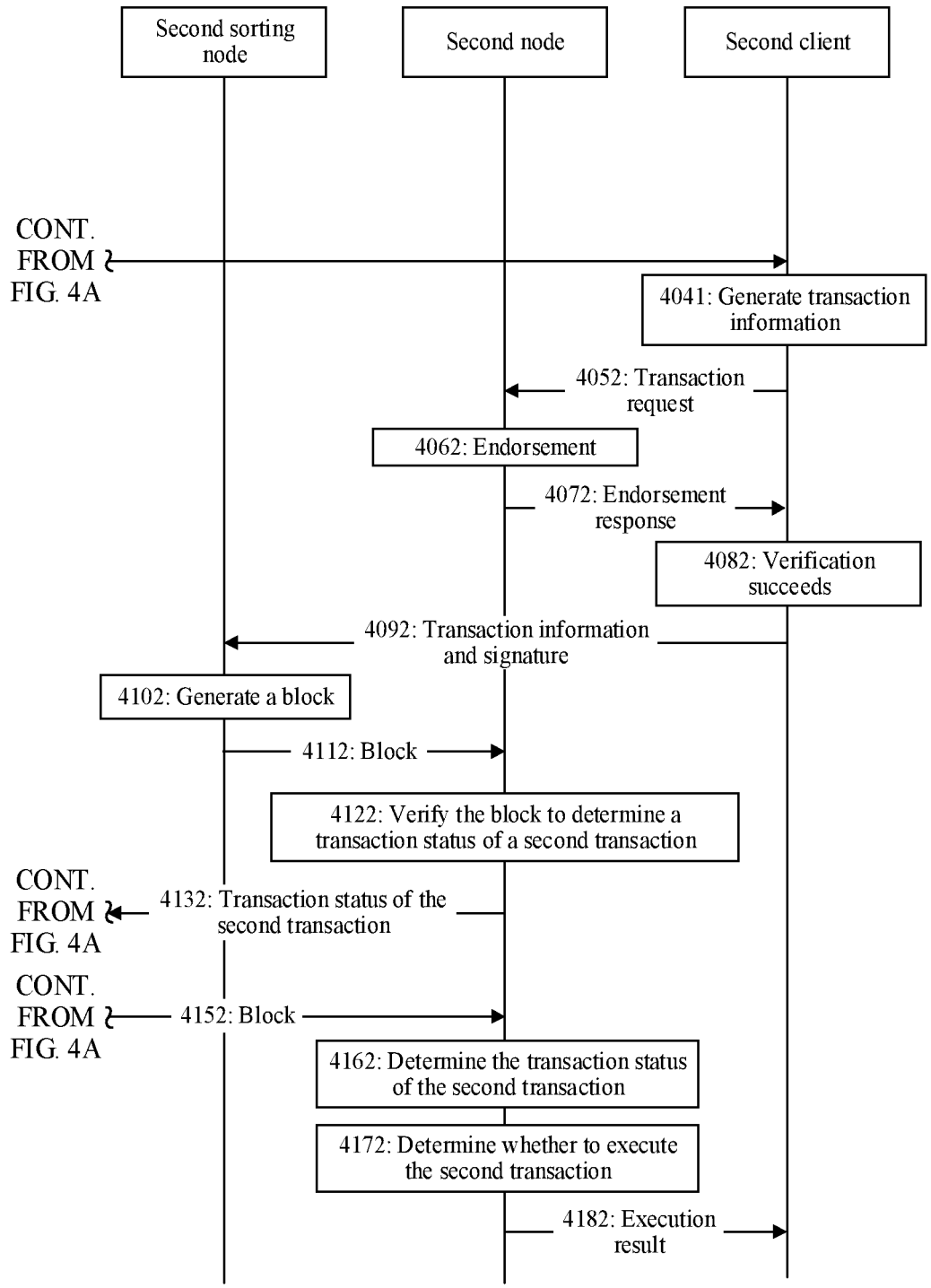

FIG. 4A and FIG. 4B are a diagram of a cross-chain transaction method according to an embodiment. Specifically, the cross-chain transaction method includes the following steps.

401: A first client receives a transaction operation of a user.

In this embodiment of this application, the transaction operation may be an operation that causes status changes of ledgers on a first blockchain and a second blockchain.

402: The first client generates transaction data.

In this embodiment of this application, the first client may generate, based on the transaction operation of the user, transaction data corresponding to a first transaction. The transaction data may include but is not limited to a user identifier, a transaction parameter (for example, a transaction amount), a transaction time, and the like.

403: The first client sends the transaction data to a second client.

In this embodiment of this application, the first client may further generate, based on the transaction operation of the user, transaction data corresponding to a second transaction, and send the transaction data corresponding to the second transaction to the second client.

4041: The first client generates transaction information.

In this embodiment of this application, the first client may generate transaction information about the first transaction based on the transaction data corresponding to the first transaction. The transaction information may include a transaction identifier, a contract identifier and a contract method of a contract to be invoked by the transaction, the transaction data, a client signature, and the like.

4042: The second client generates transaction information.

In this embodiment of this application, the second client may generate transaction information about the second transaction based on the transaction data corresponding to the second transaction. The transaction information may include a transaction identifier, a contract identifier and a contract method of a contract to be invoked by the transaction, the transaction data, a client signature, and the like.

4051: The first client sends a transaction request to a first endorsement node.

In this embodiment of this application, the first endorsement node may be some or all nodes in a first node cluster. After generating the transaction information about the first transaction, the first client may send the transaction information to the endorsement node in the first node cluster. A smart contract may be pre-installed on each endorsement node. For the transaction information about the first transaction, the endorsement node may invoke the smart contract to verify the first transaction.

4052: The second client sends a transaction request to a second endorsement node.

In this embodiment of this application, the second endorsement node may be some or all nodes in a second node cluster. After generating the transaction information about the second transaction, the second client may send the transaction information to the endorsement node in the second node cluster. The smart contract may be pre-installed on each endorsement node. For the transaction information about the second transaction, the endorsement node may invoke the smart contract to verify the second transaction.

4061: The first endorsement node performs endorsement.

In this embodiment of this application, after receiving the transaction information that is about the first transaction and that is sent by the first client, the first endorsement node invokes related code in the smart contract to simulate execution of the first transaction indicated by the transaction information. For example, the first endorsement node uses the transaction data in the transaction information about the first transaction as an input, simulates execution of the first transaction on a ledger corresponding to the first endorsement node, and generates a transaction result including an execution return value, a read operation set, and a write operation set. The first endorsement node may package the read operation set, the write operation set, an endorsement result (successful or failed), and an endorsement signature of the endorsement node, to generate an endorsement response.

4062: The second endorsement node performs endorsement.

In this embodiment of this application, after receiving the transaction information that is about the second transaction and that is sent by the second client, the second endorsement node invokes related code in the smart contract to simulate execution of the second transaction indicated by the transaction information. For example, the endorsement node uses the transaction data in the transaction information about the second transaction as an input, simulates execution of the second transaction on a ledger corresponding to the endorsement node, and generates a transaction result including an execution return value, a read operation set, and a write operation set. The second endorsement node may package the read operation set, the write operation set, an endorsement result (successful or failed), and an endorsement signature of the endorsement node, to generate an endorsement response.

4071: The first endorsement node sends the endorsement response to the first client.

4072: The second endorsement node sends the endorsement response to the second client.

4081: Verification performed by the first client succeeds.

In this embodiment of this application, the first client may receive the endorsement response sent by the first endorsement node, and then determine whether the endorsement response meets a preset rule.

4082: Verification performed by the second client succeeds.

In this embodiment of this application, the second client may receive the endorsement response sent by the second endorsement node, and then determine whether the endorsement response meets the preset rule.

4091: The first client sends the transaction information and the signature to a first sorting node.

In this embodiment of this application, if the first client determines that the endorsement response sent by the first endorsement node meets the preset rule, the first client may send the transaction information about the first transaction and a plurality of endorsement signatures included in a plurality of endorsement responses to the first sorting node.

4092: The second client sends the transaction information and the signature to a second sorting node.

In this embodiment of this application, if the second client determines that the endorsement response sent by the second endorsement node meets the preset rule, the second client may send the transaction information about the second transaction and a plurality of endorsement signatures included in a plurality of endorsement responses to the second sorting node.

4101: The first sorting node generates a block.

4102: The second sorting node generates a block.

4111: The first sorting node sends the block to a first node.

In this embodiment of this application, after the first sorting node receives N pieces of transaction information (including at least the transaction information about the first transaction and the plurality of endorsement signatures included in the plurality of endorsement responses) transmitted by the first client, the first sorting node may generate M corresponding blocks, sort the M blocks, and transmit the M blocks to the first node.

4112: The second sorting node sends the block to a second node.

In this embodiment of this application, after the second sorting node receives N pieces of transaction information (including at least the transaction information about the second transaction and the plurality of endorsement signatures included in the plurality of endorsement responses) transmitted by the second client, the second sorting node may generate M corresponding blocks, sort the M blocks, and transmit the M blocks to the second node.

4121: The first node verifies the block, to determine a transaction status of the first transaction.

In this embodiment of this application, the first node receives the block that includes the transaction information about the first transaction and the plurality of endorsement signatures corresponding to the first transaction, and may verify the block. Specifically, the first node may verify the plurality of endorsement signatures, verify a transaction structure in the transaction information, perform multi-version concurrency control (multi version concurrency control, mvcc) verification on the block, and the like.

4122: The second node verifies the block, to determine a transaction status of the second transaction.

In this embodiment of this application, the second node receives the block that includes the transaction information about the second transaction and the plurality of endorsement signatures corresponding to the second transaction, and may verify the block. Specifically, the second node may verify the plurality of endorsement signatures, verify a transaction structure in the transaction information, perform multi-version concurrency control (multi version concurrency control, mvcc) verification on the block, and the like.

4131: The first node sends the transaction status of the first transaction to a third node.

4132: The second node sends the transaction status of the second transaction to the third node.

414: The third node generates blocks and sorts the blocks.

4151: The third node sends the block to the first node.

4152: The third node sends the block to the second node.

In this embodiment of this application, after the first sorting node receives the N pieces of transaction information (including at least the transaction information about the first transaction and the plurality of endorsement signatures included in the plurality of endorsement responses of the first transaction, and the transaction information about the second transaction and the plurality of endorsement signatures included in the plurality of endorsement responses of the second transaction) transmitted by the first client, a third node cluster may generate the M corresponding blocks, sort the M blocks, and transmit the M blocks to the first node and the second node.

4161: The first node determines the transaction status of the first transaction based on the transaction status of the first transaction and the transaction status of the second transaction.

4162: The second node determines the transaction status of the second transaction based on the transaction status of the first transaction and the transaction status of the second transaction.

4171: The first node determines, based on the transaction status of the first transaction, whether to execute the first transaction.

4172: The second node determines, based on the transaction status of the second transaction, whether to execute the second transaction.

4181: The first node sends an execution result to the first client.

4182: The second node sends an execution result to the second client.

For how the first node determines, based on the transaction status of the first transaction, whether to execute the first transaction, and how the second node determines, based on the transaction status of the second transaction, whether to execute the second transaction, refer to the descriptions in the foregoing embodiments. Details are not described herein again.

It should be noted that the foregoing description is provided by using an example in which the first blockchain and the second blockchain are consortium blockchains (fabric chains). When the first blockchain and the second blockchain are heterogeneous blockchains that comply with different blockchain basic protocols, the first blockchain may be, for example, an Ethereum chain. In this case, after determining that the transaction status of the first transaction is the first status, the first node may deploy the first transaction on the Ethereum chain, and lock the first transaction. After receiving the transaction status that is of the second transaction and that is sent by the third node cluster, when the transaction status of the second transaction is the first status, the first node determines that the transaction status of the first transaction is a second status, and execute the first transaction when the first transaction is in the second status.

It should be noted that the first node in this application may not belong to the Ethereum chain, but is a node of a newly added distributed node cluster.

In this embodiment of this application, if the transaction status of the first transaction is a third status, the first transaction is not executed. Specifically, the first node may indicate the Ethereum chain to perform reversal on the first transaction, that is, indicate the Ethereum chain not to execute the first transaction.

In this embodiment of this application, if the transaction status of the first transaction is the second status, the first transaction is executed. Specifically, the first node may indicate the Ethereum chain to unlock the first transaction, that is, indicate the Ethereum chain to execute the first transaction.

It should be noted that, if the first blockchain is a fabric chain, and the second blockchain is an Ethereum chain, the first blockchain performs steps performed by the fabric chain in the foregoing embodiment, and the second blockchain performs steps performed by the Ethereum chain in the foregoing embodiment.

It should be noted that in another application scenario, the first blockchain or the second blockchain may alternatively be a bitcoin chain. This is not limited herein.

Figure 5:
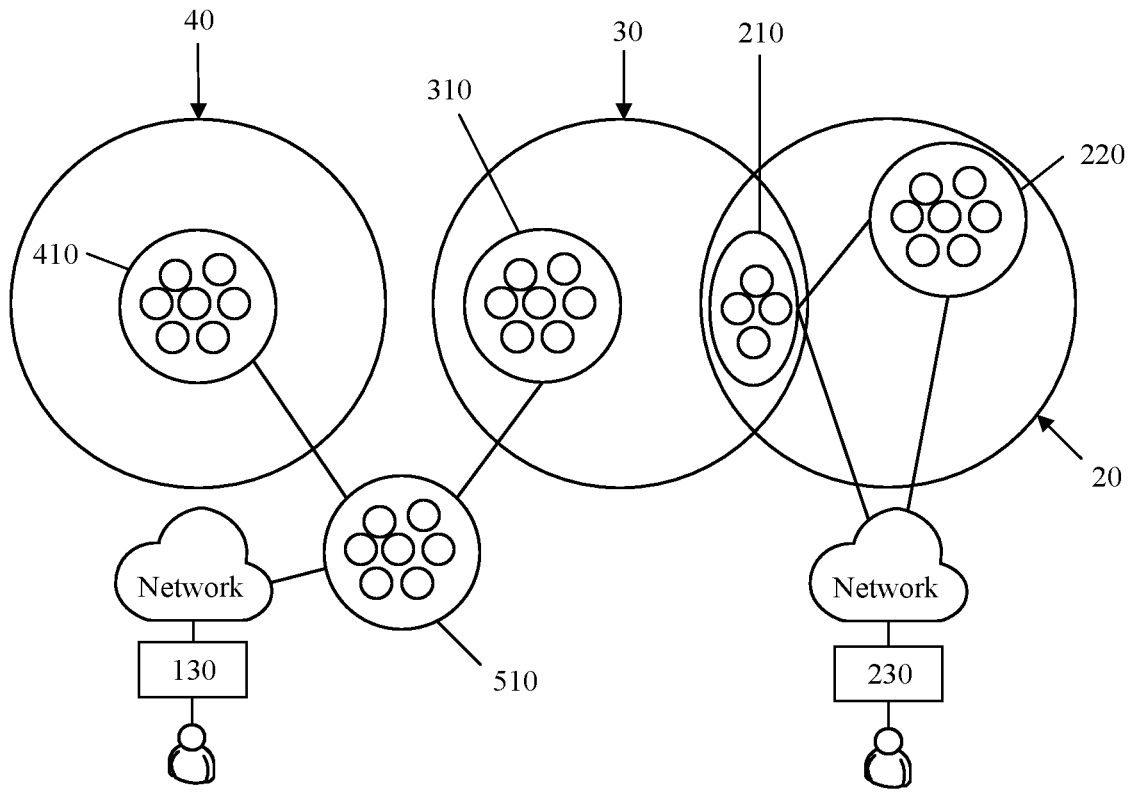
FIG. 5 is a diagram of a blockchain network according to an embodiment.

FIG. 5 is a diagram of a blockchain network according to an embodiment. As shown in FIG. 5, the blockchain network includes a network 40 of a blockchain 4, a network 20 of a blockchain 2, a network 30 of a blockchain 3, a first client 130, a second client 230, and a node cluster 510. The blockchain 4 corresponding to the network 40 is an Ethereum chain. In this embodiment of this application, for specific descriptions of the network 20 of the blockchain 2 and the second client 230, refer to the descriptions in the embodiment corresponding to FIG. 2. Details are not described herein again.

In this embodiment of this application, the network 40 of the blockchain 4 includes a node cluster 410, and the node cluster 410 includes a plurality of peer nodes. These peer nodes jointly maintain the Ethereum chain.

The node cluster 510 includes a plurality of peer nodes. Different from the schematic diagram of the architecture in FIG. 1, the network 30 of the blockchain 3 does not include a node cluster 110. In this case, the node cluster 510 may complete a function of the node cluster 110. In other words, the node cluster 510 may serve as an adapter to provide the function of the node cluster 110.

For example, a user may initiate a transaction on the first client 130. The first client 130 may generate corresponding transaction information, and send the transaction information to the cluster 510 through a network. The cluster 510 includes a plurality of first nodes. After the first node determines that a transaction status of the transaction is a first status, the first node may deploy the transaction on the node cluster 410. Correspondingly, the node cluster 410 may lock the transaction. The first node may further send a transaction status of a first transaction to a cluster 310.

Similarly, a second node may send a transaction status of a second transaction to the cluster 310.

The cluster 310 may be a sorting cluster, and includes a plurality of third nodes. The third nodes may be sorting nodes. The sorting nodes may perform global sorting on received transaction data, combine a batch of sorted transaction data to generate a block, and transmit the block to the cluster 510 and a cluster 210.

The cluster 510 may determine the transaction status of the transaction based on the received block, and when the transaction status is a second status, indicate the node cluster 410 to execute the transaction, or when the transaction status is a third status, indicate the node cluster 410 to perform transaction reversal, that is, not to execute the transaction.

In some scenarios, a cross-chain transaction includes a plurality of associated cross-chain sub-transactions, for example, the first transaction and the second transaction. If the first transaction is that a user A transfers 10 units of currency to a user B, the first transaction is that a balance of an account A on a first blockchain is reduced by 10 units of currency, and the second transaction is that a balance of an account B on a second blockchain is increased by 10 units of currency.

However, a client may be untrusted. Therefore, there is a fraud risk, and transactions initiated by the first client and the second client may be untrue. For example, the transaction initiated by the first client is that the balance of the account A on the first blockchain is reduced by 10 units of currency, but the second transaction is that the balance of the account B on the second blockchain is increased by 20 units of currency. This damages an existing data logical relationship and is unacceptable.

To resolve the foregoing technical problem, this application provides a cross-chain transaction method.

Figure 6:
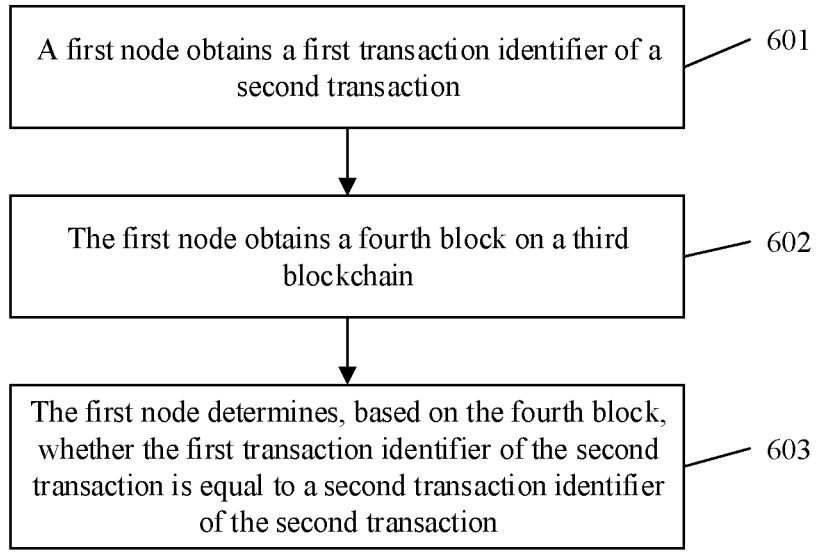
FIG. 6 is a diagram of a cross-chain transaction method according to an embodiment.

FIG. 6 is a diagram of a cross-chain transaction method according to an embodiment. As shown in FIG. 6, the cross-chain transaction method includes the following steps.

601: A first node obtains a first transaction identifier of a second transaction.

In this embodiment of this application, a first transaction and the second transaction are associated cross-chain transactions. The first transaction is a transaction on a first blockchain, and the second transaction is a transaction on a second blockchain.

For example, when a user initiates a cross-chain transaction on a first client, the cross-chain transaction includes two associated cross-chain sub-transactions (the first transaction and the second transaction). Specifically, the user may perform a transaction operation through the first client. The first client may generate, based on the transaction operation of the user, transaction data corresponding to the first transaction. The transaction operation may be an operation that causes status changes of ledgers on the first blockchain and the second blockchain. The transaction data may include but is not limited to a user identifier, a transaction parameter (for example, a transaction amount), a transaction time, and the like. The first client may generate transaction information about the first transaction based on the transaction data corresponding to the first transaction. The transaction information may include a first transaction identifier hash (tx1) of the first transaction.

A transaction identifier may be used to distinguish and determine an operation that is performed on a ledger and that corresponds to a transaction. The first transaction identifier hash (tx1) of the first transaction may be a character string including digits and letters. In some application scenarios, for each transaction, a hash function may be used to process the transaction data, an operation that is performed on a ledger and that corresponds to the transaction, and the like. An obtained hash value is used as a transaction identifier of the transaction.

It should be noted that, in this embodiment of this application, the first client may further generate, based on the transaction operation of the user, transaction data corresponding to the second transaction, and send the transaction data corresponding to the second transaction to a second client. The second client may generate transaction information about the second transaction based on the transaction data corresponding to the second transaction. The transaction information may include a second transaction identifier hash (tx2) of the second transaction. Because the transaction identifier may distinguish and determine the operation that is performed on the ledger and that corresponds to the transaction, the second transaction identifier hash (tx2) that is of the second transaction and that is generated by the second client may uniquely indicate content executed in the second transaction.

In this embodiment of this application, in addition to the first transaction identifier hash (tx1) of the first transaction, the first client further generates a first transaction identifier exp_hash (tx2) of the second transaction.

Optionally, in an embodiment, the first client may obtain, by invoking an assistant chaincode, the first transaction identifier exp_hash (tx2) that is of the second transaction and that "should" be generated by the second client.

Specifically, after generating the transaction data corresponding to the second transaction based on the transaction operation of the user, the first client may generate the first transaction identifier exp_hash (tx2) of the second transaction by using the transaction data as an input and by invoking the assistant chaincode. The first transaction identifier exp_hash (tx2) of the second transaction may indicate a unique transaction identifier corresponding to the second transaction that should be executed by the second client.

Optionally, in an embodiment, the first client may not obtain the first transaction identifier exp_hash (tx2) of the second transaction by invoking the assistant chaincode, but obtains, by communicating with the second client, a chaincode and a parameter that should be executed by the second client, and calculates the first transaction identifier exp_hash (tx2) of the second transaction.

In this embodiment of this application, after generating the transaction information about the first transaction, the first client may send the transaction information to an endorsement node in a first node cluster. The transaction information about the first transaction includes the first transaction identifier exp_hash (tx2), and the first transaction identifier hash (tx1) of the first transaction.

After receiving the transaction information that is about the first transaction and that is sent by the first client, the endorsement node invokes related code in a smart contract to simulate execution of the first transaction indicated by the transaction information. For example, the endorsement node uses the transaction data in the transaction information about the first transaction as an input, simulates execution of the first transaction on a ledger corresponding to the endorsement node, and generates a transaction result including an execution return value, a read operation set, and a write operation set. The endorsement node may package the read operation set, the write operation set, an endorsement result (successful or failed), and an endorsement signature of the endorsement node, to generate an endorsement response. In addition, the endorsement response may further include an identifier of a client corresponding to the transaction information, the first transaction identifier exp_hash (tx2), and the first transaction identifier hash (tx1) of the first transaction.

In this embodiment of this application, the endorsement node may send a plurality of endorsement responses to the client.

The first client may receive an endorsement response sent by each endorsement node, and then determine whether the endorsement response meets a preset rule.

In this embodiment of this application, after determining that the endorsement response meets the preset rule, the first client may send the transaction information about the first transaction and a plurality of endorsement signatures included in the plurality of endorsement responses to a second node cluster. The transaction information about the first transaction includes the first transaction identifier exp_hash (tx2) and the first transaction identifier hash (tx1) of the first transaction.

In this embodiment of this application, a node included in the second node cluster maintains the first blockchain. The second node cluster is a sorting cluster (orderer group), and includes a plurality of sorting nodes. Each sorting node may be an abstract node deployed on a server, and each sorting node may be configured to provide a sorting service in a blockchain technology.

The plurality of sorting nodes included in the second node cluster may perform global sorting on received transaction data, and combine a batch of sorted transaction data to generate a block structure.

After one or more sorting nodes in the second node cluster receive N pieces of transaction information (including at least the transaction information about the first transaction and the plurality of endorsement signatures included in the plurality of endorsement responses) transmitted by the first client, the at least one sorting node may generate M corresponding blocks, sort the M blocks, and transmit the M blocks to the first node cluster, so that the first node cluster verifies the M blocks, and sequentially adds verified blocks to a corresponding blockchain.

In this embodiment of this application, a node in the first node cluster may receive a block. The block includes the transaction information about the first transaction and the plurality of endorsement signatures corresponding to the first transaction. It should be noted that, for ease of description, the following describes the node in the first node cluster as the first node.

The first node receives the block that includes the transaction information about the first transaction and the plurality of endorsement signatures corresponding to the first transaction, and may verify the block. For how the first node verifies the block, refer to the foregoing embodiments. Details are not described herein again.

The first node may send a fourth transaction to a third node. The fourth transaction includes the first transaction identifier hash (tx1) of the first transaction. Optionally, the fourth transaction includes the first transaction identifier exp_hash (tx2) of the second transaction.

In this embodiment of this application, a node included in a third node cluster maintains a third blockchain. The third node cluster is a sorting cluster (orderer group), and includes a plurality of sorting nodes. Each sorting node may be an abstract node deployed on the server, and each sorting node may be configured to provide a sorting service in the blockchain technology.

In this embodiment of this application, the third node cluster may further receive the second transaction identifier hash (tx2) of the second transaction and a second transaction identifier exp_hash (tx1) of the first transaction that are sent by the second node. Specifically, the third node cluster may further receive a fifth transaction sent by the second node. The fifth transaction may include the second transaction identifier hash (tx2) of the second transaction and the second transaction identifier exp_hash (tx1) of the first transaction.

In this embodiment of this application, the plurality of sorting nodes included in the third node cluster may perform global sorting on received transaction data, and combine a batch of sorted transaction data to generate a block structure.

Specifically, the third node cluster may generate a fourth block. The fourth block includes the second transaction identifier hash (tx2) of the second transaction and the second transaction identifier exp_hash (tx1) of the first transaction. The fourth block may further include the first transaction identifier exp_hash (tx2) of the second transaction and the first transaction identifier hash (tx1) of the first transaction.

It should be noted that the second transaction identifier hash (tx2) of the second transaction, the second transaction identifier exp_hash (tx1) of the first transaction, the first transaction identifier exp_hash (tx2) of the second transaction, and the first transaction identifier hash (tx1) of the first transaction may be on a same block, or may be on different blocks. This is not limited herein.

602: The first node obtains the fourth block on the third blockchain, where the fourth block includes the second transaction identifier of the second transaction.

In this embodiment of this application, the first node may obtain the fourth block on the third blockchain. The fourth block may include the second transaction identifier hash (tx2) of the second transaction. The second transaction identifier hash (tx2) of the second transaction is a transaction identifier corresponding to actual execution of the second transaction, and may uniquely indicate transaction data of the second transaction in specific execution.

Optionally, the fourth block may further include the second transaction identifier exp_hash (tx1) of the first transaction.

Similarly, the second node may receive a fifth block sent by the third node cluster. The fifth block may include the first transaction identifier hash (tx1) of the first transaction. The first transaction identifier hash (tx1) of the first transaction is a transaction identifier corresponding to actual execution of the first transaction, and may uniquely indicate transaction data of the first transaction in specific execution.

Optionally, the fifth block may further include the first transaction identifier exp_hash (tx2) of the second transaction.

In an embodiment, if the fourth block and the fifth block that are generated by the third node cluster are a same block, the first node may receive the block sent by the third node cluster. The block includes the second transaction identifier hash (tx2) of the second transaction, the second transaction identifier exp_hash (tx1) of the first transaction, the first transaction identifier hash (tx1) of the first transaction, and the first transaction identifier exp_hash (tx2) of the second transaction.

603: The first node determines, based on the fourth block, whether the first transaction identifier of the second transaction is equal to the second transaction identifier of the second transaction.

In this embodiment of this application, the first node may determine whether the second transaction identifier hash (tx2) of the second transaction is equal to the first transaction identifier exp_hash (tx2) of the second transaction, to determine whether the second transaction is executed based on correct transaction data.

Specifically, because the first transaction identifier exp_hash (tx2) of the second transaction is generated by the first client based on the transaction data of the second transaction, the first transaction identifier exp_hash (tx2) may indicate transaction data that the first client considers and that should be executed in the second transaction. The second transaction identifier hash (tx2) of the second transaction indicates transaction data actually executed in the second transaction.

Therefore, whether the second transaction identifier hash (tx2) of the second transaction is equal to the first transaction identifier exp_hash (tx2) of the second transaction is determined, to determine whether the second transaction is executed based on the correct transaction data.

Similarly, the second node may determine whether the first transaction identifier hash (tx1) of the first transaction is equal to the second transaction identifier exp_hash (tx1) of the first transaction, to determine whether the first transaction is executed based on correct transaction data.

Specifically, because the second transaction identifier exp_hash (tx1) of the first transaction is generated by the second client based on the transaction data of the first transaction, the second transaction identifier exp_hash (tx1) may indicate transaction data that the second client considers and that should be executed in the first transaction. The first transaction identifier hash (tx1) of the first transaction indicates transaction data actually executed in the second transaction.

Therefore, whether the first transaction identifier hash (tx1) of the first transaction is equal to the second transaction identifier exp_hash (tx1) of the first transaction is determined, to determine whether the first transaction is executed based on the correct transaction data.

Optionally, if the first block includes the second transaction identifier exp_hash (tx1) of the first transaction, the first node may determine whether the first transaction identifier hash (tx1) of the first transaction is equal to the second transaction identifier exp_hash (tx1) of the first transaction, to obtain a determining result of the second node.

If the second block includes the first transaction identifier exp_hash (tx2) of the second transaction, the second node may determine whether the second transaction identifier hash (tx2) of the second transaction is equal to the first transaction identifier exp_hash (tx2) of the second transaction, to obtain a determining result of the first node.

In this embodiment of this application, if the first node determines that the second transaction identifier hash (tx2) of the second transaction is equal to the first transaction identifier exp_hash (tx2) of the second transaction, the first node may determine that the second transaction is executed based on the correct transaction data.

In this embodiment of this application, if the second node determines that the first transaction identifier hash (tx1) of the first transaction is equal to the second transaction identifier exp_hash (tx1) of the first transaction, the second node may determine that the first transaction is executed based on the correct transaction data.

In this embodiment of this application, if the first node determines that the first transaction is executed based on the correct transaction data, and the second transaction is executed based on the correct transaction data, the first transaction may be executed.

In this embodiment of this application, if the first node determines that the first transaction is not executed based on the correct transaction data, and the second transaction is executed based on the correct transaction data, the first transaction is not executed.

In this embodiment of this application, if the first node determines that the first transaction is executed based on the correct transaction data, and the second transaction is not executed based on the correct transaction data, the first transaction is not executed.

In this embodiment of this application, if the second node determines that the first transaction is executed based on the correct transaction data, and the second transaction is executed based on the correct transaction data, the second transaction may be executed.

In this embodiment of this application, if the second node determines that the first transaction is not executed based on the correct transaction data, and the second transaction is executed based on the correct transaction data, the second transaction is not executed.

In this embodiment of this application, if the second node determines that the first transaction is executed based on the correct transaction data, and the second transaction is not executed based on the correct transaction data, the second transaction is not executed.

For example, if the first transaction is that a user A transfers 10 units of currency to a user B, the first transaction is that a balance of an account A on the first blockchain is reduced by 10 units of currency, and the second transaction is that a balance of an account B on the second blockchain is increased by 10 units of currency.

In this case, the first client generates the first transaction identifier hash (tx1) of the first transaction based on the transaction data of the first transaction (including that the balance of the account A on the first blockchain is reduced by 10 units of currency), and generates the first transaction identifier exp_hash (tx2) of the second transaction based on the transaction data of the second transaction (including that the balance of the account B on the second blockchain is increased by 10 units of currency).

Similarly, the second client generates the second transaction identifier exp_hash (tx1) of the first transaction based on the transaction data of the first transaction (including that the balance of the account A on the first blockchain is reduced by 10 units of currency), and generates the second transaction identifier hash (tx2) of the second transaction based on the transaction data of the second transaction (including that the balance of the account B on the second blockchain is increased by 20 units of currency). In other words, the second client wants to add more currencies to the account B.

Then, the first node receives the second transaction identifier hash (tx2) that is of the second transaction and that is sent by the third node, and the second transaction identifier hash (tx2) is different from the first transaction identifier exp_hash (tx2) of the second transaction. In this case, the first node determines that the transaction data executed in the second transaction is incorrect. In other words, the second client has a cheating behavior. Therefore, the first transaction is not executed.

It should be noted that the embodiment corresponding to FIG. 6 and the embodiment corresponding to FIG. 3 may be performed simultaneously. This is not limited herein.

This embodiment of this application provides a cross-chain transaction method, including: The first node obtains the first transaction identifier of the second transaction. The first node obtains the fourth block on the third blockchain. The fourth block includes the second transaction identifier of the second transaction. The first node determines, based on the fourth block, whether the first transaction identifier of the second transaction is equal to the second transaction identifier of the second transaction. In this embodiment of this application, the first node may determine whether the second transaction identifier of the second transaction is equal to the first transaction identifier of the second transaction, to determine whether the second transaction is executed based on the correct transaction data, and when the second transaction is not executed based on the correct transaction data, the first node does not execute the first transaction.

When there are a plurality of cross-chain transactions on a blockchain network, there may be a dependency relationship between the cross-chain transactions. Specifically, there is a dependency relationship between transaction data of the cross-chain transactions. For example, there are two cross-chain transactions: a cross-chain transaction A and a cross-chain transaction B. The cross-chain transaction A includes a first transaction and a second transaction. The cross-chain transaction B includes a third transaction and a fourth transaction. The first transaction and the third transaction are transactions on a first blockchain. The second transaction and the fourth transaction are transactions on a second blockchain.

The first transaction needs to modify a balance of an account A, and the third transaction A also needs to modify the balance of the account A. The first transaction is before the third transaction in time sequence.

The second transaction needs to modify a balance of an account B, and the fourth transaction also needs to modify the balance of the account B. The second transaction is after the fourth transaction in time sequence.

In this case, the third transaction can be executed only after the first transaction is completed.

If the first transaction and the second transaction belong to a same cross-chain transaction, execution of the first transaction needs to depend on an execution result of the second transaction.

The second transaction can be executed only after the fourth transaction is completed.

If the fourth transaction and the third transaction belong to a same cross-chain transaction, execution of the fourth transaction needs to depend on an execution result of the third transaction.

In this case, a deadlock occurs, and neither of the two cross-chain transactions can be completed. Consequently, transaction execution is blocked, and a system cannot provide a service.

Figure 7A:
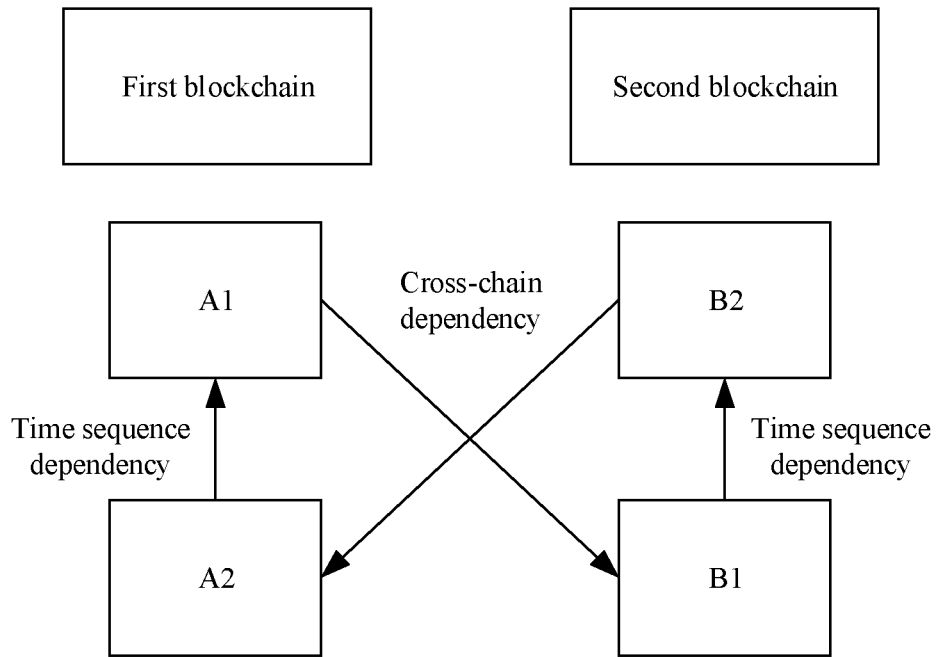
FIG. 7a is a diagram of a dependency relationship between cross-chain transactions.

FIG. 7a is a diagram of a dependency relationship between cross-chain transactions. As shown in FIG. 7a, a first transaction A1 and a second transaction B1 belong to a same cross-chain transaction, and a third transaction A2 and a fourth transaction B2 belong to a same cross-chain transaction. The first transaction A1 and the third transaction A2 have a time sequence dependency relationship. In other words, the third transaction A2 can be executed only after the first transaction A1 is executed. The fourth transaction B2 and the second transaction B1 have a time sequence dependency relationship. In other words, the second transaction B1 can be executed only after the fourth transaction B2 is executed.

In this case, there is a transaction deadlock between the first transaction A1, the second transaction B1, the third transaction A2, and the fourth transaction B2.

Figure 7B:
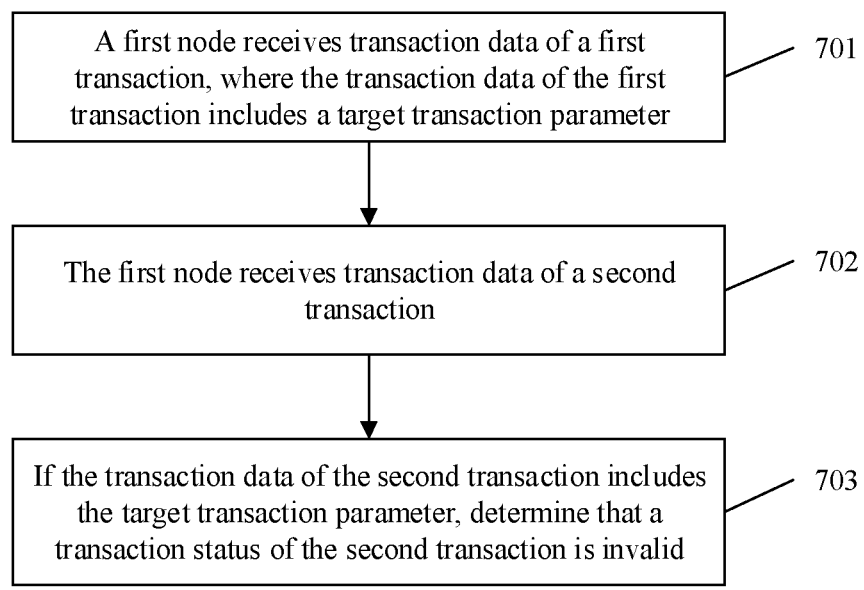
FIG. 7b is a diagram of a cross-chain transaction method according to an embodiment.

To resolve the foregoing problem, refer to FIG. 7b. FIG. 7b is a diagram of a cross-chain transaction method according to an embodiment. Specifically, the cross-chain transaction method provided in this embodiment includes:

701: A first node receives transaction data of a first transaction, where the transaction data of the first transaction includes a target transaction parameter.

702: The first node receives transaction data of a second transaction.

703: If the transaction data of the second transaction includes the target transaction parameter, determine that a transaction status of the second transaction is invalid.

Optionally, in this embodiment of this application, the first transaction and a third transaction are associated cross-chain transactions, and the second transaction and a fourth transaction are associated cross-chain transactions. The first transaction and the second transaction are transactions on a first blockchain. The third transaction and the fourth transaction are transactions on a second blockchain.

For example, the first transaction is that a balance of an account A is reduced by 5 units of currency, the second transaction is that the balance of the account A is reduced by 10 units of currency, the third transaction is that a balance of an account B is increased by 5 units of currency, and the fourth transaction is that the balance of the account B is increased by 10 units of currency.

In this case, the transaction data of the first transaction includes the target transaction parameter "the account A", and the transaction data of the second transaction includes the target transaction parameter "the account A". Therefore, the first node may directly determine that the transaction status of the second transaction is invalid, and not execute the second transaction. In other words, a status database corresponding to the second transaction is not modified.

In this embodiment of this application, if it is determined that there are cross-chain transactions in which a transaction deadlock may occur, it is determined that a transaction status of one of the transactions is invalid, so that transaction execution blocking caused by the transaction deadlock can be resolved.

Figure 8:
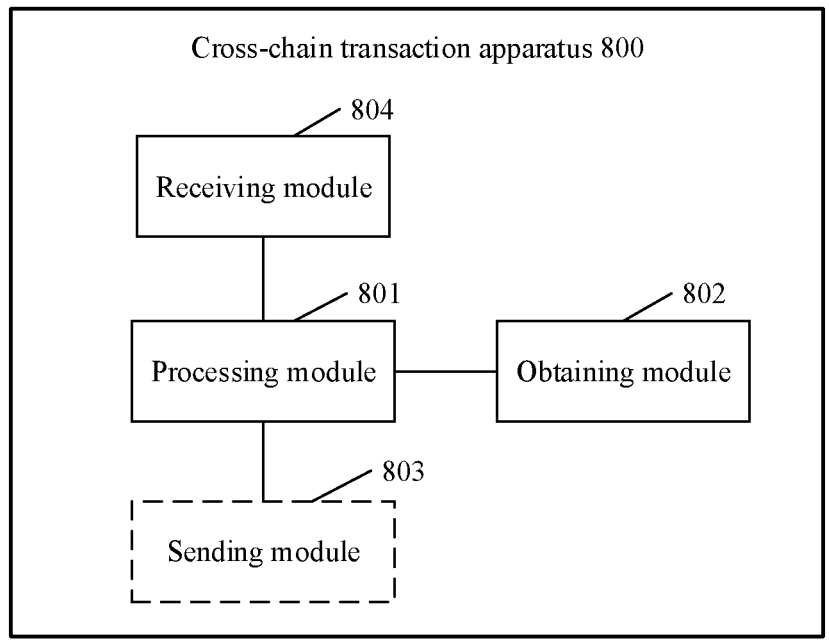
FIG. 8 is a diagram of a cross-chain transaction apparatus according to an embodiment.

The following describes in detail a cross-chain transaction apparatus corresponding to an embodiment of this application. FIG. 8 is a diagram of the cross-chain transaction apparatus according to an embodiment. A cross-chain transaction apparatus 800 in this embodiment of this application includes:

a processing module 801, configured to determine that a transaction status of a first transaction is a first status, where the first status indicates that consensus verification on the transaction succeeds; and an obtaining module 802, configured to obtain a transaction status of a second transaction.

The processing module 801 is further configured to: when the transaction status of the second transaction is the first status, modify a state machine of the cross-chain transaction apparatus based on transaction data of the first transaction.

In this embodiment of this application, the processing module 801 determines that the transaction status of the first transaction is the first status, and the first status indicates that the consensus verification on the transaction succeeds. The obtaining module 802 obtains the transaction status of the second transaction. The processing module 801 is configured to: when the transaction status of the second transaction is the first status, modify the state machine of the cross-chain transaction apparatus based on the transaction data of the first transaction. In the foregoing manner, after determining that the transaction status of the first transaction is the first status, the cross-chain transaction apparatus does not directly determine, based on the first status, whether to modify the state machine of the cross-chain transaction apparatus, but receives the transaction status of the second transaction, and modifies the state machine of the cross-chain transaction apparatus when the transaction status of the second transaction is the first status. Therefore, whether a cross-chain sub-transaction is executed depends not only on a consensus verification result of the first transaction, but also on a consensus verification result of another associated cross-chain transaction. A case in which only part of associated cross-chain transactions is successfully executed and the other part is not successfully executed does not occur. In this way, atomic execution of the cross-chain transactions on a plurality of blockchains is implemented.

Optionally, the obtaining module 802 is specifically configured to obtain a first block on a third blockchain, where the cross-chain transaction apparatus and a third node maintain the third blockchain, and the first block includes the transaction status of the second transaction.

Optionally, the cross-chain transaction apparatus further includes a sending module 803, configured to send a third transaction to the third node, where the third transaction includes the transaction status of the first transaction.

Optionally, the sending module 803 is further configured to send a fourth transaction to the third node, where the fourth transaction includes timeout information, and the cross-chain transaction apparatus and the third node maintain the third blockchain.

Optionally, the processing module 801 is further configured to: when the cross-chain transaction apparatus does not obtain the transaction status of the second transaction, but obtains a second block that includes the timeout information and that is on the third blockchain, skip modifying the state machine of the cross-chain transaction apparatus based on the transaction data of the first transaction.

Optionally, the cross-chain transaction apparatus further includes a receiving module 804, configured to receive the transaction data of the first transaction. The processing module 801 is specifically configured to:
  perform the consensus verification on the first transaction;
  when the consensus verification on the first transaction succeeds, determine that the transaction status of the first transaction is the first status; and
  add a third block to a first blockchain, where the third block includes the transaction data of the first transaction, and the cross-chain transaction apparatus maintains the first blockchain.

Optionally, the obtaining module 802 is further configured to:
  obtain a first transaction identifier of the second transaction; and
  obtain a fourth block on the third blockchain, where the fourth block includes a second transaction identifier of the second transaction.

The processing module 801 is further configured to:
  determine, based on the fourth block, whether the first transaction identifier of the second transaction is equal to the second transaction identifier of the second transaction.

Optionally, the obtaining module 802 is further configured to:
  obtain a first transaction identifier of the first transaction.

Optionally, the sending module 803 is further configured to:
  send the fourth transaction to the third node, where the fourth transaction includes the first transaction identifier of the first transaction.

Optionally, the sending module 803 is further configured to:
  broadcast synchronization information to a fourth node, where the synchronization information is used to indicate that the cross-chain transaction apparatus has modified the state machine of the cross-chain transaction apparatus, and the cross-chain transaction apparatus and the fourth node belong to a same node cluster.

The following describes in detail a cross-chain transaction apparatus corresponding to an embodiment of this application. FIG. 8 is a schematic diagram of an embodiment of the cross-chain transaction apparatus according to this embodiment of this application. A cross-chain transaction apparatus 800 in this embodiment of this application includes:
  a processing module 801, configured to determine that a transaction status of a first transaction is a first status, where the first status indicates that consensus verification on the transaction succeeds; and
  an obtaining module 802, configured to obtain a transaction status of a second transaction.

The processing module 801 is further configured to: when the transaction status of the second transaction is a third status, skip modifying a state machine of the cross-chain transaction apparatus based on transaction data of the first transaction.

Optionally, the obtaining module 802 is specifically configured to obtain a first block on a third blockchain, where the cross-chain transaction apparatus and a third node maintain the third blockchain, and the first block includes the transaction status of the second transaction.

Optionally, the cross-chain transaction apparatus further includes a sending module 803, configured to send a third transaction to the third node, where the third transaction includes the transaction status of the first transaction.

Optionally, the sending module 803 is further configured to send a fourth transaction to the third node, where the fourth transaction includes timeout information, and the cross-chain transaction apparatus and the third node maintain the third blockchain.

Optionally, the processing module 801 is further configured to: when the cross-chain transaction apparatus does not obtain the transaction status of the second transaction, but obtains a second block that includes the timeout information and that is on the third blockchain, skip modifying the state machine of the cross-chain transaction apparatus based on the transaction data of the first transaction.

Optionally, the cross-chain transaction apparatus further includes a receiving module 804, configured to receive the transaction data of the first transaction. The processing module 801 is specifically configured to:
  perform the consensus verification on the first transaction;
  when the consensus verification on the first transaction succeeds, determine that the transaction status of the first transaction is the first status; and
  add a third block to a first blockchain, where the third block includes the transaction data of the first transaction, and the cross-chain transaction apparatus maintains the first blockchain.

Optionally, the obtaining module 802 is further configured to:
  obtain a first transaction identifier of the second transaction; and
  obtain a fourth block on the third blockchain, where the fourth block includes a second transaction identifier of the second transaction.

The processing module 801 is further configured to:
  determine, based on the fourth block, whether the first transaction identifier of the second transaction is equal to the second transaction identifier of the second transaction.

Optionally, the obtaining module 802 is further configured to:

obtain a first transaction identifier of the first transaction.

Optionally, the sending module 803 is further configured to:

send the fourth transaction to the third node, where the fourth transaction includes the first transaction identifier of the first transaction.

Figure 9:
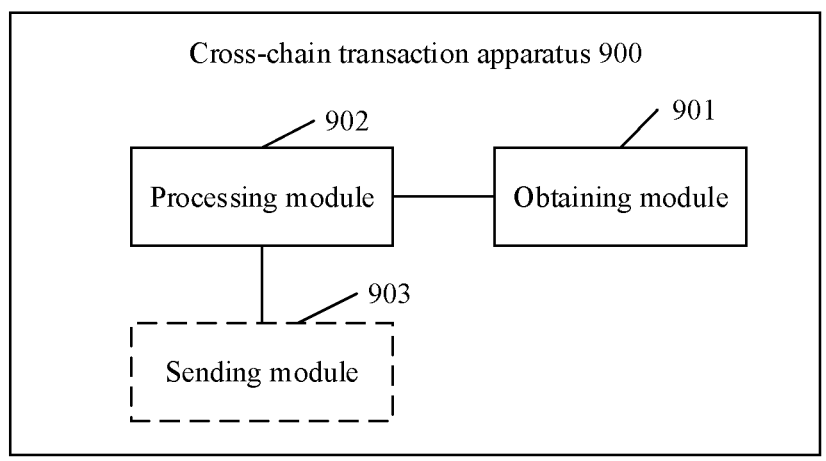
FIG. 9 is a diagram of a cross-chain transaction apparatus according to an embodiment.

The following describes in detail a cross-chain transaction apparatus corresponding to an embodiment of this application. FIG. 9 is a diagram of a cross-chain transaction apparatus according to an embodiment. A cross-chain transaction apparatus 900 in this embodiment of this application includes:

an obtaining module 901, configured to obtain a first transaction identifier of a second transaction, where the second transaction is a transaction on a second blockchain, the second transaction and a first transaction are associated cross-chain transactions, the first transaction is a transaction on a first blockchain, and a first node maintains the first blockchain; and receive a first block sent by a third node, where the first block includes a second transaction identifier of the second transaction; and a processing module 902, configured to determine, based on the first block, whether the first transaction identifier of the second transaction is equal to the second transaction identifier of the second transaction.

Optionally, the cross-chain transaction apparatus 900 further includes a sending module 903, configured to send the first transaction identifier of the second transaction to the third node.

Optionally, the obtaining module 901 is further configured to obtain a first transaction identifier of the first transaction.

The sending module 903 is further configured to send the first transaction identifier of the first transaction to the third node.

Optionally, the first block further includes a second transaction identifier of the first transaction.

The processing module 902 is specifically configured to determine, based on the first block, whether the first transaction identifier of the first transaction is equal to the second transaction identifier of the first transaction.

Figure 10:
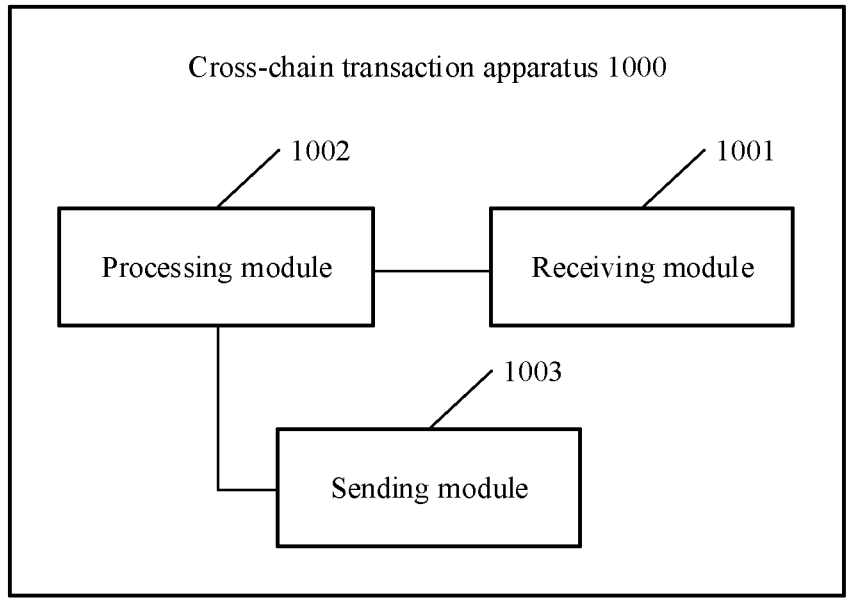
FIG. 10 is a diagram of a cross-chain transaction apparatus according to an embodiment.

The following describes in detail a cross-chain transaction apparatus corresponding to an embodiment of this application. FIG. 10 is a diagram of a cross-chain transaction apparatus according to an embodiment. A cross-chain transaction apparatus 1000 in this embodiment of this application includes:

a receiving module 1001, configured to receive a first transaction identifier that is of a first transaction and that is sent by a first node, where the first node maintains a first blockchain, and the first transaction is a transaction on the first blockchain; and receive a second transaction identifier that is of a second transaction and that is sent by a second node, where the second node maintains a second blockchain, the first transaction and the second transaction are associated cross-chain transactions, and the second transaction is a transaction on the second blockchain;

a processing module 1002, configured to generate a first block, where the first block includes the second transaction identifier of the second transaction; and generate a second block, where the second block includes the first transaction identifier of the first transaction; and a sending module 1003, configured to send the first block to the first node, and send the second block to the second node.

Optionally, the receiving module 1001 is further configured to receive a first transaction identifier that is of the second transaction and that is sent by the first node.

The second block further includes the first transaction identifier of the second transaction.

Optionally, the receiving module 1001 is further configured to receive a second transaction identifier that is of the first transaction and that is sent by the second node.

The first block further includes the second transaction identifier of the first transaction.

Figure 11:
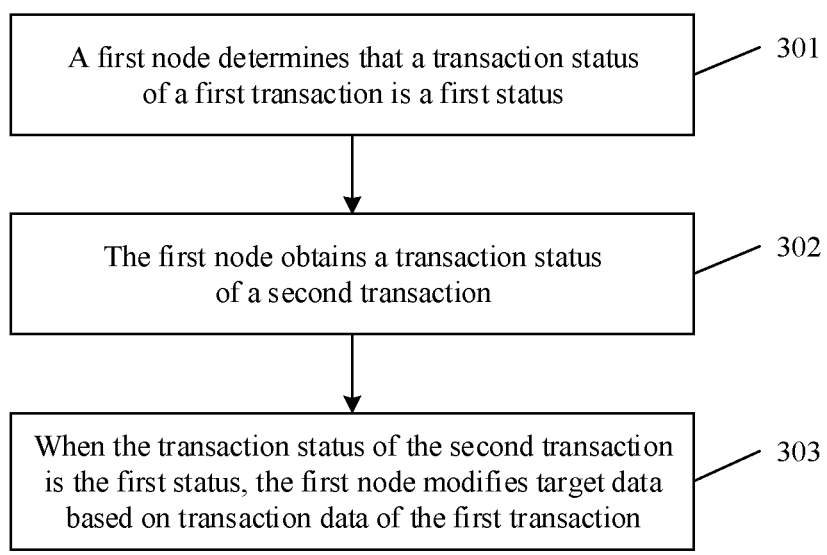
FIG. 11 is a diagram of a cross-chain transaction method according to an embodiment.

FIG. 11 is a diagram of a cross-chain transaction method according to an embodiment. As shown in FIG. 11, the cross-chain transaction method includes the following steps.

301: A first node determines that a transaction status of a first transaction is a first status, where the first status indicates that consensus verification on the transaction succeeds.

In this embodiment of this application, the first transaction and a second transaction are associated cross-chain transactions. The first transaction is a transaction on a first blockchain, and the second transaction is a transaction on a second blockchain.

In this embodiment of this application, that the first transaction is a transaction on a first blockchain may be understood as that a transaction operation of the first transaction may cause a status change of a ledger of the first blockchain. Similarly, that the second transaction is a transaction on a second blockchain may be understood as that a transaction operation of the second transaction may cause a status change of a ledger of the second blockchain.

The following uses an example in which the first blockchain and the second blockchain are consortium blockchains (fabric chains) for description.

For example, when a user initiates a cross-chain transaction on a first client, the cross-chain transaction includes two associated cross-chain sub-transactions (the first transaction and the second transaction). Specifically, the user may perform a transaction operation through the first client. The first client may generate, based on the transaction operation of the user, transaction data corresponding to the first transaction. The transaction operation may be an operation that causes the status changes of the ledgers on the first blockchain and the second blockchain. The transaction data may include but is not limited to a user identifier, a transaction parameter (for example, a transaction amount), a transaction time, and the like. The first client may generate transaction information about the first transaction based on the transaction data corresponding to the first transaction. The transaction information may include a transaction identifier, a contract identifier and a contract method of a contract to be invoked by the transaction, the transaction data, a client signature, and the like.

It should be noted that in this embodiment of this application, the first client may further generate, based on the transaction operation of the user, transaction data corresponding to the second transaction, and send the transaction data corresponding to the second transaction to a second client. The second client may generate transaction information about the second transaction based on the transaction data corresponding to the second transaction. The transaction information may include a transaction identifier, a contract identifier and a contract method of a contract to be invoked by the transaction, the transaction data, a client signature, and the like.

The transaction identifier may be generated by the client. The transaction identifier may be used to distinguish and determine an operation that is performed on a ledger and that corresponds to the transaction. The transaction identifier may be a character string including digits and letters. In some application scenarios, for each transaction, a hash function may be used to process the transaction data, an operation performed on a ledger corresponding to the transaction, and the like. An obtained hash value is used as a transaction identifier of the transaction.

Specifically, the first client may process, according to the hash function, information such as the transaction data of the first transaction and an operation performed on a ledger corresponding to the first transaction. An obtained hash value is used as the transaction identifier of the first transaction.

It should be noted that the second client may perform an action that is the same as or similar to that of the first client, and details are not repeatedly described.

The client signature may be a signature generated by the first client based on a private key of the first client. The private key of the first client may be a hash value generated according to a hash algorithm, or a random number generated according to a random number generation function, or the like.

The contract identifier is an identifier of a smart contract, and all nodes on the blockchain comply with the smart contract. The smart contract may be an application running on a blockchain network. In some application scenarios, the smart contract is also referred to as a chaincode. The chaincode includes a system chaincode and a user chaincode. The system chaincode is used to implement system-level functions, including system configuration, user chaincode deployment and upgrade, and verification on a user transaction signature and an endorsement policy. The user chaincode is used to implement an application function of the user. The chaincode may be compiled into an independent application.

On the blockchain network, transaction data indicated by transaction information initiated by the client needs to be verified by one or more endorsement nodes.

In this embodiment of this application, after generating the transaction information about the first transaction, the first client may send the transaction information to an endorsement node in a first node cluster.

The smart contract may be pre-installed on each endorsement node. For the transaction information about the first transaction, the endorsement node may invoke the smart contract to verify the first transaction.

Optionally, in an embodiment, the endorsement node may be preset by the first client. In some application scenarios, before sending the transaction information about the first transaction to the endorsement node, the first client may invoke an endorsement policy in the smart contract, to determine, from nodes included in the first node cluster, at least one endorsement node that endorses the transaction information about the first transaction. In other words, in these application scenarios, the endorsement node may be selected, by the first client based on a preset endorsement policy, from the nodes included in the first node cluster.

After receiving the transaction information that is about the first transaction and that is sent by the first client, the endorsement node invokes related code in the smart contract to simulate execution of the first transaction indicated by the transaction information. For example, the endorsement node uses the transaction data in the transaction information about the first transaction as an input, simulates execution of the first transaction on a ledger corresponding to the endorsement node, and generates a transaction result including an execution return value, a read operation set, and a write operation set. The endorsement node may package the read operation set, the write operation set, an endorsement result (successful or failed), and an endorsement signature of the endorsement node, to generate an endorsement response. In addition, the endorsement response may further include an identifier of the client corresponding to the transaction information and the transaction identifier.

The endorsement signature of the endorsement node may be generated by the endorsement node based on a private key corresponding to the endorsement node. The private key of the endorsement node may be a hash value generated according to the hash algorithm, or a random number generated according to the random number generation function.

In this embodiment of this application, the endorsement node may send a plurality of endorsement responses to the client.

The first client may receive an endorsement response sent by each endorsement node, and then determine whether the endorsement response meets a preset rule.

Optionally, in an embodiment, the first client may match a client identifier and a transaction identifier that are included in transaction information generated based on a user operation with a client identifier and a transaction identifier in a received endorsement response sent by a preset endorsement node. If the matching succeeds, the first client further determines whether the endorsement response meets the preset rule.

Optionally, in an embodiment, the first client may determine whether the endorsement response includes information indicating that the endorsement result of the endorsement node for the transaction information about the first transaction is "successful". If it is determined that the endorsement response includes information indicating that an endorsement result of the preset endorsement node for the transaction information about the first transaction is "successful", it is determined that the endorsement response meets the preset rule. Alternatively, the first client determines whether a quantity of endorsement nodes, corresponding to a received endorsement response indicating that an endorsement result is "successful", is greater than or equal to a preset threshold. If it is determined that the quantity of endorsement nodes, corresponding to the received endorsement response indicating that the endorsement result is "successful", is greater than or equal to the preset threshold, it is determined that the endorsement response meets the preset rule. Alternatively, the first client determines whether an endorsement node whose weight is greater than a preset weight threshold is included in endorsement nodes corresponding to the received endorsement response indicating that the endorsement result is "successful". If it is determined that the endorsement node whose weight is greater than the preset weight threshold is included in the endorsement nodes corresponding to the received endorsement response indicating that the endorsement result is "successful", it is determined that the endorsement response meets the preset rule.

It should be noted that the foregoing method for determining the endorsement node and the method for verifying the transaction information about the first transaction by the endorsement node are well-known technologies that are widely studied and applied currently, and details are not described herein again.

It should be noted that there may be a plurality of endorsement nodes, and correspondingly, there may be a plurality of endorsement responses. Each endorsement response includes an endorsement signature of one endorsement node. In other words, the first client may receive a plurality of endorsement signatures.

In this embodiment of this application, after determining that the endorsement response meets the preset rule, the first client may send the transaction information about the first transaction and the plurality of endorsement signatures included in the plurality of endorsement responses to a second node cluster.

In this embodiment of this application, a node included in the second node cluster maintains the first blockchain. The second node cluster is a sorting cluster (orderer group), and includes a plurality of sorting nodes. Each sorting node may be an abstract node deployed on a server, and each sorting node may be configured to provide a sorting service in a blockchain technology.

The plurality of sorting nodes included in the second node cluster may perform global sorting on received transaction data, and combine a batch of sorted transaction data to generate a block structure.

In this embodiment, the block structure may include but is not limited to the following data: a hash value corresponding to a current block number and obtained according to the hash algorithm, a hash value corresponding to a previous block number, a timestamp, and a plurality of pieces of transaction data.

After one or more sorting nodes in the second node cluster receive N pieces of transaction information (including at least the transaction information about the first transaction and the plurality of endorsement signatures included in the plurality of endorsement responses) transmitted by the first client, the at least one sorting node may generate M corresponding blocks, sort the M blocks, and transmit the M blocks to the first node cluster, so that the first node cluster verifies the M blocks, and sequentially adds verified blocks to a corresponding blockchain.

In this embodiment of this application, a node in the first node cluster may receive a third block. The third block includes the transaction data of the first transaction and the plurality of endorsement signatures corresponding to the first transaction. It should be noted that, for ease of description, the following describes the node in the first node cluster as the first node.

The first node receives the block including the transaction data of the first transaction and the plurality of endorsement signatures corresponding to the first transaction, and may perform consensus verification on the third block. Specifically, the first node may verify the plurality of endorsement signatures, verify a transaction structure in the transaction information, perform multi-version concurrency control (multi version concurrency control, mvcc) verification on the block, and the like.

If consensus verification performed by the first node on the third block succeeds, it may be determined that the transaction status of the first transaction is the first status. The first status indicates that the consensus verification on the transaction succeeds.

If consensus verification performed by the first node on the third block fails, it may be determined that the transaction status is a third status. The third status indicates that the consensus verification on the transaction fails.

Optionally, the first node may add the third block to the first blockchain, and mark the transaction status of the first transaction on the third block.

In this embodiment of this application, after determining that the transaction status of the first transaction is the first status, the first node adds the third block to the corresponding blockchain even if a transaction status of the second transaction is not determined, so that execution of a subsequent transaction is not blocked.

In the prior art, if consensus verification performed by the first node on a block succeeds, the first node marks a field that is on the block and that is related to the transaction status of the first transaction as valid, and executes the first transaction. Specifically, the first node may modify a status database (for example, an account balance and a transaction time) corresponding to the first transaction. In this case, if the transaction status of the subsequent second transaction is invalid, because data that is related to the first transaction and that is in the status database corresponding to the first transaction is modified and takes effect, the first transaction is executed, but the second transaction is not executed.

In this embodiment of this application, when determining that the consensus verification on the first transaction succeeds, the first node may mark a field that is on the third block and that is related to the transaction status of the first transaction as valid pending, and not modify a state machine of the first node.

It should be noted that, optionally, if the first node determines that the transaction status of the first transaction is the third status (for example, invalid), the first node may mark the field that is on the third block and that is related to the transaction status of the first transaction as invalid.

Optionally, in an embodiment, the first node may send a third transaction to a third node in a third node cluster. The third transaction includes the transaction status of the first transaction.

Optionally, in an embodiment, the third transaction may include transaction status indication information, and the transaction status indication information may indicate the transaction status of the first transaction. For example, the transaction status indication information may be a character string. When the transaction status of the first transaction is the first status, the transaction status indication information may be "pending" or another character string that may indicate that the consensus verification succeeds. When the transaction status of the first transaction is the third status, the transaction status information may be "invalid" or another character string that may indicate that the consensus verification fails.

In this embodiment of this application, a node included in the third node cluster maintains a third blockchain. The third node cluster is a sorting cluster (orderer group), and includes a plurality of sorting nodes. Each sorting node may be an abstract node deployed on the server, and each sorting node may be configured to provide a sorting service in the blockchain technology.

In this embodiment of this application, the third node cluster may further receive the transaction status that is of the second transaction and that is sent by the second node. The transaction status of the second transaction is determined and sent to the third node cluster by the second node.

In this embodiment, the plurality of sorting nodes included in the third node cluster may perform global sorting on received transaction data, and combine a batch of sorted transaction data to generate a block structure.

Specifically, the third node cluster may generate a first block, and the first block includes the transaction status of the first transaction and the transaction status of the second transaction.

It should be noted that the transaction status of the first transaction and the transaction status of the second transaction may be on a same block, or may be on different blocks. This is not limited herein.

302: The first node obtains the transaction status of the second transaction.

In this embodiment of this application, the first node may obtain a first block on the third blockchain. The first block includes the transaction status of the second transaction.

Specifically, the transaction status of the second transaction may be the first status or the third status. The first status indicates that the consensus verification on the transaction succeeds, and the third status indicates that the consensus verification on the transaction fails. The first node may receive the first block that is sent by the third node and that includes the transaction status of the second transaction.

303: When the transaction status of the second transaction is the first status, the first node modifies target data based on the transaction data of the first transaction, where the target data is data that is in the state machine of the first node and that is related to the first transaction.

In this embodiment of this application, the first node obtains the transaction status of the second transaction, to determine whether the transaction status of the second transaction is the first status or the third status, and when the transaction status of the second transaction is the first status, the first node modifies the state machine of the first node based on the transaction data of the first transaction.

For example, after determining that the consensus verification on the first transaction succeeds, the first node may determine that the transaction status of the first transaction is the first status. For example, the first node may mark the transaction status of the first transaction as pending on a block of the first transaction. When the first node determines that the transaction status of the second transaction is also pending, the first node may modify the transaction status that is of the first transaction and that is marked on the block of the first transaction to valid, and modify the state machine of the first node based on the transaction data of the first transaction.

In this embodiment of this application, the first node obtains the transaction status of the second transaction, to determine whether the transaction status of the second transaction is the first status or the third status, and when the transaction status of the second transaction is the third status, the first node does not modify the state machine of the first node based on the transaction data of the first transaction.

For example, after determining that the consensus verification on the first transaction succeeds, the first node may determine that the transaction status of the first transaction is the first status. For example, the first node may mark the transaction status of the first transaction as pending on the block of the first transaction. When the first node determines that the transaction status of the second transaction is invalid, the first node may modify the transaction status that is of the first transaction and that is marked on the block of the first transaction to invalid, and not modify the state machine of the first node based on the transaction data of the first transaction.

It should be noted that in the foregoing embodiments, only an example in which the cross-chain transaction includes the first transaction and the second transaction is used for description. In actual application, the cross-chain transaction may alternatively include more than two transactions. This is not limited in this application. For a specific implementation, refer to the foregoing embodiments. Details are not described herein again.

It should be noted that in an application scenario, there may be a dependency relationship between a common transaction and a cross-chain transaction. Specifically, there may be a dependency relationship between transaction data of the common transaction and transaction data of the cross-chain transaction. It should be noted that the common transaction in this embodiment is a transaction that can be independently executed.

For example, there is a cross-chain transaction A and a common transaction A, and the cross-chain transaction A includes the first transaction and the second transaction.

The first transaction needs to modify a balance of an account A, and the common transaction A also needs to modify the balance of the account A. The first transaction is before the third transaction in time sequence.

In this case, the common transaction A can be executed only after the first transaction is completed.

However, because the first transaction is a cross-chain transaction, execution of the first transaction depends on transaction results of the first transaction and the second transaction, and a transaction time may be long. Therefore, a waiting time of the common transaction A may be long.

In this embodiment, if the first node further needs to process the third transaction in addition to the first transaction, where the third transaction is a common transaction, namely, a transaction that can be independently completed, instead of a cross-chain sub-transaction, and transaction data of the third transaction includes a target transaction parameter, correspondingly, the transaction data of the first transaction also includes the target transaction parameter, and an execution time sequence corresponding to the third transaction is after an execution time sequence of the first transaction. In other words, if the first node first receives a block on which the first transaction is located, or the block on which the first transaction is located is the same as a block on which the third transaction is located, the third transaction is after the first transaction on this block.

In this case, if the first node determines a transaction status of the third transaction only after determining the transaction status of the first transaction, a waiting time of the third transaction may be long.

In this embodiment of this application, the first node may directly determine that the transaction status of the third transaction is the third status.

Optionally, after the first node modifies the state machine of the first node based on the transaction data of the first transaction, the method further includes:

The first node broadcasts synchronization information to a fourth node, where the synchronization information is used to indicate that the first node has modified the state machine of the first node, and the first node and the fourth node belong to a same node cluster.

Optionally, in an embodiment, after the first node determines the transaction status of the first transaction, and executes or does not execute the first transaction based on the transaction status of the first transaction (modifies the state machine of the first node based on the transaction data of the first transaction or does not modify the state machine of the first node based on the transaction data of the first transaction), the synchronization information indicating that the first node completes the first transaction may be sent to the second node cluster. The second node cluster may generate blocks including the synchronization information, and sort the blocks to generate a new block. Correspondingly, a node (the fourth node) other than the first node in the first node cluster may receive the block that includes the synchronization information and that is sent by the second node cluster. Similarly, the node (the fourth node) other than the first node in the first node cluster may alternatively send, to the second node cluster, the synchronization information indicating that the first node completes the first transaction. The second node cluster may generate the blocks including the synchronization information, and sort the blocks to generate the new block.

If the first node determines the transaction status of the first transaction, executes or does not execute the first transaction based on the transaction status of the first transaction, and receives synchronization information that is about the first transaction and that is sent by another node in the first node cluster, the first node may determine that the first transaction is completed on the another node, and may further consider that the first transaction does not affect the third transaction. In this case, the third transaction can be normally executed.

If the first node does not determine the transaction status of the first transaction, but receives the synchronization information that is about the first transaction and that is sent by the another node in the first node cluster, the first node may determine that the first transaction is completed on the another node, and may further consider that the first transaction does not affect the third transaction. In this case, the third transaction can be normally executed.

If the first node determines the transaction status of the first transaction, but does not receive the synchronization information that is about the first transaction and that is sent by the another node in the first node cluster, the first node may determine that the first transaction is not completed on the another node, and may further consider that the first transaction may affect the third transaction. In this case, the first node may directly determine that the transaction status of the third transaction is the third status.

If the first node does not determine the transaction status of the first transaction, and does not receive the synchronization information that is about the first transaction and that is sent by the another node in the first node cluster, the first node may determine that the first transaction is not completed on the another node, and may further consider that the first transaction may affect the third transaction. In this case, the first node may directly determine that the transaction status of the third transaction is the third status.

This application provides a cross-chain transaction method, including: A first node determines that a transaction status of a first transaction is a first status. The first status indicates that consensus verification on the transaction succeeds. The first node obtains a transaction status of a second transaction. When the transaction status of the second transaction is the first status, the first node modifies a state machine of the first node based on transaction data of the first transaction.

In the foregoing manner, after determining that the transaction status of the first transaction is the first status, the first node does not directly determine, based on the first status, whether to modify the state machine of the first node, but receives the transaction status of the second transaction, and modifies the state machine of the first node when the transaction status of the second transaction is the first status. Therefore, whether a cross-chain sub-transaction is executed depends not only on a consensus verification result of the first transaction, but also on a consensus verification result of another associated cross-chain transaction. A case in which only part of associated cross-chain transactions is successfully executed and the other part is not successfully executed does not occur. In this way, atomic execution of the cross-chain transactions on a plurality of blockchains is implemented.

Figure 12:
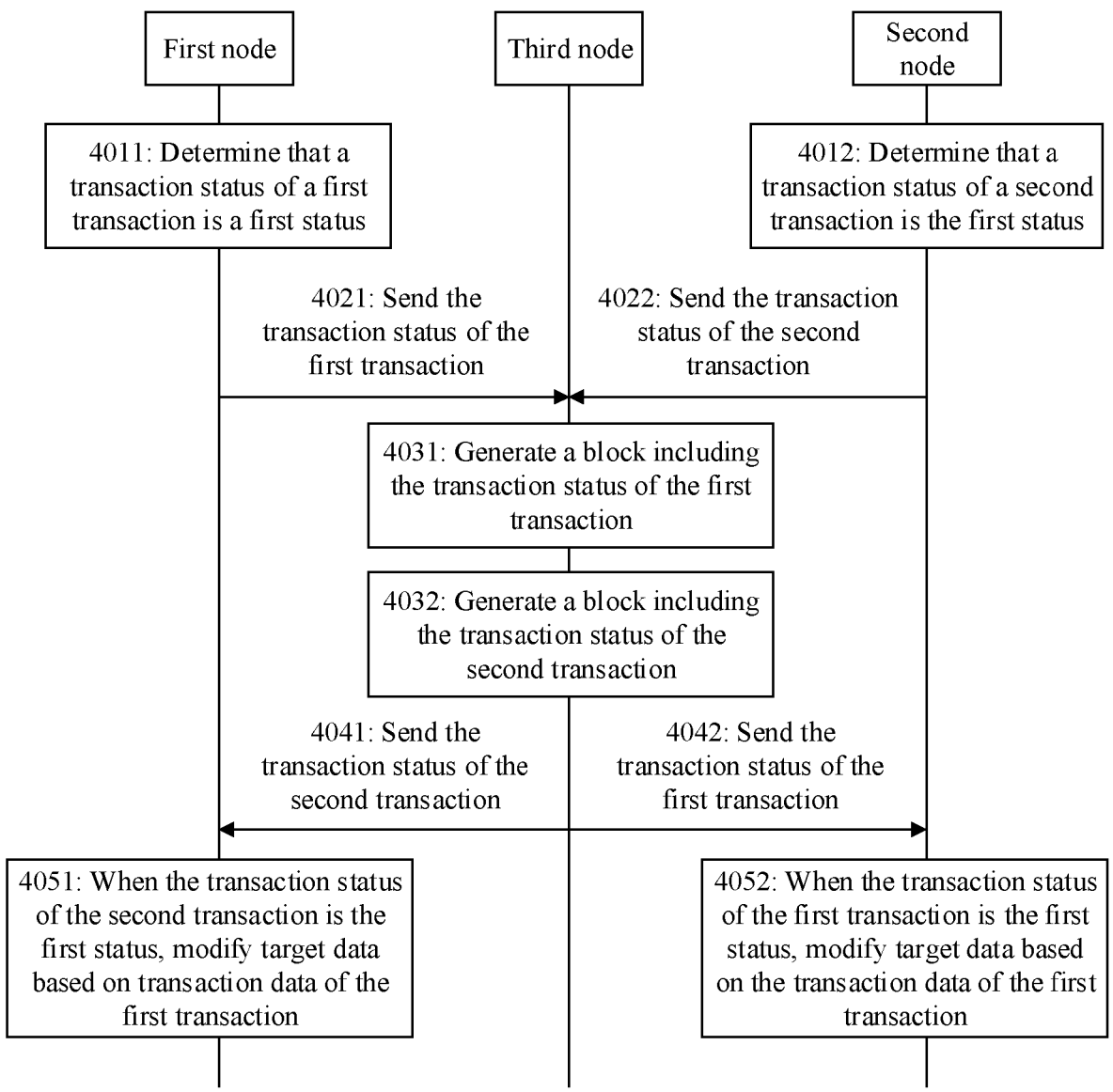
FIG. 12 is a diagram of a cross-chain transaction method according to an embodiment.

FIG. 12 is a diagram of a cross-chain transaction method according to an embodiment. Specifically, the cross-chain transaction method includes:

4011: A first node determines that a transaction status of a first transaction is a first status.

4012: A second node determines that a transaction status of a second transaction is the first status.

4021: The first node sends the transaction status of the first transaction.

4022: The second node sends the transaction status of the second transaction.

4031: A third node generates a block including the transaction status of the first transaction.

4032: The third node generates a block including the transaction status of the second transaction.

4041: The third node sends the transaction status of the second transaction.

4042: The third node sends the transaction status of the first transaction.

4051: When the transaction status of the second transaction is the first status, the first node modifies target data based on transaction data of the first transaction.

4052: When the transaction status of the first transaction is the first status, the second node modifies target data based on the transaction data of the first transaction.

For specific descriptions of step 4011 to step 4052, refer to the foregoing embodiments. Details are not described herein again.

Figure 13A:
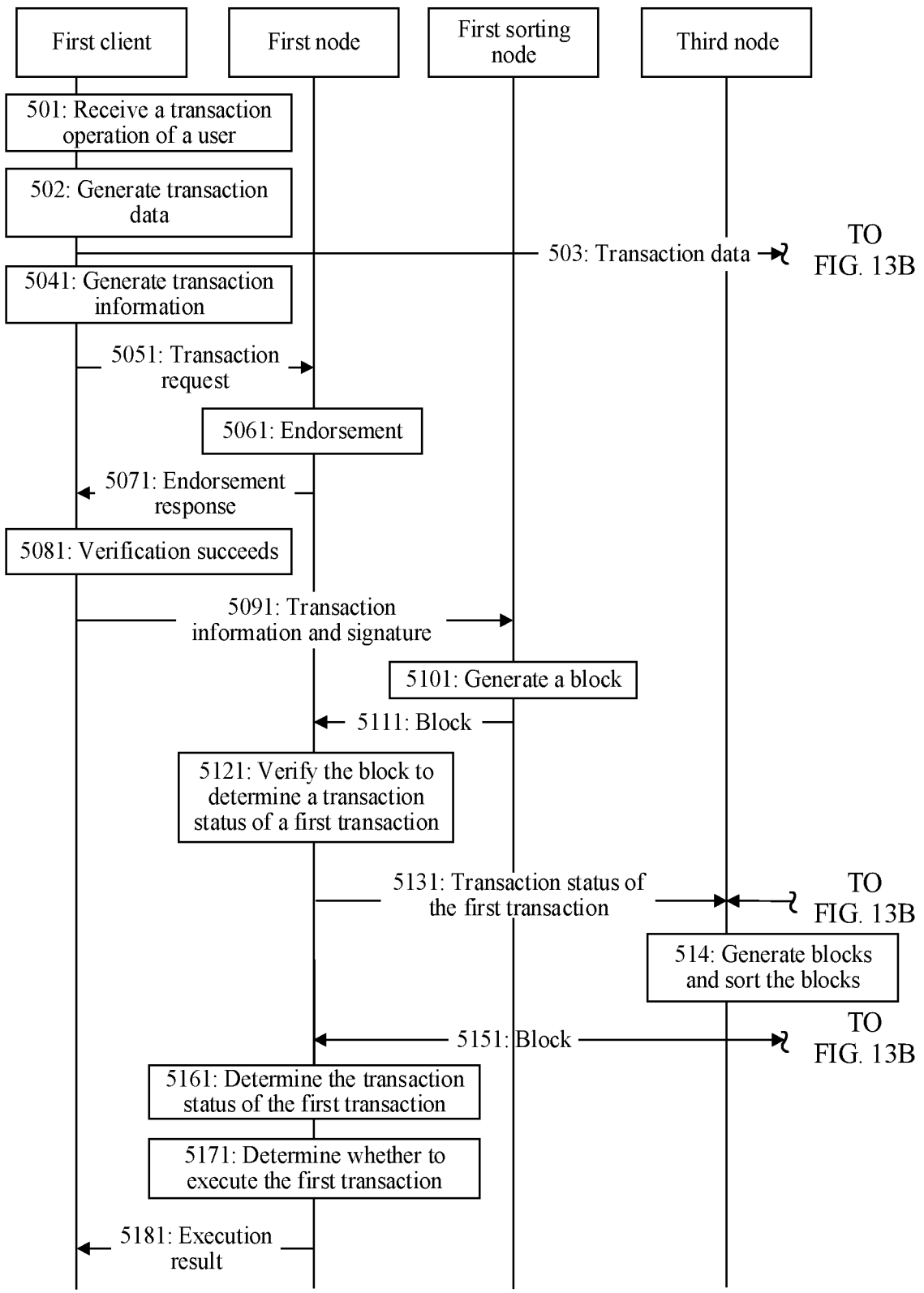
FIG. 13A and FIG. 13B are a diagram of a cross-chain transaction method according to an embodiment.
Figure 13B:
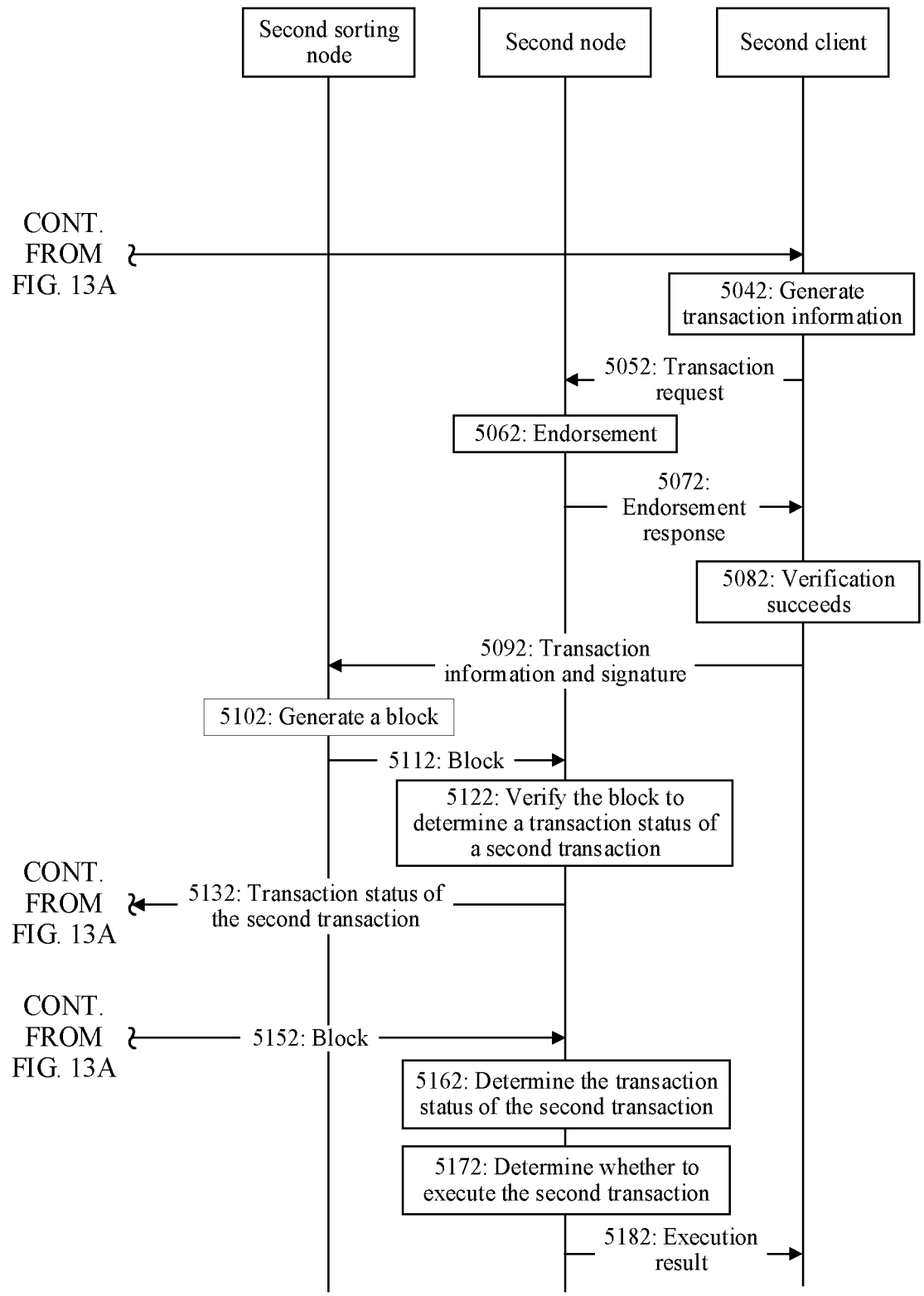

More specifically, FIG. 13A and FIG. 13B are a diagram of a cross-chain transaction method according to an embodiment. Specifically, the cross-chain transaction method includes the following steps.

501: A first client receives a transaction operation of a user.

In this embodiment of this application, the transaction operation may be an operation that causes status changes of ledgers on a first blockchain and a second blockchain.

502: The first client generates transaction data.

In this embodiment of this application, the first client may generate, based on the transaction operation of the user, transaction data corresponding to a first transaction. The transaction data may include but is not limited to a user identifier, a transaction parameter (for example, a transaction amount), a transaction time, and the like.

503: The first client sends the transaction data to a second client.

In this embodiment of this application, the first client may further generate, based on the transaction operation of the user, transaction data corresponding to a second transaction, and send the transaction data corresponding to the second transaction to the second client.

5041: The first client generates transaction information.

In this embodiment of this application, the first client may generate transaction information about the first transaction based on the transaction data corresponding to the first transaction. The transaction information may include a transaction identifier, a contract identifier and a contract method of a contract to be invoked by the transaction, the transaction data, a client signature, and the like.

5042: The second client generates transaction information.

In this embodiment of this application, the second client may generate transaction information about the second transaction based on the transaction data corresponding to the second transaction. The transaction information may include a transaction identifier, a contract identifier and a contract method of a contract to be invoked by the transaction, the transaction data, a client signature, and the like.

5051: The first client sends a transaction request to a first endorsement node.

In this embodiment of this application, the first endorsement node may be some or all nodes in a first node cluster. After generating the transaction information about the first transaction, the first client may send the transaction information to the endorsement node in the first node cluster. A smart contract may be pre-installed on each endorsement node. For the transaction information about the first transaction, the endorsement node may invoke the smart contract to verify the first transaction.

5052: The second client sends a transaction request to a second endorsement node.

In this embodiment of this application, the second endorsement node may be some or all nodes in a second node cluster. After generating the transaction information about the second transaction, the second client may send the transaction information to the endorsement node in the second node cluster. The smart contract may be pre-installed on each endorsement node. For the transaction information about the second transaction, the endorsement node may invoke the smart contract to verify the second transaction.

5061: The first endorsement node performs endorsement.

In this embodiment of this application, after receiving the transaction information that is about the first transaction and that is sent by the first client, the first endorsement node invokes related code in the smart contract to simulate execution of the first transaction indicated by the transaction information. For example, the first endorsement node uses the transaction data in the transaction information about the first transaction as an input, simulates execution of the first transaction on a ledger corresponding to the first endorsement node, and generates a transaction result including an execution return value, a read operation set, and a write operation set. The first endorsement node may package the read operation set, the write operation set, an endorsement result (successful or failed), and an endorsement signature of the endorsement node, to generate an endorsement response.

5062: The second endorsement node performs endorsement.

In this embodiment of this application, after receiving the transaction information that is about the second transaction and that is sent by the second client, the second endorsement node invokes related code in the smart contract to simulate execution of the second transaction indicated by the transaction information. For example, the endorsement node uses the transaction data in the transaction information about the second transaction as an input, simulates execution of the second transaction on a ledger corresponding to the endorsement node, and generates a transaction result including an execution return value, a read operation set, and a write operation set. The second endorsement node may package the read operation set, the write operation set, an endorsement result (successful or failed), and an endorsement signature of the endorsement node, to generate an endorsement response.

5071: The first endorsement node sends the endorsement response to the first client.

5072: The second endorsement node sends the endorsement response to the second client.

5081: Verification performed by the first client succeeds.

In this embodiment of this application, the first client may receive the endorsement response sent by the first endorsement node, and then determine whether the endorsement response meets a preset rule.

5082: Verification performed by the second client succeeds.

In this embodiment of this application, the second client may receive the endorsement response sent by the second endorsement node, and then determine whether the endorsement response meets a preset rule.

5091: The first client sends the transaction information and the signature to a first sorting node.

In this embodiment of this application, if the first client determines that the endorsement response sent by the first endorsement node meets the preset rule, the first client may send the transaction information about the first transaction and a plurality of endorsement signatures included in a plurality of endorsement responses to the first sorting node.

5092: The second client sends the transaction information and the signature to a second sorting node.

In this embodiment of this application, if the second client determines that the endorsement response sent by the second endorsement node meets the preset rule, the second client may send the transaction information about the second transaction and a plurality of endorsement signatures included in a plurality of endorsement responses to the second sorting node.

5101: The first sorting node generates a block.

5102: The second sorting node generates a block.

5111: The first sorting node sends the block to a first node.

In this embodiment of this application, after the first sorting node receives N pieces of transaction information (including at least the transaction information about the first transaction and the plurality of endorsement signatures included in the plurality of endorsement responses) transmitted by the first client, the first sorting node may generate M corresponding blocks, sort the M blocks, and transmit the M blocks to the first node.

5112: The second sorting node sends the block to a second node.

In this embodiment of this application, after the second sorting node receives N pieces of transaction information (including at least the transaction information about the second transaction and the plurality of endorsement signatures included in the plurality of endorsement responses) transmitted by the second client, the second sorting node may generate M corresponding blocks, sort the M blocks, and transmit the M blocks to the second node.

5121: The first node verifies the block, to determine a transaction status of the first transaction.

In this embodiment of this application, the first node receives the block that includes the transaction information about the first transaction and the plurality of endorsement signatures corresponding to the first transaction, and may verify the block. Specifically, the first node may verify the plurality of endorsement signatures, verify a transaction structure in the transaction information, perform multi-version concurrency control (multi version concurrency control, mvcc) verification on the block, and the like.

5122: The second node verifies the block, to determine a transaction status of the second transaction.

In this embodiment of this application, the second node receives the block that includes the transaction information about the second transaction and the plurality of endorsement signatures corresponding to the second transaction, and may verify the block. Specifically, the second node may verify the plurality of endorsement signatures, verify a transaction structure in the transaction information, perform multi-version concurrency control (multi version concurrency control, mvcc) verification on the block, and the like.

5131: The first node sends the transaction status of the first transaction to a third node.

5132: The second node sends the transaction status of the second transaction to the third node.

514: The third node generates blocks and sorts the blocks.

5151: The third node sends the block to the first node.

5152: The third node sends the block to the second node.

In this embodiment of this application, after the first sorting node receives the N pieces of transaction information (including at least the transaction information about the first transaction and the plurality of endorsement signatures included in the plurality of endorsement responses of the first transaction, and the transaction information about the second transaction and the plurality of endorsement signatures included in the plurality of endorsement responses of the second transaction) transmitted by the first client, a third node cluster may generate the M corresponding blocks, sort the M blocks, and transmit the M blocks to the first node and the second node.

5161: The first node determines the transaction status of the first transaction based on the transaction status of the first transaction and the transaction status of the second transaction.

5162: The second node determines the transaction status of the second transaction based on the transaction status of the first transaction and the transaction status of the second transaction.

5171: The first node determines, based on the transaction status of the first transaction, whether to execute the first transaction.

5172: The second node determines, based on the transaction status of the second transaction, whether to execute the second transaction.

5181: The first node sends an execution result to the first client.

5182: The second node sends an execution result to the second client.

For how the first node determines, based on the transaction status of the first transaction, whether to execute the first transaction, and how the second node determines, based on the transaction status of the second transaction, whether to execute the second transaction, refer to the descriptions in the foregoing embodiments. Details are not described herein again.

It should be noted that the foregoing description is provided by using an example in which the first blockchain and the second blockchain are consortium blockchains (fabric chains). When the first blockchain and the second blockchain are heterogeneous blockchains that comply with different blockchain basic protocols, the first blockchain may be, for example, an Ethereum chain. In this case, after determining that the transaction status of the first transaction is the first status, the first node may deploy the first transaction on the Ethereum chain, and lock the first transaction. After receiving the transaction status that is of the second transaction and that is sent by the third node cluster, when the transaction status of the second transaction is the first status, the first node determines that the transaction status of the first transaction is a second status, and execute the first transaction when the first transaction is in the second status.

It should be noted that the first node in this application may not belong to the Ethereum chain, but is a node of a newly added distributed node cluster.

In this embodiment of this application, if the transaction status of the first transaction is a third status, the first transaction is not executed. Specifically, the first node may indicate the Ethereum chain to perform reversal on the first transaction, that is, indicate the Ethereum chain not to execute the first transaction.

In this embodiment of this application, if the transaction status of the first transaction is the second status, the first transaction is executed. Specifically, the first node may indicate the Ethereum chain to unlock the first transaction, that is, indicate the Ethereum chain to execute the first transaction.

It should be noted that, if the first blockchain is a fabric chain, and the second blockchain is an Ethereum chain, the first blockchain performs steps performed by the fabric chain in the foregoing embodiment, and the second blockchain performs steps performed by the Ethereum chain in the foregoing embodiment.

It should be noted that in another application scenario, the first blockchain or the second blockchain may alternatively be a bitcoin chain. This is not limited herein.

Figure 14:
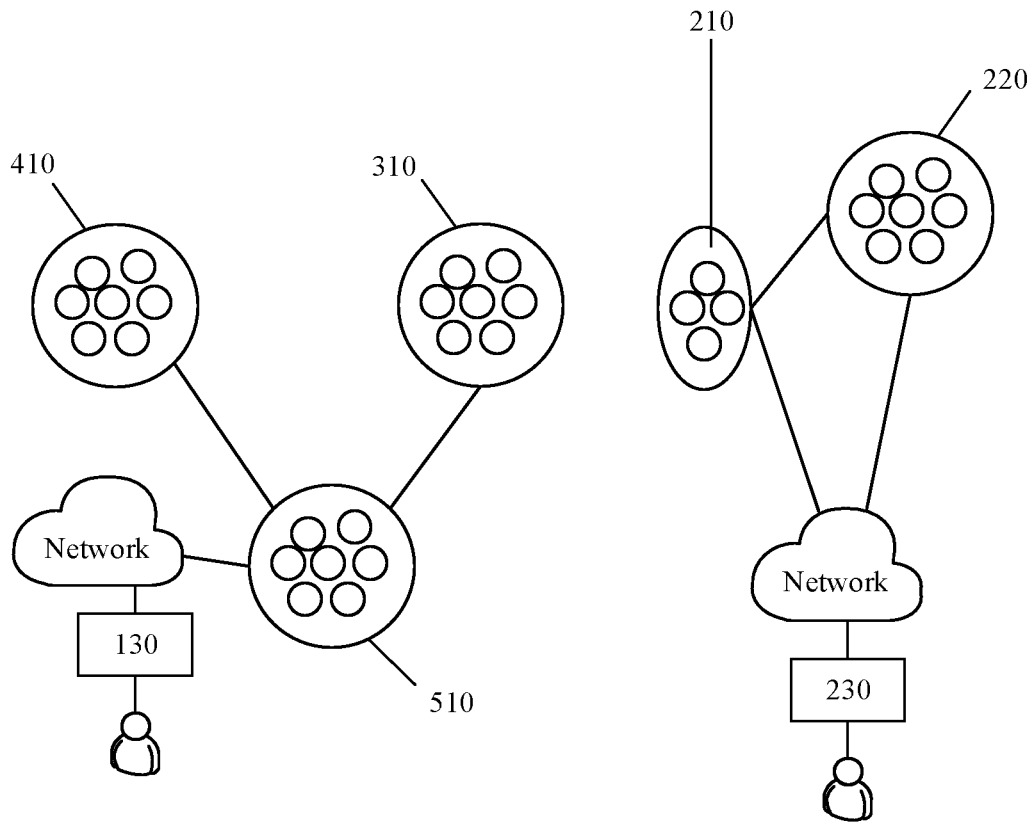
FIG. 14 is a diagram of a blockchain network according to an embodiment.

FIG. 14 is a diagram of a blockchain network according to an embodiment. As shown in FIG. 14, the blockchain network includes a network 40 of a blockchain 4, a network 20 of a blockchain 2, a network 30 of a blockchain 3, a first client 130, a second client 230, and a node cluster 510. A blockchain corresponding to the network 40 of the blockchain 4 is an Ethereum chain.

In this embodiment of this application, for specific descriptions of the network of the blockchain 2 and the second client 230, refer to the descriptions in the embodiment corresponding to FIG. 2. Details are not described herein again.

In this embodiment of this application, the network 40 of the blockchain 4 includes a node cluster 410, and the node cluster 410 includes a plurality of peer nodes. These peer nodes jointly maintain the Ethereum chain.

The node cluster 510 includes a plurality of peer nodes. Different from the schematic diagram of the architecture in FIG. 1, the network 30 of the blockchain 3 does not include a node cluster 110. In this case, the node cluster 510 may complete a function of the node cluster 110. In other words, the node cluster 510 may serve as an adapter to provide the function of the node cluster 110.

For example, a user may initiate a transaction on the first client 130. The first client 130 may generate corresponding transaction information, and send the transaction information to the cluster 510 through a network. The cluster 510 includes a plurality of first nodes. After the first node determines that a transaction status of the transaction is a first status, the first node may deploy the transaction on the node cluster 410. Correspondingly, the node cluster 410 may lock the transaction. The first node may further send a transaction status of a first transaction to a cluster 310.

Similarly, a second node may send a transaction status of a second transaction to the cluster 310.

The cluster 310 may be a sorting cluster, and includes a plurality of third nodes. The third nodes may be sorting nodes. The sorting nodes may perform global sorting on received transaction data, combine a batch of sorted transaction data to generate a block, and transmit the block to the cluster 510 and a cluster 210.

The cluster 510 may determine the transaction status of the transaction based on the received block, and when the transaction status is a second status, indicate the node cluster 410 to execute the transaction, or when the transaction status is a third status, indicate the node cluster 410 to perform transaction reversal, that is, not to execute the transaction.

In some scenarios, a cross-chain transaction includes a plurality of associated cross-chain sub-transactions, for example, the first transaction and the second transaction. If the first transaction is that a user A transfers 10 units of currency to a user B, the first transaction is that a balance of an account A on a first blockchain is reduced by 10 units of currency, and the second transaction is that a balance of an account B on a second blockchain is increased by 10 units of currency.

However, a client may be untrusted. Therefore, there is a fraud risk, and transactions initiated by the first client and the second client may be untrue. For example, the transaction initiated by the first client is that the balance of the account A on the first blockchain is reduced by 10 units of currency, but the second transaction is that the balance of the account B on the second blockchain is increased by 20 units of currency. This damages an existing data logical relationship and is unacceptable.

To resolve the foregoing technical problem, this application provides a cross-chain transaction method.

Figure 15:
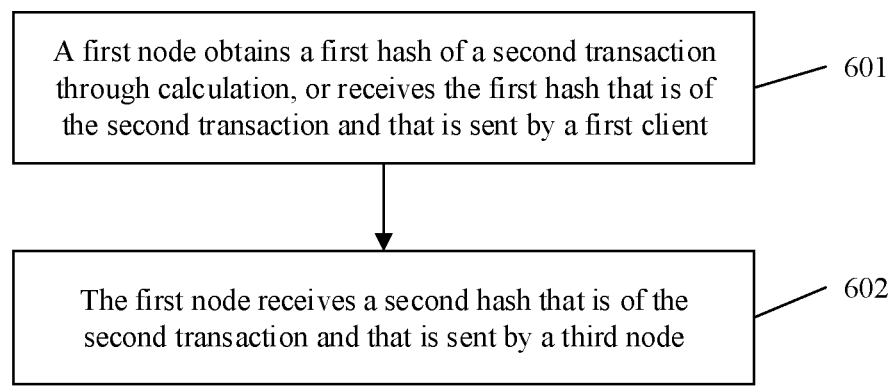
FIG. 15 is a diagram of a cross-chain transaction method according to an embodiment.

FIG. 15 is a diagram of a cross-chain transaction method according to an embodiment. As shown in FIG. 15, the cross-chain transaction method includes the following steps.

601: A first node obtains a first hash of a second transaction through calculation, or receives the first hash that is of the second transaction and that is sent by a first client, where the first client is an initiator of the first transaction.

In this embodiment of this application, a first transaction and the second transaction are associated cross-chain transactions. The first transaction is a transaction on a first blockchain, and the second transaction is a transaction on a second blockchain.

For example, when a user initiates a cross-chain transaction on the first client, the cross-chain transaction includes two associated cross-chain sub-transactions (the first transaction and the second transaction). Specifically, the user may perform a transaction operation through the first client. The first client may generate, based on the transaction operation of the user, transaction data corresponding to the first transaction. The transaction operation may be an operation that causes status changes of ledgers on the first blockchain and the second blockchain. The transaction data may include but is not limited to a user identifier, a transaction parameter (for example, a transaction amount), a transaction time, and the like. The first client may generate transaction information about the first transaction based on the transaction data corresponding to the first transaction. The transaction information may include a first hash hash (tx1) of the first transaction.

A transaction identifier may be used to distinguish and determine an operation that is performed on a ledger and that corresponds to a transaction. The first hash hash (tx1) of the first transaction may be a character string including digits and letters. In some application scenarios, for each transaction, a hash function may be used to process the transaction data, an operation performed on a ledger corresponding to the transaction, and the like. An obtained hash value is used as a transaction identifier of the transaction.

It should be noted that, in this embodiment of this application, the first client may further generate, based on the transaction operation of the user, transaction data corresponding to the second transaction, and send the transaction data corresponding to the second transaction to a second client. The second client may generate transaction information about the second transaction based on the transaction data corresponding to the second transaction. The transaction information may include a second hash hash (tx2) of the second transaction. Because the transaction identifier may distinguish and determine the operation that is performed on the ledger and that corresponds to the transaction, the second hash hash (tx2) that is of the second transaction and that is generated by the second client may uniquely indicate content executed in the second transaction.

In this embodiment of this application, in addition to the first hash hash (tx1) of the first transaction, the first client further generates a first hash exp_hash (tx2) of the second transaction.

Optionally, in an embodiment, the first client may obtain, by invoking an assistant chaincode, the first hash exp_hash (tx2) that is of the second transaction and that "should" be generated by the second client.

Specifically, after generating the transaction data corresponding to the second transaction based on the transaction operation of the user, the first client may generate the first hash exp_hash (tx2) of the second transaction by using the transaction data as an input and by invoking the assistant chaincode. The first hash exp_hash (tx2) of the second transaction may indicate a unique transaction identifier corresponding to the second transaction that should be executed by the second client.

Optionally, in an embodiment, the first client may not obtain the first hash exp_hash (tx2) of the second transaction by invoking the assistant chaincode, but obtains, by communicating with the second client, a chaincode and a parameter that should be executed by the second client, and calculates the first hash exp_hash (tx2) of the second transaction.

In this embodiment of this application, after generating the transaction information about the first transaction, the first client may send the transaction information to an endorsement node in a first node cluster. The transaction information about the first transaction includes the first hash exp_hash (tx2), and the first hash hash (tx1) of the first transaction.

After receiving the transaction information that is about the first transaction and that is sent by the first client, the endorsement node invokes related code in a smart contract to simulate execution of the first transaction indicated by the transaction information. For example, the endorsement node uses the transaction data in the transaction information about the first transaction as an input, simulates execution of the first transaction on a ledger corresponding to the endorsement node, and generates a transaction result including an execution return value, a read operation set, and a write operation set. The endorsement node may package the read operation set, the write operation set, an endorsement result (successful or failed), and an endorsement signature of the endorsement node, to generate an endorsement response. In addition, the endorsement response may further include an identifier of a client corresponding to the transaction information, the first hash exp_hash (tx2), and the first hash hash (tx1) of the first transaction.

In this embodiment of this application, the endorsement node may send a plurality of endorsement responses to the client.

The first client may receive an endorsement response sent by each endorsement node, and then determine whether the endorsement response meets a preset rule.

In this embodiment of this application, after determining that the endorsement response meets the preset rule, the first client may send the transaction information about the first transaction and a plurality of endorsement signatures included in the plurality of endorsement responses to a second node cluster. The transaction information about the first transaction includes the first hash exp_hash (tx2) and the first hash hash (tx1) of the first transaction.

In this embodiment of this application, a node included in the second node cluster maintains the first blockchain. The second node cluster is a sorting cluster (orderer group), and includes a plurality of sorting nodes. Each sorting node may be an abstract node deployed on a server, and each sorting node may be configured to provide a sorting service in a blockchain technology.

The plurality of sorting nodes included in the second node cluster may perform global sorting on received transaction data, and combine a batch of sorted transaction data to generate a block structure.

After one or more sorting nodes in the second node cluster receive N pieces of transaction information (including at least the transaction information about the first transaction and the plurality of endorsement signatures included in the plurality of endorsement responses) transmitted by the first client, the at least one sorting node may generate M corresponding blocks, sort the M blocks, and transmit the M blocks to the first node cluster, so that the first node cluster verifies the M blocks, and sequentially adds verified blocks to a corresponding blockchain.

In this embodiment of this application, a node in the first node cluster may receive a block. The block includes the transaction information about the first transaction and the plurality of endorsement signatures corresponding to the first transaction. It should be noted that, for ease of description, the following describes the node in the first node cluster as the first node.

The first node receives the block that includes the transaction information about the first transaction and the plurality of endorsement signatures corresponding to the first transaction, and may verify the block. For how the first node verifies the block, refer to the foregoing embodiments. Details are not described herein again.

The first node may send a sixth transaction to a third node. The sixth transaction includes the first hash hash (tx1) of the first transaction. Optionally, the sixth transaction includes the first hash exp_hash (tx2) of the second transaction.

In this embodiment of this application, a node included in a third node cluster maintains a third blockchain. The third node cluster is a sorting cluster (orderer group), and includes a plurality of sorting nodes. Each sorting node may be an abstract node deployed on the server, and each sorting node may be configured to provide a sorting service in the blockchain technology.

In this embodiment of this application, the third node cluster may further receive the second hash hash (tx2) of the second transaction and a second hash exp_hash (tx1) of the first transaction that are sent by the second node. Specifically, the third node cluster may further receive a fifth transaction sent by the second node. The fifth transaction may include the second hash hash (tx2) of the second transaction and the second hash exp_hash (tx1) of the first transaction.

In this embodiment of this application, the plurality of sorting nodes included in the third node cluster may perform global sorting on received transaction data, and combine a batch of sorted transaction data to generate a block structure.

Specifically, the third node cluster may generate a fourth block. The fourth block includes the second hash hash (tx2) of the second transaction and the second hash exp_hash (tx1) of the first transaction. The fourth block may further include the first hash exp_hash (tx2) of the second transaction and the first hash hash (tx1) of the first transaction.

It should be noted that the second hash hash (tx2) of the second transaction, the second hash exp_hash (tx1) of the first transaction, the first hash exp_hash (tx2) of the second transaction, and the first hash hash (tx1) of the first transaction may be on a same block, or may be on different blocks. This is not limited herein.

602: The first node receives the second hash that is of the second transaction and that is sent by the third node, where if the first hash of the second transaction is equal to the second hash of the second transaction, it indicates that the transaction data of the second transaction is correct, and if the first hash of the second transaction is not equal to the second hash of the second transaction, it indicates that the transaction data of the second transaction is incorrect.

In this embodiment of this application, the first node may obtain the fourth block on the third blockchain. The fourth block may include the second hash hash (tx2) of the second transaction. The second hash hash (tx2) of the second transaction is a transaction identifier corresponding to actual execution of the second transaction, and may uniquely indicate transaction data of the second transaction in specific execution.

Optionally, the fourth block may further include the second hash exp_hash (tx1) of the first transaction.

Similarly, the second node may receive a fifth block sent by the third node cluster. The fifth block may include the first hash hash (tx1) of the first transaction. The first hash hash (tx1) of the first transaction is a transaction identifier corresponding to actual execution of the first transaction, and may uniquely indicate transaction data of the first transaction in specific execution.

Optionally, the fifth block may further include the first hash exp_hash (tx2) of the second transaction.

In an embodiment, if the fourth block and the fifth block that are generated by the third node cluster are a same block, the first node may receive the block sent by the third node cluster. The block includes the second hash hash (tx2) of the second transaction, the second hash exp_hash (tx1) of the first transaction, the first hash hash (tx1) of the first transaction, and the first hash exp_hash (tx2) of the second transaction.

In this embodiment of this application, the first node may determine whether the second hash hash (tx2) of the second transaction is equal to the first hash exp_hash (tx2) of the second transaction, to determine whether the second transaction is executed based on correct transaction data.

Specifically, because the first hash exp_hash (tx2) of the second transaction is generated by the first client based on the transaction data of the second transaction, the first hash exp_hash (tx2) may indicate transaction data that the first client considers and that should be executed in the second transaction. The second hash hash (tx2) of the second transaction indicates transaction data actually executed in the second transaction.

Therefore, whether the second hash hash (tx2) of the second transaction is equal to the first hash exp_hash (tx2) of the second transaction is determined, to determine whether the second transaction is executed based on the correct transaction data.

Similarly, the second node may determine whether the first hash hash (tx1) of the first transaction is equal to the second hash exp_hash (tx1) of the first transaction, to determine whether the first transaction is executed based on correct transaction data.

Specifically, because the second hash exp_hash (tx1) of the first transaction is generated by the second client based on the transaction data of the first transaction, the second hash exp_hash (tx1) may indicate transaction data that the second client considers and that should be executed in the first transaction. The first hash hash (tx1) of the first transaction indicates transaction data actually executed in the second transaction.

Therefore, whether the first hash hash (tx1) of the first transaction is equal to the second hash exp_hash (tx1) of the first transaction is determined, to determine whether the first transaction is executed based on the correct transaction data.

Optionally, if the first block includes the second hash exp_hash (tx1) of the first transaction, the first node may determine whether the first hash hash (tx1) of the first transaction is equal to the second hash exp_hash (tx1) of the first transaction, to obtain a determining result of the second node.

If the second block includes the first hash exp_hash (tx2) of the second transaction, the second node may determine whether the second hash hash (tx2) of the second transaction is equal to the first hash exp_hash (tx2) of the second transaction, to obtain a determining result of the first node.

In this embodiment of this application, if the first node determines that the second hash hash (tx2) of the second transaction is equal to the first hash exp_hash (tx2) of the second transaction, the first node may determine that the second transaction is executed based on the correct transaction data.

In this embodiment of this application, if the second node determines that the first hash hash (tx1) of the first transaction is equal to the second hash exp_hash (tx1) of the first transaction, the second node may determine that the first transaction is executed based on the correct transaction data.

In this embodiment of this application, if the first node determines that the first transaction is executed based on the correct transaction data, and the second transaction is executed based on the correct transaction data, the first transaction may be executed.

In this embodiment of this application, if the first node determines that the first transaction is not executed based on the correct transaction data, and the second transaction is executed based on the correct transaction data, the first transaction is not executed.

In this embodiment of this application, if the first node determines that the first transaction is executed based on the correct transaction data, and the second transaction is not executed based on the correct transaction data, the first transaction is not executed.

In this embodiment of this application, if the second node determines that the first transaction is executed based on the correct transaction data, and the second transaction is executed based on the correct transaction data, the second transaction may be executed.

In this embodiment of this application, if the second node determines that the first transaction is not executed based on the correct transaction data, and the second transaction is executed based on the correct transaction data, the second transaction is not executed.

In this embodiment of this application, if the second node determines that the first transaction is executed based on the correct transaction data, and the second transaction is not executed based on the correct transaction data, the second transaction is not executed.

For example, if the first transaction is that a user A transfers 10 units of currency to a user B, the first transaction is that a balance of an account A on the first blockchain is reduced by 10 units of currency, and the second transaction is that a balance of an account B on the second blockchain is increased by 10 units of currency.

In this case, the first client generates the first hash hash (tx1) of the first transaction based on the transaction data of the first transaction (including that the balance of the account A on the first blockchain is reduced by 10 units of currency), and generates the first hash exp_hash (tx2) of the second transaction based on the transaction data of the second transaction (including that the balance of the account B on the second blockchain is increased by 10 units of currency).

Similarly, the second client generates the second hash exp_hash (tx1) of the first transaction based on the transaction data of the first transaction (including that the balance of the account A on the first blockchain is reduced by 10 units of currency), and generates the second hash hash (tx2) of the second transaction based on the transaction data of the second transaction (including that the balance of the account B on the second blockchain is increased by 20 units of currency). In other words, the second client wants to add more currencies to the account B.

Then, the first node receives the second hash hash (tx2) that is of the second transaction and that is sent by the third node, and the second hash hash (tx2) is different from the first hash exp_hash (tx2) of the second transaction. In this case, the first node determines that the transaction data executed in the second transaction is incorrect. In other words, the second client has a cheating behavior. Therefore, the first transaction is not executed.

It should be noted that the embodiment corresponding to FIG. 15 and the embodiment corresponding to FIG. 3 may be performed simultaneously. This is not limited herein.

This embodiment of this application provides a cross-chain transaction method, including: The first node obtains the first hash of the second transaction. The first node obtains the fourth block on the third blockchain. The fourth block includes the second hash of the second transaction. The first node determines, based on the fourth block, whether the first hash of the second transaction is equal to the second hash of the second transaction. In this embodiment of this application, the first node may determine whether the second hash of the second transaction is equal to the first hash of the second transaction, to determine whether the second transaction is executed based on the correct transaction data, and when the second transaction is not executed based on the correct transaction data, the first node does not execute the first transaction.

When there are a plurality of cross-chain transactions on a blockchain network, there may be a dependency relationship between the cross-chain transactions. Specifically, there is a dependency relationship between transaction data of the cross-chain transactions. For example, there are two cross-chain transactions: a cross-chain transaction A and a cross-chain transaction B. The cross-chain transaction A includes a first transaction and a second transaction. The cross-chain transaction B includes a third transaction and a fourth transaction. The first transaction and the third transaction are transactions on a first blockchain. The second transaction and the fourth transaction are transactions on a second blockchain.

The first transaction needs to modify a balance of an account A, and the third transaction A also needs to modify the balance of the account A. The first transaction is before the third transaction in time sequence.

The second transaction needs to modify a balance of an account B, and the fourth transaction also needs to modify the balance of the account B. The second transaction is after the fourth transaction in time sequence.

In this case, the third transaction can be executed only after the first transaction is completed.

If the first transaction and the second transaction belong to a same cross-chain transaction, execution of the first transaction needs to depend on an execution result of the second transaction.

The second transaction can be executed only after the fourth transaction is completed.

If the fourth transaction and the third transaction belong to a same cross-chain transaction, execution of the fourth transaction needs to depend on an execution result of the third transaction.

In this case, a deadlock occurs, and neither of the two cross-chain transactions can be completed. Consequently, transaction execution is blocked, and a system cannot provide a service.

Figure 16:
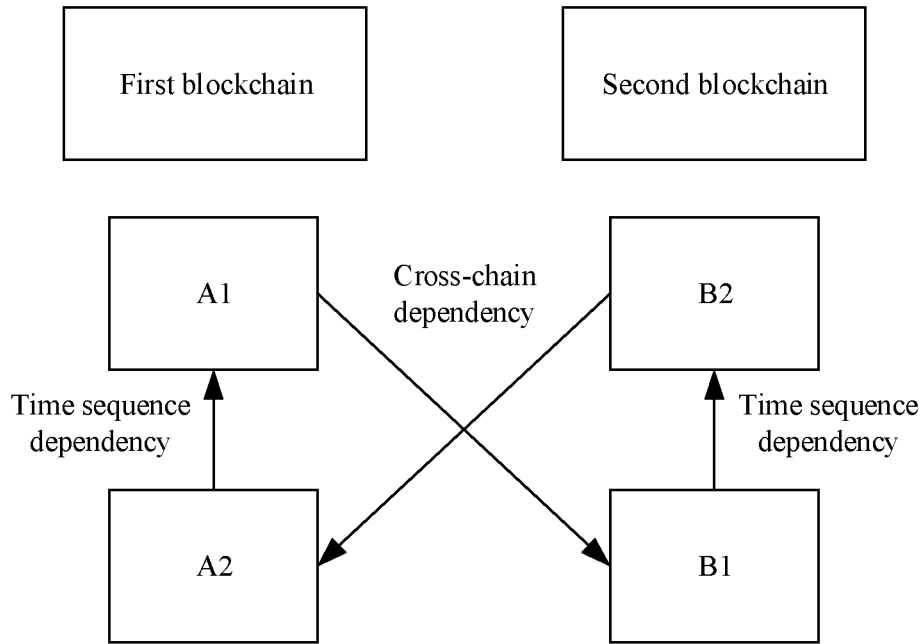
FIG. 16 is a diagram of a dependency relationship between cross-chain transactions.

FIG. 16 is a diagram of a dependency relationship between cross-chain transactions. As shown in FIG. 16, a first transaction A1 and a second transaction B1 belong to a same cross-chain transaction, and a third transaction A2 and a fourth transaction B2 belong to a same cross-chain transaction. The first transaction A1 and the third transaction A2 have a time sequence dependency relationship. In other words, the third transaction A2 can be executed only after the first transaction A1 is executed. The fourth transaction B2 and the second transaction B1 have a time sequence dependency relationship. In other words, the second transaction B1 can be executed only after the fourth transaction B2 is executed.

In this case, there is a transaction deadlock between the first transaction A1, the second transaction B1, the third transaction A2, and the fourth transaction B2.

Figure 17:
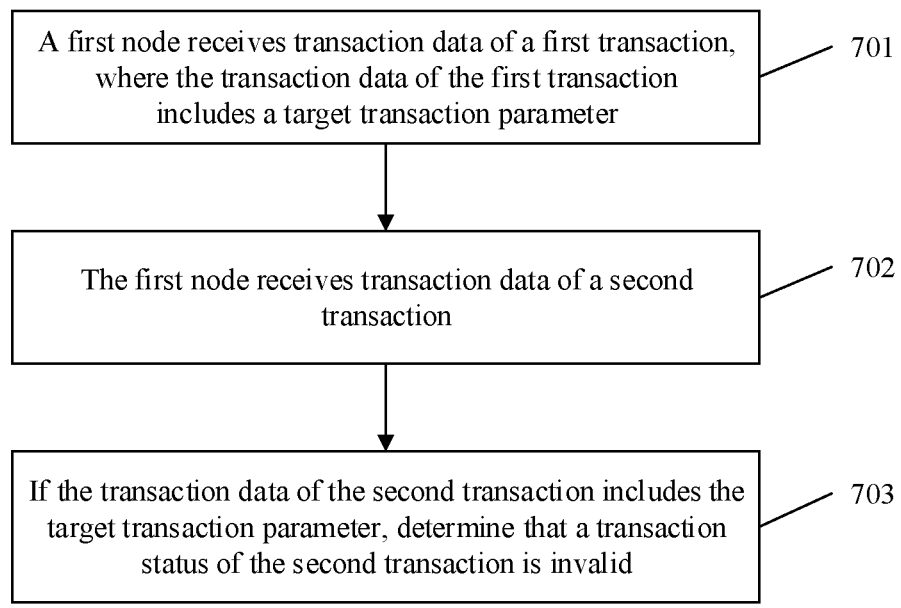
FIG. 17 is a diagram of a cross-chain transaction method according to an embodiment.

To resolve the foregoing problem, refer to FIG. 17. FIG. 17 is a diagram of a cross-chain transaction method according to an embodiment. Specifically, the cross-chain transaction method provided in this embodiment includes:

701: A first node receives transaction data of a first transaction, where the transaction data of the first transaction includes a target transaction parameter.

702: The first node receives transaction data of a second transaction.

703: If the transaction data of the second transaction includes the target transaction parameter, determine that a transaction status of the second transaction is invalid.

Optionally, in this embodiment of this application, the first transaction and a third transaction are associated cross-chain transactions, and the second transaction and a fourth transaction are associated cross-chain transactions. The first transaction and the second transaction are transactions on a first blockchain. The third transaction and the fourth transaction are transactions on a second blockchain.

For example, the first transaction is that a balance of an account A is reduced by 5 units of currency, the second transaction is that the balance of the account A is reduced by 10 units of currency, the third transaction is that a balance of an account B is increased by 5 units of currency, and the fourth transaction is that the balance of the account B is increased by 10 units of currency.

In this case, the transaction data of the first transaction includes the target transaction parameter "the account A", and the transaction data of the second transaction includes the target transaction parameter "the account A". Therefore, the first node may directly determine that the transaction status of the second transaction is invalid, and not execute the second transaction. In other words, a status database corresponding to the second transaction is not modified.

In this embodiment of this application, if it is determined that there are cross-chain transactions in which a transaction deadlock may occur, it is determined that a transaction status of one of the transactions is invalid, so that transaction execution blocking caused by the transaction deadlock can be resolved.

Figure 18:
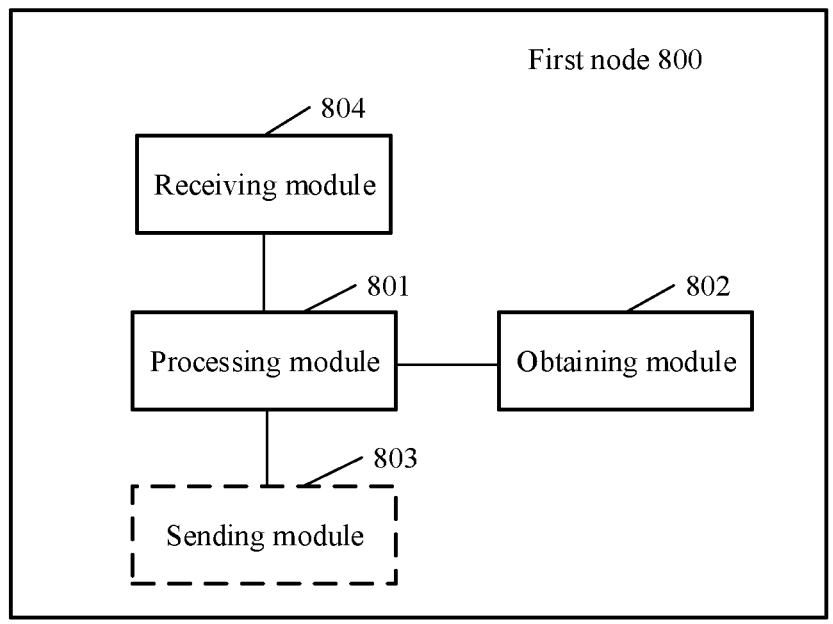
FIG. 18 is a diagram of a cross-chain transaction apparatus according to an embodiment.

The following describes in detail a first node corresponding to an embodiment of this application. FIG. 18 is a diagram of a first node according to an embodiment. A first node 800 in this embodiment of this application includes:
  a processing module 801, configured to determine that a transaction status of a first transaction is a first status, where the first status indicates that consensus verification on the transaction succeeds; and
  an obtaining module 802, configured to obtain a transaction status of a second transaction.

The processing module 801 is further configured to: when the transaction status of the second transaction is the first status, modify target data based on transaction data of the first transaction. The target data is data that is in a state machine of the first node and that is related to the first transaction.

In this embodiment of this application, the processing module 801 determines that the transaction status of the first transaction is the first status, and the first status indicates that the consensus verification on the transaction succeeds. The obtaining module 802 obtains the transaction status of the second transaction. The processing module 801 is configured to: when the transaction status of the second transaction is the first status, modify the target data based on the transaction data of the first transaction. The target data is the data that is in the state machine of the first node and that is related to the first transaction. In the foregoing manner, after determining that the transaction status of the first transaction is the first status, the first node does not directly determine, based on the first status, whether to modify the state machine of the first node, but receives the transaction status of the second transaction, and modifies the state machine of the first node when the transaction status of the second transaction is the first status. Therefore, whether a cross-chain sub-transaction is executed depends not only on a consensus verification result of the first transaction, but also on a consensus verification result of another associated cross-chain transaction. A case in which only part of associated cross-chain transactions is successfully executed and the other part is not successfully executed does not occur. In this way, atomic execution of the cross-chain transactions on a plurality of blockchains is implemented.

Optionally, the obtaining module 802 is specifically configured to receive the transaction status that is of the second transaction and that is sent by a third node, where the third node does not maintain a first blockchain and a second blockchain.

Optionally, the first node further includes:
  a sending module 803, configured to send the transaction status of the first transaction to the third node, where the third node does not maintain the first blockchain and the second blockchain.

Optionally, the sending module 803 is specifically configured to:
  send a third transaction to the third node, where the third transaction includes the transaction status of the first transaction.

The following describes in detail a first node corresponding to an embodiment of this application. FIG. 18 is a schematic diagram of an embodiment of the first node according to this embodiment of this application. A first node 800 in this embodiment of this application includes the following modules.

A processing module 801 is configured to:
obtain a first hash of a second transaction through calculation.

Alternatively, a receiving module 804 is specifically configured to receive the first hash that is of the second transaction and that is sent by a first client, where the first client is an initiator of the first transaction.

The receiving module 804 is configured to receive a second hash that is of the second transaction and that is sent by a third node.

If the first hash of the second transaction is equal to the second hash of the second transaction, it indicates that transaction data of the second transaction is correct. If the first hash of the second transaction is not equal to the second hash of the second transaction, it indicates that the transaction data of the second transaction is incorrect.

Optionally, the processing module 801 is further configured to:
obtain a first hash of a first transaction through calculation.

Alternatively, the receiving module 804 is specifically configured to receive the first hash that is of the first transaction and that is sent by the first client.

A sending module 803 is further configured to send the first hash of the first transaction to the third node.

Optionally, the sending module 803 is further configured to:
broadcast synchronization information to a fourth node, where the synchronization information is used to indicate that the first node has modified, based on transaction data of the first transaction, target data that is in a state machine of the first node and that is related to the first transaction, and the first node and the fourth node belong to a same node cluster.

Figure 19:
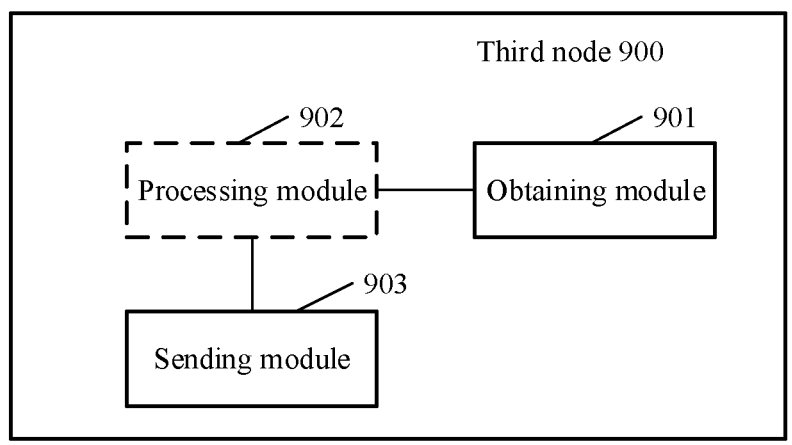
FIG. 19 is a diagram of a cross-chain transaction apparatus according to an embodiment.

The following describes in detail a cross-chain transaction apparatus corresponding to an embodiment of this application. FIG. 19 is a diagram of a third node according to an embodiment. A third node 900 in this embodiment of this application includes:
an obtaining module 901, configured to receive a transaction status that is of a second transaction and that is sent by a second node, where the second node maintains a second blockchain, and the second transaction belongs to the second blockchain; and
a sending module 903, configured to send the transaction status of the second transaction to a first node, so that the first node processes target data based on transaction status of the second transaction and a transaction status of a first transaction, where the target data is data that is in a state machine of the first node and that is related to the first transaction, the second transaction and the first transaction are associated cross-chain transactions, the first transaction belongs to a first blockchain, the first node maintains the first blockchain, and the third node does not maintain the first blockchain and the second blockchain.

Optionally, the third node further includes:
a processing module 902, configured to generate a first block including the transaction status of the second transaction.

Optionally, the receiving module is further configured to:
receive a transaction sent by at least one fifth node.

The processing module is specifically configured to:
sort, based on a time at which the transaction sent by the at least one fifth node is received and a time at which the transaction status of the second transaction is received, the transaction sent by the at least one fifth node and the transaction status of the second transaction, to generate at least one block, where the first block is one of the at least one block, and the first block includes the transaction status of the second transaction.

Optionally, the sending module 903 is specifically configured to:
send the first block to the first node.

Optionally, the receiving module is specifically configured to:
receive a fourth transaction sent by the second node, where the fourth transaction includes the transaction status of the second transaction.

Optionally, the receiving module is further configured to:
receive a second hash that is of the second transaction and that is sent by the second node.

The sending module is further configured to:
send the second hash of the second transaction to the first node, so that the first node determines correctness of transaction data of the second transaction based on the second hash of the second transaction and a first hash of the second transaction, where the first hash of the second transaction is obtained by the first node through calculation or is from a first client, and the first client is an initiator of the first transaction.

Figure 20:
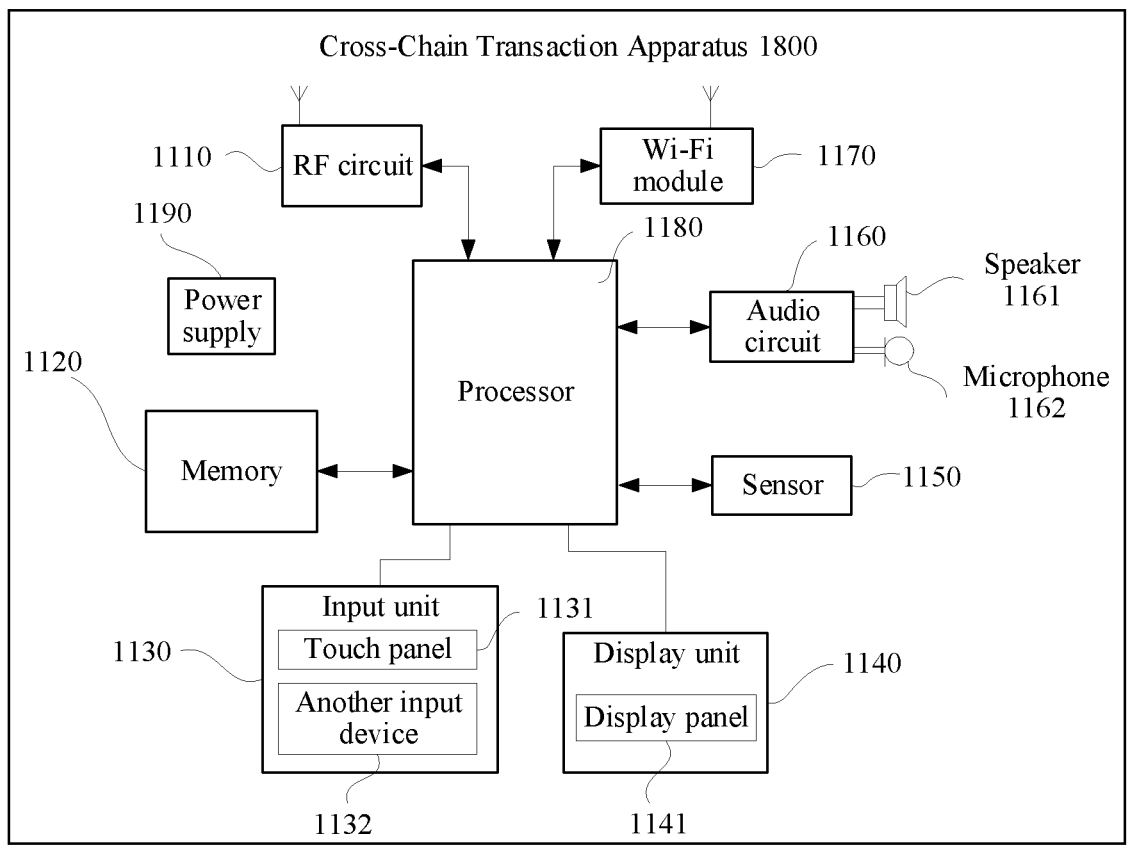
FIG. 20 is a diagram of a cross-chain transaction apparatus according to an embodiment.

An embodiment of this application further provides a cross-chain transaction apparatus. As shown in FIG. 20, FIG. 20 is a diagram of a cross-chain transaction apparatus according to an embodiment. For ease of description, only a part related to this embodiment of this application is shown. For specific technical details that are not disclosed, refer to the method parts in the embodiments of this application. The cross-chain transaction apparatus runs on a terminal, and the terminal may be any terminal device including a mobile phone, a tablet computer, a personal digital assistant (personal digital assistant, PDA), a point of sales (point of sales, POS), a vehicle-mounted computer, or the like. For example, the terminal is a mobile phone.

The mobile phone includes components such as a radio frequency (radio frequency, RF) circuit 1110, a memory 1120, an input unit 1130, a display unit 1140, a sensor 1150, an audio circuit 1160, a wireless fidelity (wireless fidelity, Wi-Fi) module 1170, a processor 1180, and a power supply 1190. A person skilled in the art may understand that, a structure of the mobile phone shown in FIG. 20 does not constitute a limitation on the mobile phone, and the mobile phone may include more or fewer components than those shown in the figure, combine some components, or have different component arrangements.

The RF circuit 1110 may be configured to send and receive signals in an information sending and receiving process or a call process. Particularly, the RF circuit 1110 receives downlink information from a base station, and then delivers the downlink information to the processor 1180 for processing. In addition, the RF circuit 1110 sends related uplink data to the base station. The RF circuit 1110 usually includes but is not limited to an antenna, at least one amplifier, a transceiver, a coupler, a low noise amplifier (low noise amplifier, LNA), a duplexer, and the like. In addition, the RF circuit 1110 may further communicate with a network and another device through wireless communication. Any communications standard or protocol may be used for the wireless communication, and includes but is not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 1120 may be configured to store a software program and a module. The processor 1180 executes various function applications of the mobile phone and data processing by running the software program and the module that are stored in the memory 1120. The memory 1120 may mainly include a program storage area and a data storage area. The program storage area may store an operating system, an application required by at least one function (such as a voice playback function and an image playback function), and the like. The data storage area may store data (such as audio data and a phone book) that is created based on use of the mobile phone, and the like. In addition, the memory 1120 may include a high-speed random access memory, and may further include a nonvolatile memory such as at least one magnetic disk storage device and a flash memory device, or another volatile solid-state storage device.

The input unit 1130 may be configured to: receive entered digit or character information, and generate a key signal input related to a user setting and function control of the mobile phone. Specifically, the input unit 1130 may include a touch panel 1131 and another input device 1132. The touch panel 1131, also referred to as a touchscreen, may collect a touch operation (for example, an operation performed by a user on or near the touch panel 1131 by using any suitable object or accessory such as a finger or a stylus) performed by the user on or near the touch panel 1131, and may drive a corresponding connection apparatus based on a preset program. Optionally, the touch panel 1131 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, then sends the touch point coordinates to the processor 1180, and receives and executes a command sent by the processor 1180. In addition, the touch panel 1131 may be implemented in a plurality of types, such as a resistive type, a capacitive type, an infrared type, and a surface acoustic wave type. The input unit 1130 may further include the another input device 1132 in addition to the touch panel 1131. Specifically, the another input device 1132 may include but is not limited to one or more of a physical keyboard, a function key (such as a volume control key or a power on/off key), a trackball, a mouse, a joystick, and the like.

The display unit 1140 may be configured to display information entered by the user or information provided for the user, and various menus of the mobile phone. The display unit 1140 may include a display panel 1141. Optionally, the display panel 1141 may be configured in a form of a liquid crystal display (liquid crystal display, LCD), an organic light-emitting diode (organic light-emitting diode, OLED), or the like. Further, the touch panel 1131 may cover the display panel 1141. After the touch panel 1131 detects a touch operation on or near the touch panel 1131, the touch operation is transmitted to the processor 1180 to determine a type of a touch event. Then, the processor 1180 provides a corresponding visual output on the display panel 1141 based on the type of the touch event. In FIG. 20, the touch panel 1131 and the display panel 1141 serve as two independent components to implement input and output functions of the mobile phone. However, in some embodiments, the touch panel 1131 and the display panel 1141 may be integrated to implement the input and output functions of the mobile phone.

The mobile phone may further include at least one sensor 1150, such as an optic sensor, a movement sensor, and another sensor. Specifically, the optic sensor may include an ambient light sensor and a proximity sensor. The ambient light sensor may adjust luminance of the display panel 1141 based on brightness of ambient light. The proximity sensor may turn off the display panel 1141 and/or backlight when the mobile phone approaches an ear. As a type of movement sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may further be configured in the mobile phone. Details are not described herein again.

An audio circuit 1160, a speaker 1161, and a microphone 1162 may provide an audio interface between the user and the mobile phone. The audio circuit 1160 may convert received audio data into an electrical signal, and then transmit the electrical signal to the speaker 1161, and the speaker 1161 converts the electrical signal into a sound signal for output. In addition, the microphone 1162 converts a collected sound signal into an electrical signal. The audio circuit 1160 receives the electrical signal, converts the electrical signal into audio data, and then outputs the audio data to the processor 1180 for processing. After the processing, the processor 1180 sends the audio data to, for example, another mobile phone through the RF circuit 1110, or outputs the audio data to the memory 1120 for further processing.

Wi-Fi belongs to a short-distance wireless transmission technology. The mobile phone may help, by using the Wi-Fi module 1170, the user receive and send an email, browse a web page, access streaming media, and the like. The Wi-Fi module 1170 provides wireless broadband internet access for the user. Although FIG. 20 shows the Wi-Fi module 1170, it may be understood that the Wi-Fi module 1170 is not a mandatory component of the mobile phone, and may be omitted based on a requirement without changing the essence of this application.

The processor 1180 is a control center of the mobile phone, connects various components of the entire mobile phone through various interfaces and lines, and executes various functions and data processing of the mobile phone by running or executing the software program and/or the module stored in the memory 1120 and invoking data stored in the memory 1120, to perform overall monitoring on the mobile phone. Optionally, the processor 1180 may include one or more processing units. Optionally, an application processor and a modem processor may be integrated in the processor 1180. The application processor mainly processes an operating system, a user interface, an application, and the like. The modem processor mainly processes wireless communication. It may be understood that the modem processor may alternatively not be integrated into the processor 1180.

The mobile phone further includes the power supply 1190 (such as a battery) that supplies power to each component. Optionally, the power supply may be logically connected to the processor 1180 by using a power management system, so that functions such as management of charging, discharging, and power consumption are implemented by using the power management system.

Although not shown, the mobile phone may further include a camera, a Bluetooth module, and the like. Details are not described herein again.

In this embodiment of this application, the processor 1180 included in the terminal may perform the steps described in the embodiments corresponding to FIG. 3, FIG. 4A, FIG. 4B, FIG. 6, FIG. 11, FIG. 12, FIG. 13A, FIG. 13B, FIG. 15, and FIG. 17.

Figure 21:
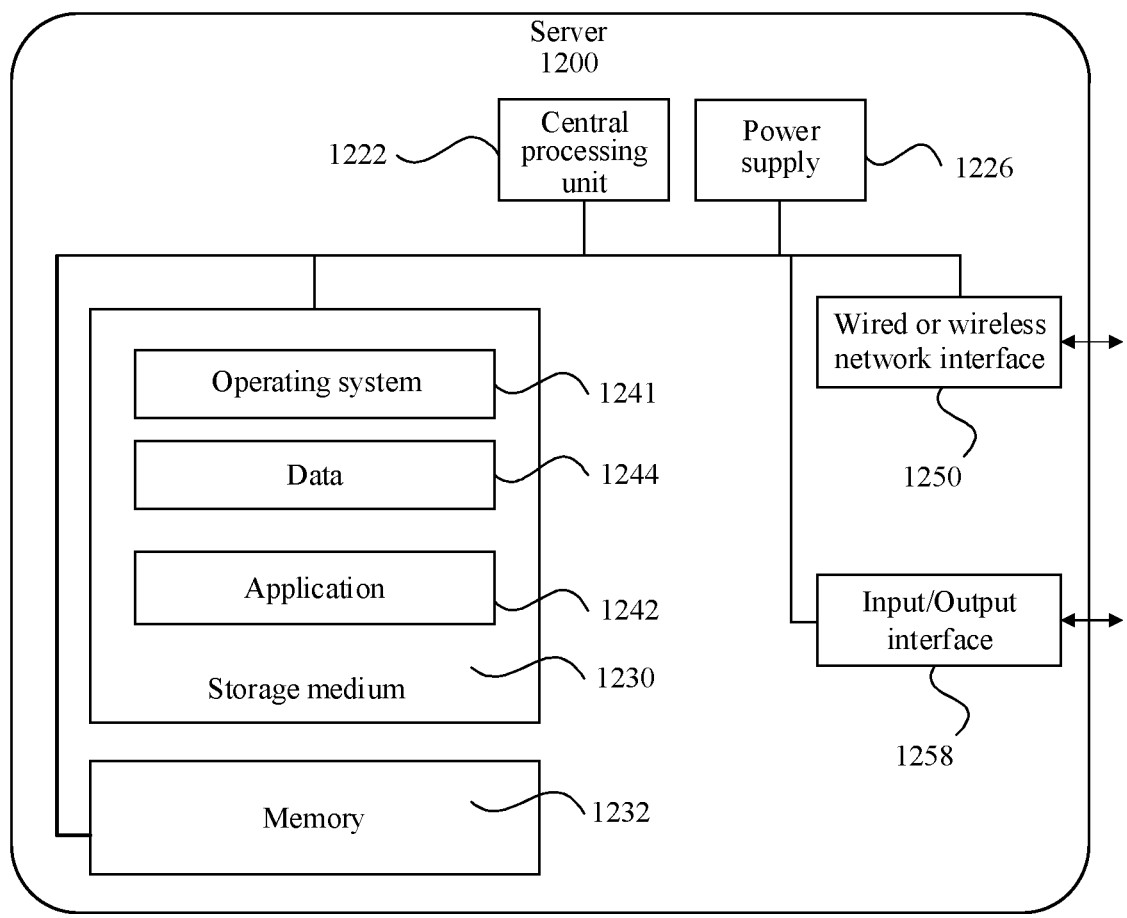
FIG. 21 is a diagram of a server according to an embodiment.

The cross-chain transaction apparatus provided in this embodiment of this application may alternatively be deployed in a server. The server may be a single server, or a server cluster including a plurality of servers. The following uses the single server as an example for description. FIG. 21 is a diagram of a server 1200 according to an embodiment. The server 1200 may vary greatly due to different configurations or performance, and may include at least one central processing unit (CPU) 1222 (for example, at least one processor), a memory 1232, and at least one storage medium 1230 (for example, at least one mass storage device) that store an application 1242 or data 1244. The memory 1232 and the storage medium 1230 may be transient storage or persistent storage. A program stored in the storage medium 1230 may include at least one module (not shown in the figure), and each module may include a series of instruction operations for the server. Further, the central processing unit 1222 may be configured to communicate with the storage medium 1230, to perform, on the server 1200, the series of instruction operations in the storage medium 1230.

The server 1200 may further include at least one power supply 1226, at least one wired or wireless network interface 1250, at least one input/output interface 1258, and/or at least one operating system 1241 such as Windows Server™, Mac OS X™, Unix™, Linux™, and FreeBSD™.

Steps performed by the server in the foregoing embodiments may be based on the structure of the server shown in FIG. 21.

The CPU 1222 may perform the steps described in the embodiments corresponding to FIG. 3, FIG. 4A, FIG. 4B, FIG. 6, FIG. 11, FIG. 12, FIG. 13A, FIG. 13B, FIG. 15, and FIG. 17.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatuses, and methods may be implemented in another manner. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A cross-chain transaction method, comprising:
   determining, by a first node, that a first transaction status of a first transaction is a first status, the first status indicating that consensus verification on the first transaction succeeded, the first node maintaining a first blockchain and the first transaction belonging to the first blockchain;
   obtaining, by the first node, a second transaction status of a second transaction, a second node maintaining a second blockchain and the second transaction belonging to the second blockchain; and
   modifying, by the first node, target data, the modifying being based on first transaction data of the first transaction when the second transaction status of the second transaction is the first status, the target data comprising data in a state machine of the first node, the target data being related to the first transaction.

2. The method according to claim 1, wherein the obtaining, by the first node, the second transaction status of the second transaction comprises:
   receiving, by the first node, the second transaction status that is of the second transaction and that is sent by a third node, wherein the third node does not maintain the first blockchain or the second blockchain.

3. The method according to claim 1, wherein the method further comprises:
   sending, by the first node, the first transaction status to the third node, wherein the third node does not maintain the first blockchain or the second blockchain.

4. The method according to claim 3, wherein the sending, by the first node, the first transaction status to the third node comprises:
   sending, by the first node, a third transaction to the third node, the third transaction comprising the first transaction status of the first transaction.

5. The method according to claim 1, wherein the method further comprises:
   obtaining, by the first node, a first hash of the second transaction, the first hash being obtained through calculation or by the first node receiving the first hash and the first hash is sent by a first client, the first client being an initiator of the first transaction; and
   receiving, by the first node, a second hash that is of the second transaction and that is sent by the third node;
   wherein if the first hash of the second transaction is equal to the second hash of the second transaction, then the second transaction data of the second transaction is correct, or if the first hash of the second transaction is not equal to the second hash of the second transaction, then the second transaction data of the second transaction is incorrect.

6. The method according to claim 1, wherein the method further comprises:
   obtaining, by the first node, a first hash of the first transaction, the first hash being obtained through calculation or the first node receiving the first hash and the first hash is sent by the first client; and
   sending, by the first node, the first hash of the first transaction to a third node.

7. The method according to claim 1, wherein after the first node modifying the target data that is in the state machine of the first node and that is related to the first transaction, the modifying being based on the first transaction data of the first transaction, the method further comprises:
   broadcasting, by the first node, synchronization information to a fourth node, the synchronization information indicating that the first node has modified, based on the first transaction data of the first transaction, the target data that is in the state machine of the first node and that is related to the first transaction, and the first node and the fourth node belong to a same node cluster.

8. A cross-chain transaction method, comprising:
   receiving, by a third node, a second transaction status that is of a second transaction and that is sent by a second node, the second node maintaining a second blockchain and the second transaction belonging to the second blockchain; and
   sending, by the third node, the second transaction status of the second transaction to a first node, the first node processing target data based on the second transaction status of the second transaction and based on a first transaction status of a first transaction, the target data is in a state machine of the first node and the target data is related to the first transaction, the first node maintaining a first blockchain and the first transaction belonging to the first blockchain, and the third node does not maintain the first blockchain or the second blockchain.

9. The method according to claim 8, wherein the method further comprises:
   generating, by the third node, a first block comprising the second transaction status of the second transaction.

10. The method according to claim 9, wherein the method further comprises:
    receiving, by the third node, a fifth node transaction sent by at least one fifth node; and
    the generating, by the third node, the first block comprises:
    sorting, by the third node, the fifth node transaction and the second transaction status to generate at least one block, the sorting being based on a fifth node transaction reception time at which the fifth node transaction is received and a second transaction status reception time at which the second transaction status is received, the at least one block includes the first block, and the first block comprises the second transaction status of the second transaction.

11. The method according to claim 9, wherein the sending, by the third node, the second transaction status of the second transaction to the first node comprises:
    sending, by the third node, the first block to the first node.

12. The method according to claim 8, wherein the receiving, by the third node, the second transaction status comprises:
    receiving, by the third node, a fourth transaction sent by the second node, the fourth transaction comprising the second transaction status of the second transaction.

13. The method according to claim 8, wherein the method further comprises:
    receiving, by the third node, a second hash that is of the second transaction and that is sent by the second node; and
    sending, by the third node, the second hash to the first node so that the first node determines correctness of the second transaction data of the second transaction based on the second hash and a first hash of the second transaction, the first hash of the second transaction being obtained by the first node through calculation or by the first node receiving the first hash from a first client, and the first client is an initiator of the first transaction.

14. An apparatus for a cross-chain transaction, the apparatus comprising:

a non-transitory memory storing instructions; and at least one processor in communication with the memory, the at least one processor configured, upon execution of the instructions, to perform the following steps:

determine that a first transaction status of a first transaction is a first status, the first status indicating that consensus verification on the first transaction succeeded, the first node maintaining a first blockchain and the first transaction belonging to the first blockchain;

obtain, a second transaction status of a second transaction, a second node maintaining the second blockchain and a second transaction belonging to the second blockchain; and modify target data based on the first transaction data of the first transaction when the second transaction status of the second transaction is the first status, the target data comprising data being in a state machine of the first node, the target data being related to the first transaction.

15. The apparatus according to claim 14, wherein the obtaining step comprises:

receive the second transaction status that is of the second transaction and that is sent by a third node, wherein the third node does not maintain the first blockchain or the second blockchain.

16. The apparatus according to claim 14, wherein the at least one processor further executes the instructions to:

send the first transaction status of the first transaction to the third node, wherein the third node does not maintain the first blockchain or the second blockchain.

17. The apparatus according to claim 14, wherein the at least one processor further executes the instructions to:

obtain a first hash of the second transaction, the first hash being obtained through calculation or by the apparatus receiving the first hash and the first hash is sent by a first client, the first client being an initiator of the first transaction; and receive a second hash that is of the second transaction and that is sent by the third node;

wherein if the first hash of the second transaction is equal to the second hash of the second transaction, then the second transaction data of the second transaction is correct or if the first hash of the second transaction is not equal to the second hash of the second transaction, then the second transaction data of the second transaction is incorrect.

18. A non-transitory computer-readable storage medium storing computer instructions that when executed by a processor cause the processor to perform the steps of:

determining that a first transaction status of a first transaction is a first status, the first status indicating that consensus verification on the first transaction succeeded;

obtaining a second transaction status of a second transaction; and modifying target data based on the first transaction data of the first transaction when the second transaction status is the first status, the target data comprising data in a state machine of the first node, the target data being related to the first transaction.

19. The computer-readable storage medium according to claim 18, wherein the processor further executes the computer instructions to perform the step of:

receiving the second transaction status that is of the second transaction and that is sent by a third node, wherein the third node does not maintain the first blockchain or the second blockchain.

20. The computer-readable storage medium according to claim 18, wherein the processor further executes the computer instructions to perform the step of:

sending the first transaction status of the first transaction to a third node, wherein the third node does not maintain the first blockchain or the second blockchain.

\* \* \* \* \*